United States Patent
Yang et al.

(10) Patent No.: US 10,819,486 B2
(45) Date of Patent: Oct. 27, 2020

(54) SOUNDING REFERENCE SIGNAL TRANSMISSION AND RECEPTION METHODS, APPARATUS, SYSTEM, AND STORAGE MEDIUM

(71) Applicant: ZTE CORPORATION, Shenzhen (CN)

(72) Inventors: Ling Yang, Shenzhen (CN); Wei Gou, Shenzhen (CN); Yajun Zhao, Shenzhen (CN); Focai Peng, Shenzhen (CN); Feng Bi, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/090,383

(22) PCT Filed: Mar. 31, 2017

(86) PCT No.: PCT/CN2017/079166
§ 371 (c)(1),
(2) Date: Mar. 18, 2019

(87) PCT Pub. No.: WO2017/167304
PCT Pub. Date: Oct. 5, 2017

(65) Prior Publication Data
US 2019/0215110 A1    Jul. 11, 2019

(30) Foreign Application Priority Data
Apr. 1, 2016   (CN) .......................... 2016 1 0204328

(51) Int. Cl.
*H04L 5/00* (2006.01)
*H04W 72/04* (2009.01)
(Continued)

(52) U.S. Cl.
CPC ............ *H04L 5/005* (2013.01); *H04L 5/0051* (2013.01); *H04L 5/0053* (2013.01);
(Continued)

(58) Field of Classification Search
CPC ....... H04W 80/04; H04W 8/26; H04W 72/04; H04W 88/08; H04W 76/00; H04W 84/08;
(Continued)

(56) References Cited

U.S. PATENT DOCUMENTS

| | | |
|---|---|---|
| 2012/0051265 A1 | 3/2012 | Shen |
| 2012/0213061 A1 | 8/2012 | Chen |
| 2013/0343313 A1* | 12/2013 | Takeda .................... H04L 5/001 370/329 |

(Continued)

FOREIGN PATENT DOCUMENTS

| | | |
|---|---|---|
| CN | 103457690 A | 12/2013 |
| CN | 103517278 A | 1/2014 |

(Continued)

OTHER PUBLICATIONS

International Search Report in international application No. PCT/CN2017/079166, dated May 27, 2017, 2 pgs.
(Continued)

*Primary Examiner* — Brenda H Pham
(74) *Attorney, Agent, or Firm* — Cantor Colburn LLP

(57) ABSTRACT

Disclosed is a sounding reference signal (SRS) transmission method. The method comprises: determining a resource on an unlicensed carrier for transmitting an SRS; and transmitting the SRS according to the determined resource. The invention solves a problem in the prior art in which transmitting an SRS on an unlicensed carrier is less feasible, thereby increasing feasibility of transmitting an SRS on an unlicensed carrier. Also disclosed are an SRS reception method, an apparatus, a system, and a storage medium.

6 Claims, 9 Drawing Sheets

A resource for sending an SRS on an unlicensed carrier is determined — S102

↓

The SRS is sent according to the determined resource — S104

(51) Int. Cl.
    *H04W 76/27*     (2018.01)
    *H04W 74/08*     (2009.01)
    *H04W 74/00*     (2009.01)
    *H04W 16/14*     (2009.01)

(52) U.S. Cl.
    CPC ..... *H04W 72/042* (2013.01); *H04W 72/0446* (2013.01); *H04W 74/002* (2013.01); *H04W 74/0816* (2013.01); *H04W 76/27* (2018.02); *H04W 16/14* (2013.01)

(58) Field of Classification Search
    CPC ... H04W 76/02; H04W 72/042; H04W 76/27; H04W 74/0816; H04W 74/002; H04W 72/0446; H04W 16/14; H04L 5/14; H04L 5/1423; H04L 5/16; H04L 5/005; H04L 5/0051; H04L 5/0053; H04J 1/10; H04B 7/2123; H04B 7/212
    USPC ....... 370/349, 276, 277, 281, 282, 295, 322, 370/329, 341
    See application file for complete search history.

(56) References Cited

U.S. PATENT DOCUMENTS

| | | | |
|---|---|---|---|
| 2015/0110017 A1* | 4/2015 | Park | H04L 1/1861 370/329 |
| 2017/0141893 A1* | 5/2017 | Zhang | H04L 5/0048 |
| 2018/0006788 A1* | 1/2018 | Lee | H04W 52/32 |

FOREIGN PATENT DOCUMENTS

| | | |
|---|---|---|
| CN | 103533552 A | 1/2014 |
| CN | 103647626 A | 3/2014 |
| CN | 104955158 A | 9/2015 |
| CN | 105429740 A | 3/2016 |
| CN | 105451251 A | 3/2016 |
| WO | 2016033976 A1 | 3/2016 |

OTHER PUBLICATIONS

English Translation of the Written Opinion of the International Search Authority in international application No. PCT/CN2017/079166, dated May 27, 2017, 7 pgs.

* cited by examiner

SOUNDING REFERENCE SIGNAL TRANSMISSION AND RECEPTION METHODS, APPARATUS, SYSTEM, AND STORAGE MEDIUM

CROSS-REFERENCE TO RELATED APPLICATIONS

The present application is filed based upon and claims priority from Chinese Patent Application No. 201610204328.4, filed on Apr. 1, 2016, the contents of which are hereby incorporated by reference in its entirety.

TECHNICAL FIELD

The disclosure relates to the field of communication, and particularly to Sounding Reference Signal (SRS) sending and receiving methods and devices, a system and a storage medium.

BACKGROUND

In a Long Term Evolution (LTE) system, an unlicensed spectrum has the following characteristics: no charge/low charge, low access requirement, low cost, great available bandwidth, resource sharing and the like. It has been possible to transmit an SRS on an unlicensed carrier of the system. However, there may exist a regulatory requirement of the unlicensed carrier. Therefore, there is a problem of few transmission opportunities for transmission of the SRS on the unlicensed carrier.

SUMMARY

In view of this, embodiments of the disclosure are intended to provide SRS sending and receiving methods and device, a system and a storage medium, so as to solve the problem of few transmission opportunities for transmission of an SRS on an unlicensed carrier in a related art.

According to an aspect of the embodiments of the disclosure, an SRS sending method is provided, which may include that: a resource for sending an SRS on an unlicensed carrier is determined; and the SRS is sent according to the determined resource.

According to another aspect of the disclosure, an SRS receiving method is provided, which may include the following operations.

A parameter or parameter set configured to send an SRS or information indicating SRS sending is sent to User Equipment (UE).

The SRS sent by the UE is received on a resource determined based on the parameter or parameter set for the SRS or the information indicating SRS sending and configured to send the SRS on an unlicensed carrier.

According to an aspect of the embodiments of the disclosure, an SRS sending device is provided, which may include: a determination module, configured to determine a resource for sending an SRS on an unlicensed carrier; and a first sending module, configured to send the SRS according to the determined resource.

According to another aspect of the embodiments of the disclosure, UE is provided, which may include a first processor and a first memory.

The first processor may be configured to determine a resource for sending an SRS on an unlicensed carrier and may be configured to send the SRS according to the determined resource.

The first memory may be coupled to the first processor.

According to an aspect of the embodiments of the disclosure, an SRS sending device is provided, which may include: a second sending module, configured to send a parameter or parameter set configured to send an SRS or information indicating SRS sending to UE; and a receiving module, configured to receive the SRS sent by the UE on a resource determined based on the parameter or parameter set for the SRS or the information indicating SRS sending and configured to send the SRS on an unlicensed carrier.

According to another aspect of the embodiments of the disclosure, a base station is provided, which may include a second processor and a second memory.

The second processor may be configured to send a parameter or parameter set configured to send an SRS or information indicating SRS sending to UE and may be configured to receive the SRS sent by the UE on a resource determined based on the parameter or parameter set for the SRS and configured to send the SRS on an unlicensed carrier.

The second memory may be coupled to the second processor.

The embodiments of the disclosure further provide an SRS processing system, which may include UE and a base station.

The base station may be configured to send a parameter or parameter set configured to send an SRS to the UE.

The UE may be configured to determine a resource configured to send the SRS on an unlicensed carrier based on the parameter or parameter set for the SRS and send the SRS to the base station on the determined resource.

The base station may further be configured to receive the SRS on the determined resource.

The embodiments of the disclosure further provide a computer storage medium, which may store a computer program, the computer program being configured to execute the SRS sending method of the embodiments of the disclosure.

The embodiments of the disclosure further provide a computer storage medium, which may store a computer program, the computer program being configured to execute the SRS receiving method of the embodiments of the disclosure.

According to the embodiments of the disclosure, the resource for sending the SRS on the unlicensed carrier is determined and the SRS is sent according to the determined resource. Therefore, the problem of few transmission opportunities for transmission of the SRS on the unlicensed carrier in the related art is solved and the effect of increasing transmission opportunities for transmission of the SRS on the unlicensed carrier is further achieved.

DETAILED DESCRIPTION

The disclosure will be described below with reference to the drawings and in combination with the embodiments in detail. It is to be noted that the embodiments in the application and characteristics in the embodiments may be combined without conflicts.

The embodiments of the disclosure may be applied to the following application scenario: an application scenario where UE and base station in an LTE system send and receive an SRS, and may specifically be applied to an application scenario of, for example, multi-SF scheduling or single-SF scheduling and the like.

First Embodiment

Figure 1:
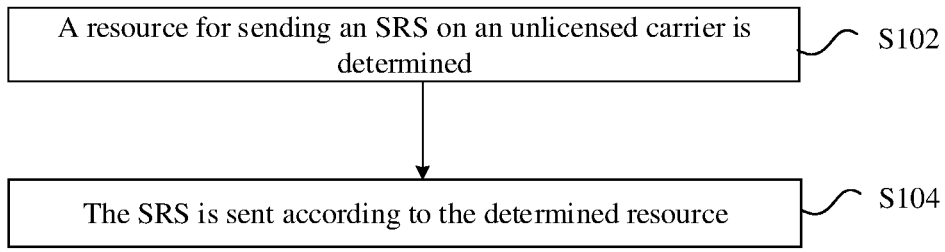
FIG. 1 is a flowchart of an SRS sending method according to an embodiment of the disclosure.

The embodiment provides an SRS sending method. FIG. 1 is a flowchart of an SRS sending method according to an embodiment of the disclosure. As shown in FIG. 1, the flow includes the following steps.

In S102, a resource for sending an SRS on an unlicensed carrier is determined.

In S104, the SRS is sent according to the determined resource.

Herein, the determined resource includes at least one of: an SF, a symbol, an SF set or a symbol set.

By the steps, the SRS is sent according to the determined resource sending the SRS on the unlicensed carrier, which, compared with the related art where no configuration is made for sending of the SRS on the unlicensed carrier, not only solves the problem of few transmission opportunities for transmission of the SRS on the unlicensed carrier in the related art but also further achieves the effect of increasing transmission opportunities for transmission of the SRS on the unlicensed carrier.

Before the operation that the resource for sending the SRS on the unlicensed carrier is determined, the method further includes that: an SRS parameter or parameter set to be used in sending the SRS is acquired. The SRS parameter or parameter set includes at least one of:

a first SRS parameter or parameter set configured through high-layer Radio Resource Control (RRC) signaling; and a second SRS parameter set configured through dedicated physical-layer Downlink Control Information (DCI) signaling, common DCI signaling or newly designed DCI signaling.

The operation that the resource for sending the SRS on the unlicensed carrier is determined includes that: the resource is determined according to the acquired SRS parameter or parameter set. That is, UE may acquire the SRS parameter or parameter set to be used in sending the SRS in multiple manners which, for example, may include a manner of the abovementioned high-layer RRC signaling or a manner of the physical-layer DCI signaling or the common DCI signaling or the newly designed DCI signaling and may also include a manner predetermined by a base station and the UE. There are no limits made herein. It is to be noted that, when the base station sends the SRS set to the UE, the base station may also trigger the UE to send the SRS at a predetermined position on the unlicensed carrier.

The first SRS parameter or parameter set or the second SRS parameter or parameter set may include various types of parameters and, for example, may include at least one of the following parameters: a cell-level bandwidth, a UE-level bandwidth, a period, an offset, a frequency-domain position, a first transmission comb, a cyclic shift, a transmission comb number, an antenna port and an SUS SF position or SRS SF set configured to send the SRS. It is to be noted that the parameters may be combined into multiple parameter sets. For example, they may be combined into a parameter set 1 including the cell-level bandwidth, the UE-level bandwidth, the period, the offset, the frequency-domain position, a transmission comb, the cyclic shift, the transmission comb number and the antenna port. They may be combined into a parameter set 2 including the cell-level bandwidth, the UE-level bandwidth, the frequency-domain position, the transmission comb, the cyclic shift, the transmission comb number and the antenna. They may also be combined into a parameter set 3 including the frequency-domain position, the transmission comb, the cyclic shift, the transmission comb number and the antenna port. It is to be noted that various types of parameter sets all may be configured through high-layer signaling and may also be configured through physical-layer signaling. The only difference is a configuration preference to the specifically configured parameters.

In an embodiment, the operation that the parameter or parameter set used in sending the SRS is acquired includes the following operation.

The parameter or parameter set for the SRS is acquired by at least one of:
configuration through the high-layer RRC signaling;
configuration through the dedicated physical-layer DCI signaling;
configuration through the common DCI signaling; and
configuration through the newly defined DCI signaling.

In an embodiment, before the operation that the SRS is sent according to the determined resource, at least one of the following operations may be executed.

CCA is executed before the SRS is sent at the SRS SF position determined according to the period and the offset.

CCA is executed before the SRS is sent at the SRS SF position determined according to the SRS SF position or the SRS SF set.

The SRS is sent on a determined SRS SF under the condition that CCA is successfully executed and the determined SRS SF corresponds to an UpLink (UL) SF of the unlicensed carrier.

In an embodiment, a position of the resource sending the SRS is determined through at least one of the following information:
the period and the offset; the SRS SF position; or the SRS SF set.

In an embodiment, the operation that the resource for sending the SRS on the unlicensed carrier is determined includes the following operation.

The SRS SF position is determined in at least one of the following manners.

At least one of the SF position for sending the SRS and SRS SF set is indicated through the dedicated DCI signaling, common DCI signaling or newly designed DCI signaling sent by the base station and the SRS SF position is determined.

The SRS SF position is determined according to an SF index n for the dedicated DCI signaling, common DCI signaling or newly designed DCI signaling sent by the base station and a predetermined timing relationship.

The SRS SF position is determined in a manner of predetermination or implicit indication by the base station and the UE.

In an embodiment, at least one of the following is performed based on the predetermined timing relationship:
determining a SF for sending the SRS;
determining a starting point of an SF, and determining an SF position for a SRS also based on an offset; or
determining a start point of a SF and determining a SF for sending a SRS also based on information predetermined by the base station and the UE or indicated by the base station.

In an embodiment, the determined resource for sending the SRS on the unlicensed carrier includes two aspects. One aspect is a resource on a time domain and the other aspect is a resource on a frequency domain. Herein, the resource on the time domain will be introduced at first. A time-domain resource configured to send the SRS may be determined in multiple manners. For example, the SRS SF position may be determined in at least one of the following manners.

A first manner: at least one of the SF position for sending the SRS and SRS SF set is indicated through the dedicated DCI signaling or common DCI signaling or newly designed DCI signaling sent by the base station and the SRS SF is determined.

A second manner: the SRS SF is determined according to the SF index n for the dedicated DCI signaling or common DCI signaling or newly designed DCI signaling sent by the base station and the predetermined timing relationship.

A third manner: the SRS SF is determined in the manner of predetermination by the base station and the UE or implicit indication.

In the first manner, the operation that the SF position for sending the SRS is indicated through dedicated DCI or the common DCI signaling or the newly designed DCI signaling includes at least one of the following operations: one SRS sending SF position is indicated through the dedicated DCI signaling or the common DCI signaling or the newly designed DCI signaling; multiple successive SF positions for the SRS are indicated through the dedicated DCI signaling or the common DCI signaling or the newly designed DCI signaling; multiple discrete SF positions for the SRS are indicated through the dedicated DCI signaling or the common DCI signaling or the newly designed DCI signaling; and a SF at an end of downlink transmission is indicated through the dedicated DCI signaling or the common DCI signaling or the newly designed DCI signaling.

In the first manner, the operation that the SF set for sending the SRS is indicated through the dedicated DCI signaling or the common DCI signaling or the newly designed DCI signaling includes that: the SRS SF set is indicated according to the dedicated DCI signaling or the common DCI signaling or the newly designed DCI signaling and an SF position corresponding to an element in the SRS SF set is the SRS SF position, a total number of elements in the SRS SF set being at least one.

In the second manner, the predetermined timing relationship is n+k, where k represents an integer equal to or greater than 4 or an integer equal to or greater than 1 and n represents an SF index for sending of the dedicated DCI signaling or the common DCI signaling or the newly designed DCI signaling.

In the third manner, determining the SRS SF position in a manner of predetermination or implicit indication by the base station and the UE includes at least one of: a first UL SF in a UL transmission burst; a first SF having an even SF index in the UL transmission burst; a first SF having an odd SF index in the UL transmission burst; SFs each having an even SF index in the UL transmission burst; SFs each having an odd SF index in the UL transmission burst; a scheduling SF; SFs corresponding to multiple successive SFs starting from a position of a scheduling SF; SFs corresponding to multiple discrete SFs starting from a position of a scheduling SF; a first SF after an end of downlink transmission; a SF at an end of downlink transmission; a first UL SF; SFs corresponding to s successive UL SFs starting from the first UL SF; corresponding SFs spaced by u SFs from a wth UL SF; a first UL SF after successful Listen Before Talk (LBT); and an rth UL SF, where w is equal to or greater than 1 but smaller than a total number of SFs in the UL transmission burst or smaller than a total number of successive SFs scheduled by the UE; u is equal to or greater than 0 and less than or equal to a total number of the SFs in the UL transmission burst or smaller than a total number of the successive SFs scheduled by the UE; and r is equal to or greater than 1 but smaller than a total number of the SFs in the UL transmission burst or smaller than a total number of the successive SFs scheduled by the UE. In an embodiment, w may be 1, 2 3 and 4; or, u may be 0, 1, 2 and 3.

In an embodiment, the operation that the SRS is sent on the determined SRS SF includes one of the following operations: no matter whether a PUSCH is configured on the determined SRS SF or not, the SRS is sent on the determined SRS SF; when an own PUSCH is configured on the determined SRS SF, the SRS is sent on the determined SRS SF; when a PUSCH of other UE is configured on the determined SRS SF, the SRS is sent on the determined SRS SF; and when no PUSCH is configured on the determined SRS SF, the SRS is sent on the determined SRS SF.

In an embodiment, the operation that the SRS is sent on the determined SRS SF under the condition that the SRS SF is determined based on the SRS SF set includes one of the following operations: when CCA is successfully executed before the SRS is sent on each SF in the SRS SF set, the SRS is sent on each SRS SF; and when CCA is successfully executed before the SRS is sent on an SF in the SRS SF set, the SRS is sent on the SF, and sending of the SRS on the other SFs after the SF in the SRS SF set is limited.

How to send the SRS and the SRS SF position for sending of the SRS will be described with examples in combination with the parameter sets which are listed above. For example, when the parameter set 1 is configured through the high-layer RRC signaling, a transmission manner for the SRS may include one of the following manners: no matter whether there is a PUSCH on an SRS periodic point or not, the UE sends the SRS; or, when there is a PUSCH on the SRS periodic point, the UE sends the SRS; or, when there is a PUSCH of other UE on the SRS periodic or aperiodic point, the SRS sends the SRS. When the parameter set 2 or 3 is configured through the high-layer RRC signaling, a time-domain position for sending of the SRS is determined in one of the following manners: a time-domain SF position or SF position set for sending of the SRS on the unlicensed carrier is determined according to a UL grant sending SF position n; or, the time-domain SF or SF set position for the SRS is predetermined by the base station and the UE, one or more of UL odd SFs or even SFs being predetermined as time-domain SF positions or SF position set for the SRS; or, the time-domain SF or SF set position for the SRS is indicated according to DCI; or, the time-domain SF or SF set position for the SRS is indicated according to common DCI; or, the time-domain SF or SF set position for the SRS is indicated according to new DCI. When the parameter set 2 or 3 is configured through the high-layer RRC signaling, the transmission manner for the SRS includes at least one of the following manners: no matter whether there is a PUSCH on the SRS SF or not, the UE sends the SRS; or, only when there is a PUSCH on the SRS SF, the UE sends the SRS; or, when there is a PUSCH of the other UE on the SRS SF, the UE sends the SRS; or, no matter whether there is a PUSCH on the SRS SF or not, the SRS is not sent on another SRS SF as long as the UE successfully sends the SRS once; or, when there is a PUSCH on the SRS SF and the UE has never sent the SRS, the UE may send the SRS; or, when there is a PUSCH of the other UE on the SRS SF and the UE has never sent the SRS, the UE sends the SRS.

In an embodiment, before the operation that an Aperiodic SRS (AP-SRS) is sent according to the determined resource, the method further includes that: the AP-SRS is triggered to be sent in one of the following manners: the AP-SRS is triggered to be sent through an SRS request field in a DCI format 0/4/1A/2B/2C/2D; the AP-SRS is triggered to be sent through the common DCI in a DCI format 1C; and the AP-SRS is triggered to be sent through a newly designed DCI format.

In an embodiment, field information of the SRS request field in the DCI format 4 includes one of the following information indicated with 2 bits: triggering of no AP-SRS; triggering of the AP-SRS and configuration of an SRS SF position; triggering of the AP-SRS and configuration of successive SRS SF positions; triggering of the AP-SRS and configuration of discrete SRS SF positions; triggering of the AP-SRS and configuration of an SRS SF set, the set including only one element and a position corresponding to the element being the SRS SF position; triggering of the AP-SRS and configuration of an SRS SF set, the set including multiple elements and positions corresponding to the multiple elements being successive SRS SF positions; and triggering of the AP-SRS and configuration of an SRS SF set, the set including multiple elements and positions corresponding to the multiple elements being discrete SRS SF positions. For example, "01" may be adopted to represent triggering of the AP-SRS and configuration of an SRS SF; "10" may be adopted to represent triggering of the AP-SRS and configuration of a successive SRS SF set or represent triggering of the AP-SRS and a successive SRS sending SF length; and "11" may be adopted to represent triggering of the AP-SRS and configuration of a discrete SRS SF set. A first SRS SF position is an SF position determined through the SF position for sending of the DCI according to n+k (k>=4 or k>=1), or, the scheduling SF.

The SRS SF position includes at least one of:
a UL SF predetermined by the base station and the UE;
a UL SF determined through the SF position for sending of the DCI signaling according to the timing relationship n+k;
a first UL SF;
a UL SF determined in UL SFs; and
a UL SF indicated or notified through the DCI signaling.

In an embodiment, SF positions corresponding to the elements of the SRS SF set in the field information of the SRS request field in the DCI format 4 are discrete at equal intervals, or discrete at unequal intervals or successive on the time domain. That is, the SF positions corresponding to the elements in the SRS SF set are discrete at equal intervals or discrete clusters at unequal intervals on the time domain. A basic unit of cluster is SF and a size of each cluster may be the same or different. The discrete SF positions may be predetermined by the base station and the UE, or predefined, or configured through a higher layer or explicitly indicated by 11 in the physical-layer DCI. The successive SRS SF length or intervals and sizes of the discrete SRS SFs or SF clusters may be determined in at least one of the following manners: predetermination by the base station and the UE, predefinition, configuration through the higher layer and explicit indication in the physical-layer DCI format 4.

In an embodiment, the field information of the SRS request field in the DCI format 0/1A/2B/2C/2D includes: triggering of the AP-SRS indicated with 1 bit and the SRS SF position or SRS SF set, indicated by a spare field in the DCI format 0/1A/2B/2C/2D, configured to send the SRS.

In an embodiment, the DCI signaling configured to trigger the AP-SRS to be sent is further configured to indicate the SF position for sending the SRS or indicate the SF set for sending the SRS.

In an embodiment, a common DCI format of the DCI format 1C includes one of the following manners.

A first manner: part or all of Y bits of reserved bits in a branch configured to indicate a Licensed Assistance Access (LAA) SF configuration in the DCI format 1C are adopted to indicate SRS information of the SRS to be triggered. For example, a common DCI structure includes totally 20 bits, the first 4 bits are adopted to indicate the LAA SF configuration and part or all of the left 16 bits are adopted for at least one of:
triggering the AP-SRS;
indicating the SRS SF or the SF set; and
scheduling or resource alposition information. If there are left bits, they are set to be reserved.

A second manner: all or part of Q bits in a newly added branch configured to indicate an SRS information configuration in the DCI format 1C or of a newly designed DCI format are adopted to indicate the SRS information of the SRS to be triggered. For example, the format 1C is multiplexed, bits of a first part are adopted to indicate the AP-SRS to be triggered, bits of a second part are adopted for the SRS SF or the SF set, bits of a third part are adopted for at least one of:

indicating or scheduling or the resource alposition information and left bits are set to be reserved.

The Y bits or the Q bits are adopted to indicate the SRS information, including at least one of: an SRS request indication, occupying Y1 or Q1 bits; an SRS SF indication, occupying Y2 or Q2 bits; an SRS symbol position indication, occupying Y3 or Q3 bits; a CCA position indication, occupying Y4 or Q4 bits; an LBT mechanism indication, occupying Y5 or Q5 bits; a Resource Block (RB) indication, occupying Y6 or Q6 bits; a mode switching indication, occupying a Y7 or Q7 bits; a carrier indication, occupying Y8 or Q8 bits; a Transmitted Power Control (TPC) instruction for the PUSCH or a Physical Uplink Control Channel (PUCCH), occupying Y9 or Q9 bits; the SRS period, occupying Y10 or Q10 bits; an offset of the SRS in a UL SF, occupying Y11 or Q11 bits; an SRS SF configuration indication, occupying Y12 or Q12 bits; a CCA symbol number indication, occupying Y13 or Q13 bits; and reservation, occupying Yn or Qn bits, where Y=Y1+Y2+Y3+Y4+Y5+Y6+Y7+Y8+Y9+Y10+Y11+Y12+Y13+Yn, or, Q=Q1+Q2+Q3+Q4+Q5+Q6+Q7+Q8+Q9+Q10+Q11+Q12+Q13+Qn.

In an embodiment, the operation that the SRS is sent according to the determined resource includes that: an SRS sequence is mapped onto corresponding resources according to the frequency-domain position and the transmission comb; or, the SRS is mapped onto a corresponding discrete or successive PUSCH pattern based on a PUSCH pattern. The operation that the SRS is mapped onto the discrete PUSCH pattern based on the PUSCH pattern includes that: the SRS is mapped at intervals of the transmission comb in the discrete PUSCH pattern; or, the SRS is successively mapped on each subcarrier in the discrete PUSCH pattern. Therefore, a mapping rule for the SRS sequence includes that: the SRS sequence is mapped in a frequency-domain resource corresponding to a discrete PUSCH cluster; and the SRS sequence is discretely mapped onto the whole bandwidth according to the transmission comb and a frequency-domain starting position. The operation that the SRS sequence is mapped into the discrete PUSCH cluster includes that: the discrete PUSCH cluster is combined into a successive PUSCH resource and the SRS sequence is mapped onto the combined successive PUSCH resource according to a specific frequency-domain starting point and the transmission comb number. Preferably, a total number of transmission combs for mapping may be 1, 2, 4, 6 and 12.

It is to be noted that, when the SRS and the PUSCH are not simultaneously transmitted, CCA executed for sending of the SRS includes: LBT Cat2; or, an LBT mechanism similar to a Demodulation Reference Signal (DRS or DMRS); or enhanced LBT Cat2.

In an embodiment, the first SRS parameter or parameter set or the second parameter or parameter set further includes at least one of the following parameters: an LBT type for LBT for execution of CCA, an SRS symbol position configured to send the SRS, a CCA position for execution of CCA before the SRS is sent, a CCA position for execution of CCA before the PUSCH is sent, a sending times for sending of the SRS, an SRS sending stopping resource stopping sending the SRS and an unlicensed carrier identifier of the unlicensed carrier configured to send the SRS.

In an embodiment, responsive to that the one or more antenna ports refer to a single antenna port, a relationship among the single antenna port, the frequency-domain position configured to send the SRS and the SRS SF configured to send the SRS includes one of that: the single antenna port corresponds to transmission of the SRS at an even transmission comb position and corresponds to an SRS SF; the single antenna port corresponds to transmission of the SRS at an odd transmission comb position and corresponds to an SRS SF; the single antenna port corresponds to transmission of the SRS at the even transmission comb position and corresponds to multiple SRS SFs; and the single antenna port corresponds to transmission of the SRS at the odd transmission comb position and corresponds to multiple SRS SFs.

In an embodiment, responsive to that the one or more antenna ports refer to two antenna ports, a relationship among the two antenna ports, the frequency-domain position configured to send the SRS and the SRS SF configured to send the SRS includes one of that: the even antenna port corresponds to transmission of the SRS at the even transmission comb position, corresponds to an even cyclic shift and corresponds to transmission of the SRS on an even UL SF; the even antenna port corresponds to transmission of the SRS at the even transmission comb position, corresponds to the even cyclic shift and corresponds to transmission of the SRS on an odd UL SF; the even antenna port corresponds to transmission of the SRS at the even transmission comb position, corresponds to an odd cyclic shift and corresponds to transmission of the SRS on the even UL SF; the even antenna port corresponds to transmission of the SRS at the even transmission comb position, corresponds to the odd cyclic shift and corresponds to transmission of the SRS on the odd UL SF; the odd antenna port corresponds to transmission of the SRS at the odd transmission comb position, corresponds to the even cyclic shift and corresponds to transmission of the SRS on the even UL SF; the odd antenna port corresponds to transmission of the SRS at the odd transmission comb position, corresponds to the even cyclic shift and corresponds to transmission of the SRS on the odd UL SF; the odd antenna port corresponds to transmission of the SRS at the odd transmission comb position, corresponds to the odd cyclic shift and corresponds to transmission of the SRS on the even UL SF; and the odd antenna port corresponds to transmission of the SRS at the odd transmission comb position, corresponds to the odd cyclic shift and corresponds to transmission of the SRS on the odd UL SF.

In an embodiment, the LBT mechanism includes one of: the LBT Cat2, LBT Cat4, the enhanced LBT Cat2 where a starting point for execution of CCA is randomly selected in a predetermined interval or an LBT manner adopted for sending of the DRS. A CCA duration of the LBT Cat2 may be 16 us, or 25 us or 34 us. A maximum contention window of the LBT Cat4 is one of a set $\{1, 2, 3\}$ or $\{3, 4, 5, 6, 7\}$. A defer period of the LBT Cat4 is formed by 16 us+n*slot, where n is 0 or 1 and slot is 9 us. The starting point for CCA in the enhanced LBT Cat2 is randomly selected in a certain interval.

In an embodiment, the SRS symbol position includes at least one of: a last symbol in the SF; a first symbol in the SF; a second symbol in the SF; a second last symbol in the SF; a last symbol of a first half time slot in the SF; a first symbol of a second half time slot in the SF; a fourth symbol of the first half time slot in the SF; a fourth symbol of the second half time slot in the SF; a second last symbol in a partial SF at the end of downlink transmission; one or more symbol positions in an Uplink Pilot Time Slot (UpPTS) in a special SF; one or more symbol positions in a Guard Period (GP) in the special SF; and one or more symbol positions at the end of a Downlink Pilot Time Slot (DwPTS) in the special SF.

In an embodiment, the CCA position for execution of CCA before the SRS is sent includes at least one of: the first symbol of the SRS SF; the second last symbol of the SRS SF; the last symbol of the SRS SF; a last symbol of a previous SF of the SRS SF; symbols before the SRS symbol; and a symbol before the SRS symbol.

In an embodiment, the CCA position for execution of CCA before the SRS is sent includes at least one of: a last symbol of a previous SF of the scheduling SF; a first symbol in the scheduling SF; and the last symbol of the previous SF of the scheduling SF and the first symbol in the scheduling SF. Or, the position for CCA is not limited.

Second Embodiment

Figure 2:
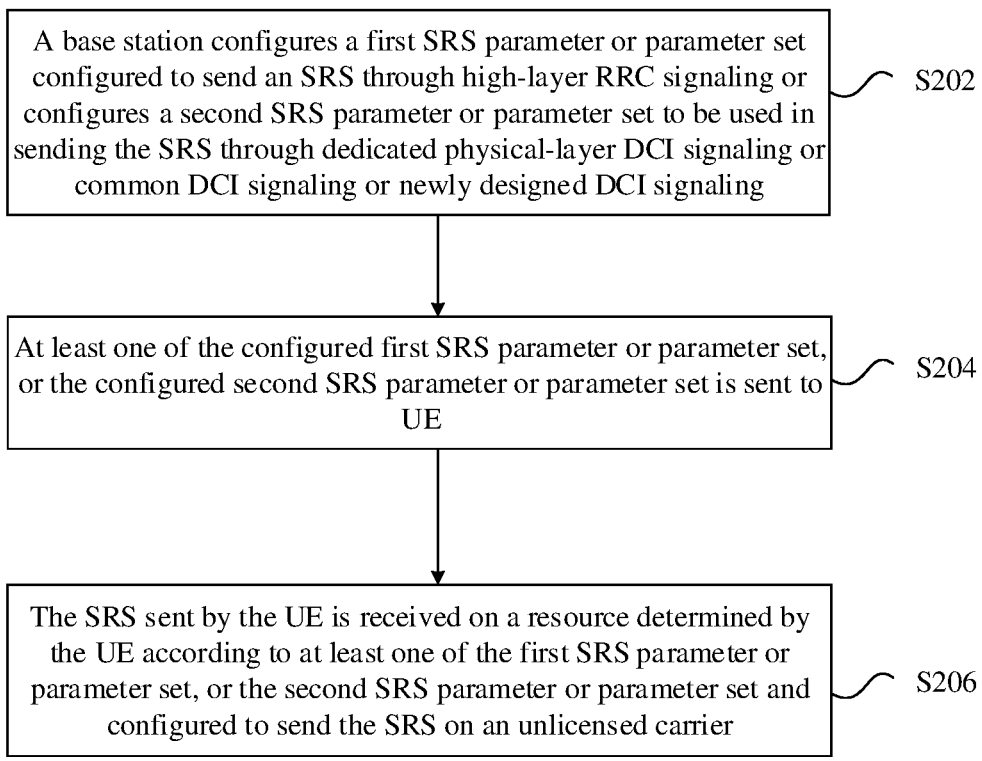
FIG. 2 is a flowchart of an SRS receiving method according to an embodiment of the disclosure.

Corresponding to a UE side, a corresponding SRS receiving method for a base station side is also provided. FIG. 2 is a flowchart of an SRS receiving method according to an embodiment of the disclosure. As shown in FIG. 2, the flow includes the following steps.

In S202, a base station configures a first SRS parameter or parameter set configured to send an SRS through high-layer RRC signaling or configures a second SRS parameter or parameter set to be used in sending the SRS through dedicated physical-layer DCI signaling or common DCI signaling or newly designed DCI signaling.

In S204, at least one of the configured first SRS parameter or parameter set and the configured second SRS parameter or parameter set is sent to UE.

In S206, the SRS sent by the UE is received on a resource determined by the UE according to at least one of the first SRS parameter or parameter set and the second SRS parameter or parameter set and configured to send the SRS on an unlicensed carrier.

By the steps, the SRS is received on the resource determined according to the SRS parameter or parameter set configured by the high-layer signaling or the physical-layer signaling to send the SRS, which, compared with the related art where no configuration is made for reception of the SRS on the unlicensed carrier, not only solves the problem of few transmission opportunities for transmission of the SRS on the unlicensed carrier in the related art but also further achieves the effect of increasing transmission opportunities for transmission of the SRS on the unlicensed carrier.

In an embodiment, the first SRS parameter or parameter set or the second SRS parameter or parameter set includes at least one of: a cell-level bandwidth, a UE-level bandwidth, a period, an offset, a frequency-domain position, a first transmission comb, a cyclic shift, a transmission comb number, an antenna port and an SRS SF position or SRS SF set configured to send the SRS.

In an embodiment, the operation that the second SRS parameter or parameter set to be used in sending the SRS is configured through the dedicated DCI signaling or the common DCI signaling or the newly designed DCI signaling includes at least one of the following manners.

A first manner: at least one of the SF position for sending the SRS and SRS SF set is indicated through the dedicated DCI signaling or common DCI signaling or newly designed DCI signaling sent by the base station and an SRS SF configured to send the SRS is configured.

A second manner: the SRS SF is configured according to an SF index n for sending of the dedicated DCI signaling or common DCI signaling or newly designed DCI signaling sent by the base station and a predetermined timing relationship.

A third manner: the SRS SF is configured in a manner of predetermination or implicit indication by the base station and the UE.

In the first manner, the operation that the SF position for sending the SRS is indicated through dedicated DCI or the common DCI signaling or the newly designed DCI signaling includes at least one of the following operations: one SRS sending SF position is indicated through the dedicated DCI signaling or the common DCI signaling or the newly designed DCI signaling; multiple successive SF positions for the SRS are indicated through the dedicated DCI signaling or the common DCI signaling or the newly designed DCI signaling; multiple discrete SF positions for the SRS are indicated through the dedicated DCI signaling or the common DCI signaling or the newly designed DCI signaling; and a SF at an end of downlink transmission is indicated through the dedicated DCI signaling or the common DCI signaling or the newly designed DCI signaling.

In the first manner, the operation that the SF set for sending the SRS is indicated through the dedicated DCI signaling or the common DCI signaling or the newly designed DCI signaling includes that:

the SRS SF set is indicated according to the dedicated DCI signaling or the common DCI signaling or the newly designed DCI signaling and an SF position corresponding to an element in the SRS SF set is the SRS SF position, a total number of elements in the SRS SF set being at least one.

In the second manner, the predetermined timing relationship is n+k, where k represents an integer equal to or greater than 4 or an integer equal to or greater than 1 and n represents an SF index for sending of the dedicated DCI signaling or the common DCI signaling or the newly designed DCI signaling.

In the third manner, determining the SRS SF position in a manner of predetermination or implicit indication by the base station and the UE includes at least one of: a first UL SF in a UL transmission burst; a first SF having an even SF index in the UL transmission burst; a first SF having an odd SF index in the UL transmission burst; SFs each having an even SF index in the UL transmission burst; SFs each having an odd SF index in the UL transmission burst; a scheduling SF; SFs corresponding to multiple successive SFs starting from a position of a scheduling SF; SFs corresponding to multiple discrete SFs starting from a position of a scheduling SF; a first SF after an end of downlink transmission; a SF at an end of downlink transmission; a first UL SF; SFs corresponding to s successive UL SFs starting from the first UL SF; corresponding SFs spaced by u SFs from a wth UL SF; a first UL SF after successful LBT; and an rth UL SF, where w is equal to or greater than 1 but smaller than a total number of SFs in the UL transmission burst or smaller than a total number of successive SFs scheduled by the UE; u is equal to or greater than 0 and less than or equal to a total number of the SFs in the UL transmission burst or smaller than a total number of the successive SFs scheduled by the UE; and r is equal to or greater than 1 but smaller than a total number of the SFs in the UL transmission burst or smaller than a total number of the successive SFs scheduled by the UE.

In an embodiment, the operation that the second SRS parameter or parameter set configured to send the AP-SRS is configured through the dedicated physical-layer DCI signaling or the common DCI signaling or the newly designed DCI signaling includes that: the AP-SRS is triggered to be sent in one of the following manners: the AP-SRS is triggered to be sent through an SRS request field in a DCI format 0/4/1A/2B/2C/2D; the AP-SRS is triggered to be sent through common DCI in a DCI format 1C; and the AP-SRS is triggered to be sent through a newly defined DCI format.

In an embodiment, field information of the SRS request field in the DCI format 4 includes one of the following information indicated with 2 bits: triggering of no AP-SRS; triggering of the AP-SRS and configuration of an SRS SF position; triggering of the AP-SRS and configuration of successive SRS SF positions; triggering of the AP-SRS and configuration of discrete SRS SF positions; triggering of the AP-SRS and configuration of an SRS SF set, the set including only one element and a position corresponding to the element being the SRS SF position; triggering of the AP-SRS and configuration of an SRS SF set, the set including multiple elements and positions corresponding to the multiple elements being successive SRS SF positions; and triggering of the AP-SRS and configuration of an SRS SF set, the set including multiple elements and positions corresponding to the multiple elements being discrete SRS SF positions.

In an embodiment, the field information of the SRS request field in the DCI format 0/1A/2B/2C/2D includes: triggering of the AP-SRS indicated with 1 bit and the SRS SF position or SRS SF set, indicated by a spare field in the DCI format 0/1A/2B/2C/2D, configured to send the SRS.

In an embodiment, a common DCI format of the DCI format 1C includes one of that: part or all of Y bits of reserved bits in a branch configured to indicate an LAA SF configuration in the DCI format 1C are adopted to indicate SRS information of the SRS to be triggered; and all or part of Q bits in a newly added branch configured to indicate an SRS information configuration in the DCI format 1C or of a newly designed DCI format are adopted to indicate the SRS information of the SRS to be triggered.

In an embodiment, the Y bits or the Q bits are adopted to indicate the SRS information, including at least one of: an SRS request indication, occupying Y1 or Q1 bits; an SRS SF indication, occupying Y2 or Q2 bits; an SRS symbol position indication, occupying Y3 or Q3 bits; a CCA position indication, occupying Y4 or Q4 bits; an LBT mechanism indication, occupying Y5 or Q5 bits; an RB indication, occupying Y6 or Q6 bits; a mode switching indication, occupying a Y7 or Q7 bits; a carrier indication, occupying Y8 or Q8 bits; a Transmitted Power Control (TPC) instruction for the PUSCH or a Physical Uplink Control Channel (PUCCH), occupying Y9 or Q9 bits; the SRS period, occupying Y10 or Q10 bits; an offset of the SRS in a UL SF, occupying Y11 or Q11 bits; an SRS SF configuration indication, occupying Y12 or Q12 bits; a CCA symbol number indication, occupying Y13 or Q13 bits; and reservation, occupying Yn or Qn bits, where Y=Y1+Y2+Y3+Y4+Y5+Y6+Y7+Y8+Y9+Y10+Y11+Y12+Y13+Yn, or, Q=Q1+Q2+Q3+Q4+Q5+Q6+Q7+Q8+Q9+Q10+Q11+Q12+Q13+Qn.

In an embodiment, the first SRS parameter or parameter set or the second SRS parameter or parameter set further includes at least one of the following parameters: an LBT type for LBT for execution of CCA, an SRS symbol position configured to send the SRS, a CCA position for execution of CCA before the SRS is sent, a CCA position for execution of CCA before the PUSCH is sent, a sending times for sending of the SRS, an SRS sending stopping resource stopping sending the SRS and an unlicensed carrier identifier of the unlicensed carrier configured to send the SRS.

Preferred embodiments of the disclosure will be described below in combination with the abovementioned embodiments and in combination with specific scenarios.

Before the preferred embodiments of the disclosure are described, involved basic technologies of the art will be briefly introduced.

A UL SRS is a signal sent to a base station by UE and a content of the signal is known to the UE and the base station. After receiving the SRS, the base station may measure a wireless channel between the UE and the base station, thereby obtaining wireless Channel State Information (CSI).

In an LTE system, SRSs are divided into Periodic SRSs (P-SRSs) and AP-SRSs. Once a P-SRS is enabled, the UE may periodically keep sending the SRS to the base station until being terminated. While for an AP-SRS, after an SRS parameter is configured, it is not sent, the base station with a channel state measurement requirement triggers the SRS through DCI and the UE, after receiving the DCI sent by the base station, sends the AP-SRS once or for many times.

In the related art, various regulatory requirements are involved in transmission of an SRS on an unlicensed carrier. 1: for the characteristic of a flexible UL/downlink SF structure that LBT is required to be executed before transmission with a transmission device on the unlicensed carrier, SRS transmission is limited to a certain extent according to an existing SRS SF configuration. 2: it is specified in a related protocol that an SRS parameter is configured by high-layer RRC and transmission of an AP-SRS is triggered by a physical layer through DCI and, in combination with a frame structure characteristic of an SF3 and LBT, a triggering mechanism in the related art has a certain limitation to a certain extent, so that the triggering mechanism for SRS transmission is required to be modified or enhanced. 3: from an SRS bandwidth configuration in the related art, it can be seen that bandwidths occupied by some SRSs do not meet a requirement of over 80% of a bandwidth on the unlicensed carrier, so that, for meeting the regulatory requirement, it is necessary to design a new SRS waveform or a method for extending the SRSs to over 80% of the whole bandwidth. 4: a single transmission device is required to meet a regulatory requirement that a transmission duration is at least 1 ms, and if UE1 only sends an SRS and UE2 has a PUSCH requirement, the UE1, for meeting the regulatory requirement, is required to fill 1 ms with information besides an SRS symbol, which may bring influence to PUSCH transmission of the UE2, so that it is necessary to solve the problem of transmission interference between the UE1 and the UE2. 5: when UE all has no PUSCH transmission requirement but an SRS sending requirement, only 1 or 2 symbols are occupied by SRS symbol transmission, which may not meet the 1 ms regulatory requirement, and thus it is necessary to solve the problem of the 1 ms regulatory requirement, design a filling information and SRS transmission time-frequency sample in 1 ms and meet the requirement of over 80% of the bandwidth. Thus it can be seen that various regulatory requirements in the related art limit sending opportunities of the SRS in the unlicensed carrier to a certain extent, independent SRS transmission (i.e., asynchronous transmission of the SRS and the PUSCH) may not be triggered and supported well and the bandwidth requirement and the requirement of transmission for at least 1 ms in the regulatory requirements may not be met. In view of this, the embodiments provide an SRS transmission method. Therefore, more flexible transmission opportunities are provided for SRS transmission on an unlicensed carrier, the regulatory requirements on the bandwidth on the unlicensed carrier and a minimum transmission duration are met and UL transmission timing, prescheduled signal measurement and CSI acquisition of presently inactive UE are ensured to a certain extent. Specific descriptions will be made below.

In the related art, an SRS parameter is configured by high-layer RRC. The SRS parameter mainly includes:

a cell-specific parameter: a bandwidth $C_{SRS}$, an SF configuration $I_{SRS}$, a parameter about whether to simultaneously send an Acknowledgment (ACK)/Negative Acknowledgment (NACK) and an SRS or not and a maximum UpPTS parameter; and a UE-specific parameter: a bandwidth $B_{SRS}$, a frequency hopping bandwidth $b_{hop}$, a frequency-domain position $n_{RRC}$, a duration, an identifier $I_{SRS}$ (corresponding to a period $T_{SRS}$ and an SF offset $T_{offset}$ in the period), a transmission comb $\overline{K}_{TC}$, a cyclic shift $n_{SRS}^{cs}$, a transmission comb number $K_{TC}$ and an antenna port number $N_{ap}$. For an AP-SRS, the UE-specific parameter does not include the duration and the frequency hopping bandwidth $b_{hop}$ and the other parameters are the same as P-SRS parameters. Details about value ranges of the parameters refer to Table 1 and Table 2.

The SRS parameter is as follows.

The cell-specific configuration parameter includes the following parameters.

TABLE 1

| Parameter | Meaning |
| --- | --- |
| srs-BandwidthConfig | bandwidth configuration $C_{SRS}$ with a value range [0, 7] |
| srs-SubframeConfig | SF configuration $I_{SRS}$ with a value range [0, 15] |
| ackNackSRS-SimultaneousTransmission | whether the ACK/NACK and the SRS are simultaneously sent or not |
| srs-MaxUpPts | $m_{SRS,0}^{max}$ about whether an UpPTS is reconfigured or not |

A UE-specific parameter configuration includes the following parameters.

TABLE 2

| Parameter | Meaning |
| --- | --- |
| srs-Bandwidth | bandwidth $B_{SRS}$ with a value range [0, 3] |
| srs-HoppingBandwidth | frequency-hopping bandwidth $b_{hop}$ with a value range [0, 3] |
| freqDomainPosition | frequency-domain position $n_{RRC}$ |
| duration | configured to indicate whether UE sends an SRS only once (the duration is 0 or false) or infinitely sends the P-SRS (the duration is 1 or true), the parameter existing only for the P-SRS |
| srs-ConfigIndex | identified with $I_{SRS}$ and configured to indicate a report period $T_{SRS}$ of the P-SRS and an SF offset $T_{offset}$ in the period |
| transmissionComb | transmission comb $\overline{K}_{TC}$ with a value range [0, 1] or [0, 3] |
| cyclicShift | cyclic shift $n_{SRS}^{cs}$ with a value range [0, 7] or [0, 11] |
| transmissionCombNum | transmission comb number $K_{TC}$ valued to be 2 or 4 |
| srs-AntennaPort | antenna port number $N_{ap}$ valued to be 1, 2 and 4 |

Notes: in the UE parameter configuration, AP-SRS parameters are substantially the same as P-SRS parameters but the AP-SRS parameters do not include the duration and the frequency hopping bandwidth srs-Hopping Band width.

For a P-SRS, after the SRS parameter or a parameter set is configured by a higher layer, UE sends an SRS on a corresponding SRS periodic point. For an AP-SRS, after dedicated DCI signaling sent by a base station is received and if a corresponding SRS request field in DCI indicates the AP-SRS to be sent, the UE sends the SRS on an SRS SF after reception of the DCI.

In the related protocol, an SRS sending symbol position in the SF is: a last symbol in a UL SF, or a last symbol in the SRS periodic point, or one or two symbols or multiple symbols in an UpPTS in a special SF, or one or more symbols in a GP in the special SF, or one or more symbols in a DwPTS in the special SF. The SRS periodic point is an SRS SF position determined through the SRS period and the SF offset in the period.

For LAA, the sending position of the SRS further includes, besides the positions specified in the related protocol: when a last partial SF appears at the end of downlink transmission, a specific position in left symbols in the SF; or a spare symbol position in a DRS during downlink transmission; or last one or two symbol positions in a DRS transmission period or a DRS SF; or a next symbol of a CCA position; or a next symbol after a PUSCH position; or a next or previous symbol of a PUCCH sending position; or a next or previous symbol of a Physical Random Access Channel (PRACH); or a DMRS symbol position.

The specific position may be a first symbol, or last symbol, or second symbol or second last symbol in left symbols in a downlink partial SF or any symbol in the left symbols.

At least one of the specific SRS symbol position, the SF position for sending the SRS and SRS SF set position may be configured by high-layer RRC, or predetermined by the base station and the UE, or indicated through dedicated physical-layer DCI, or indicated through common physical-layer DCI, or indicated through newly designed physical-layer DCI or determined according to an SF position for sending of the DCI and according to a specific timing relationship. The specific timing relationship may be n+k, where n is an SF sending the DCI and k represents an integer equal to or greater than 4 or k represents an integer equal to or greater than 1.

In the following embodiments, an SRS transmission method is provided mainly in combination with an LAA characteristic (the LAA characteristic is that LBT is required to be executed and a UL or downlink transmission SF position is unfixed according to a UL or downlink service state). An SRS parameter under an LAA system, an SRS parameter configuration method, an AP-SRS triggering manner, a design meeting the regulatory requirement that single UE transmits for at least 1 ms and meeting the requirement that at least 80% of a bandwidth is occupied for independent SRS transmission and a design of a relationship between multiple antenna ports and an SRS time/frequency-domain transmission pattern are specifically involved.

First Optional Embodiment

The embodiment provides a method for transmitting a P-SRS on an unlicensed carrier. There is made such a hypothesis that an SRS parameter or parameter set is the same as a content in an existing LTE protocol. The SRS parameter or parameter set includes at least one of: a cell-level bandwidth $C_{SRS}$, a cell SF configuration $I_{SRS}$, a UE-level bandwidth $B_{SRS}$, a frequency hopping bandwidth $b_{hop}$, a frequency-domain position $n_{RRC}$, a duration, a UE-level identifier $I_{SRS}$ (corresponding to a period $T_{SRS}$ and an SF offset $T_{offset}$ in the period), a transmission comb $\overline{K}_{TC}$, a cyclic shift $n_{SRS}^{cs}$, a transmission comb number $K_{TC}$ and an antenna port number $N_{ap}$.

For LAA, under a frame structure 3 (a radio frame includes downlink SFs only as a default and UL transmission may be performed only when UE receives a corresponding indication or signaling), because of different UL and downlink traffic and an LBT result, a UL transmission position is unfixed.

On such a basis, according to an SRS parameter configuration manner specified in existing LTE, the UE may send an SRS only under the following conditions.

A first condition: no matter whether there is a PUSCH on an SRS periodic point, the UE may send the SRS. The SRS periodic point refers to an SF position determined through the period and SF offset in the period corresponding to an SF configuration parameter in the SRS parameter set. Whether the UE may send the SRS on the SRS periodic point or not is determined by at least one of:

an LBT result of the UE before the SRS periodic point; and whether the SRS periodic point is a UL SF in LAA or not.

If the UE successfully contends for an access right over the unlicensed carrier before the SRS periodic point, no matter whether there is a PUSCH on an SRS SF or not, the UE sends the SRS. If the UE fails to contend for the access right over the unlicensed carrier before the SRS periodic point, the SRS is not sent on the present SRS periodic point. On a next SRS periodic point, if the UE successfully contends for the access right over the unlicensed carrier before the SRS periodic point, similarly, no matter whether there is a PUSCH on the SRS SF or not, the UE sends the SRS. If contention for the access right over the unlicensed carrier fails, contention for the access right over the unlicensed carrier is continued to be executed before a next SRS periodic point by the same method. If the UE is intended to send the SRS and only when the UE successfully contends for the access right over the unlicensed carrier next time and an SRS periodic point exists in an occupancy period of the UE, the UE may send the SRS. Or, if the UE is intended to send the SRS and only when the UE successfully contends for the access right over the unlicensed carrier before an SRS periodic point next time, the UE may send the SRS.

A second condition: when there is a PUSCH on the SRS periodic point, the UE may send the SRS. Whether the UE may send the SRS on the SRS periodic point or not is determined by at least one of:

an LBT result of the UE before the SRS periodic point; and whether the SRS periodic point is a UL SF in LAA or not; and whether the PUSCH exists on the SRS periodic point.

In a UL transmission burst or UL transmission period, when the UE successfully contends for the access right over the unlicensed carrier before the SRS periodic point and there is a PUSCH on the SRS periodic point, the UE may send the SRS. When the UE successfully contends for the access right over the unlicensed carrier before the SRS periodic point but there is no PUSCH on the SRS periodic point, the UE, even though successfully contending for the access right over the unlicensed carrier, may not send the SRS on the SRS periodic point. When the UE fails to contend for the access right over the unlicensed carrier before the SRS periodic point but there is a PUSCH on the SRS periodic point, the UE may not send the PUSCH and the SRS on the periodic point. The UE may try to contend for the access right over the unlicensed carrier before a next SRS periodic point. If the UE successfully contends for the access right over the unlicensed carrier before the SRS periodic point and there is a PUSCH on the SRS periodic point, the UE may send the SRS. On the contrary, the operations are repeated. If the UE is intended to send the SRS and only when the UE successfully contends for the access right over the unlicensed carrier next time, an SRS periodic point exists in the occupancy period of the UE and an own PUSCH exists on the SRS periodic point, the UE may send the SRS. Or, if the UE is intended to send the SRS and only when the UE successfully contends for the access right over the unlicensed carrier before an SRS periodic point next time and the own PUSCH exists on the SRS periodic point, the UE may send the SRS.

The PUSCH existing on the SRS periodic point includes the PUSCH of the UE and a PUSCH of other UE.

In other words:

if there is right an SRS periodic point during UL transmission in the present transmission burst and there is also the PUSCH of the UE or the PUSCH of the other UE on the periodic point, the UE successfully contending for the access right over the unlicensed carrier before the SRS periodic point may transmit the SRS.

If there is right the SRS periodic point during UL transmission in the present transmission burst and there is also the PUSCH of the UE or the PUSCH of the other UE on the periodic point, the UE failing to contend for the access right over the unlicensed carrier before the SRS periodic point may not transmit the SRS.

If there is right the SRS periodic point during UL transmission in the present transmission burst and there is no PUSCH of the UE or no PUSCH of the other UE on the periodic point, the UE, even though successfully contending for the access right over the unlicensed carrier before the SRS periodic point, may not transmit the SRS.

If there is no SRS periodic point but the PUSCH of the UE or the PUSCH of the other UE during UL transmission in the present transmission burst, the UE successfully contends for the access right over the unlicensed carrier before PUSCH transmission and the UE may only transmit the PUSCH and may not send the SRS.

A third condition: when there is the PUSCH of the other UE on the SRS periodic point, the UE may send the SRS.

For the third condition, from the angle of the UL burst, if a UL SF is the SRS periodic point and the PUSCH of the other UE is scheduled on the SF, the UE may send the SRS as long as successfully contending for the access right over the unlicensed carrier before the SRS periodic point. If the UL SF is the SRS periodic point and no PUSCH of any piece of UE is scheduled on the SF, the UE, even though successfully contending for the access right over the unlicensed carrier, may not send the SRS. If the UE fails to contend for the access right over the unlicensed carrier before the SRS periodic point, the UE may not send the SRS on the SRS periodic point. In addition, if there is no SRS periodic point in the UL burst, the UE, even though successfully contending for the access right over the unlicensed carrier, may not send the SRS. If the UE is intended to send the SRS and only when the UE successfully contends for the access right over the unlicensed carrier next time, an SRS periodic point exists in the occupancy period of the UE and the PUSCH of the other UE exists on the SRS periodic point, the UE may send the SRS. Or, if the UE is intended to send the SRS and only when the UE successfully contends for the access right over the unlicensed carrier before an SRS periodic point next time and the PUSCH of the other UE exists on the SRS periodic point, the UE may send the SRS.

A fourth condition: when there is no PUSCH transmitted on the SRS periodic point, the UE may send the SRS.

For the fourth condition, from the angle of the UL burst, if the UL SF is the SRS periodic point and no PUSCH of any piece of UE is scheduled on the SF, the UE may send the SRS on the SRS periodic point as long as successfully contending for the access right over the unlicensed carrier. On the contrary, if the UE fails to contend for the access right over the unlicensed carrier before the SRS periodic point, the UE may not send the SRS on the SRS periodic point. If the UE is intended to send the SRS and only when the UE successfully contends for the access right over the unlicensed carrier next time and the SRS periodic point exists in the occupancy period of the UE, the UE may send the SRS. Or, if the UE is intended to send the SRS and only when the UE successfully contends for the access right over the unlicensed carrier before an SRS periodic point next time, the UE may send the SRS. If there is no SRS periodic point in the UL burst, the UE, even though successfully contending for the access right over the unlicensed carrier, may not send the SRS.

A position for LBT required to be executed for sending of the SRS is before an SRS symbol and may be last one or more symbols of a previous SF of the SRS SF, or first one or more symbols in the SRS SF, or one or more symbols before the SRS symbol in the SRS SF, or a last symbol in a PUSCH SF, or a first symbol in the PUSCH SF, or a second last symbol in the PUSCH SF, or a last symbol in the PUSCH, or a first symbol in the PUSCH or a second last symbol in the PUSCH.

The abovementioned conditions will be described below with examples.

Figure 3:
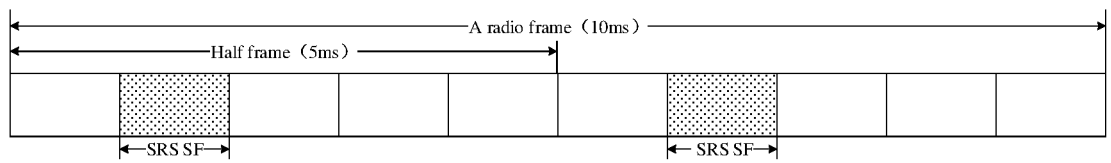
FIG. 3 is a schematic diagram of SRS SubFrame (SF) positions according to an embodiment of the disclosure.

There is made such a hypothesis that a system bandwidth is 20 MHz (20 MHz is equivalent to 100 Physical Resource Blocks (PRBs) and also equivalent to 1,200 subcarriers), an appearance period of SRS SFs is 5 ms and an offset in the period is 1. An SRS periodic point in a radio frame is shown in FIG. 3. FIG. 3 is a schematic diagram of SRS SF positions under the condition that a period is 5 ms and an offset is 1 in a Time Division Duplex (TDD) structure according to an embodiment of the disclosure. If the base station successfully contends for the unlicensed carrier in an SF 1 (SF indexes in a radio frame start from 0) in a radio frame, downlink data is started to be transmitted and a duration when a channel is occupied once is 8 ms. According to downlink traffic, the base station completes downlink transmission on an SF 5. Then, the UE receives indication information sent by the base station and may perform UL transmission. In such case, an SF 6 is right an SRS periodic point. Based on the above descriptions, in combination with the four conditions, for the first condition, if the UE successfully contends for the access right over the unlicensed carrier before the end of downlink transmission, before UL transmission or before the SRS periodic point (the SF 6) or before an SRS symbol on the SRS periodic point, no matter whether there is the PUSCH of the UE on the SRS periodic point or the SF 6 or not, the UE may send the SRS. On the contrary, if the UE fails to contend for the access right over the unlicensed carrier before UL transmission or before the SRS periodic point (the SF 6) or before the SRS symbol on the SRS periodic point, no matter whether there is the PUSCH of the UE on the SRS periodic point or the SF 6 or not, the UE may not send the SRS. For the second condition, only when the UE has the PUSCH on the SRS periodic point or the SF 6 or is scheduled on the SF 6 or the SRS periodic point, the UE successfully contending for the access right over the unlicensed carrier before the SRS periodic point (the SF 6) may send the SRS on the SRS periodic point. On the contrary, if the UE fails to contend for the access right over the unlicensed carrier before the SRS periodic point (the SF 6), the UE may not send the SRS on the SRS periodic point. For the third condition, if UE1 has no PUSCH transmitted on the SRS periodic point (i.e., the SF 6) but other UE (for example, UE2) is scheduled on the SF 6, no matter whether the UE2 has an SRS sending requirement, the UE1 may send the SRS at an SRS symbol position on the SRS periodic point as long as successfully contending for the access right over the unlicensed carrier before the SRS periodic point (i.e., the SF 6) or the SRS symbol position on the SRS periodic point. If the UE has the SRS sending requirement, the UE1 and the UE2 send SRSs in a multiplexing manner in the same symbol according to different combs or different cyclic shifts. On the contrary, if the UE1 fails to contend for the access right over the unlicensed carrier before the SRS periodic point (i.e., the SF 6) or the SRS symbol position on the SRS periodic point, the SRS may not be sent at the SRS symbol position on the SRS periodic point. The fourth condition is an independent SRS transmission condition. If there is no PUSCH of the UE and a PUSCH of other UE in the SRS periodic point (i.e., the SF 6), the UE may send the SRS at the SRS symbol position on the SRS periodic point as long as successfully contending for the access right over the unlicensed carrier before the SRS periodic point or before the SRS symbol in the SRS periodic point. On the contrary, if contention for the access right over the unlicensed carrier fails, the SRS may not be sent at the SRS symbol position on the SRS periodic point.

If the UE fails to contend for the access right over the unlicensed carrier on the present SRS periodic point and no SRS is sent, the UE may send the SRS as long as meeting one of the four conditions on a next SRS periodic point.

If there is included or right no SRS periodic point in the UL transmission period, the UE may not send the SRS.

Second Optional Embodiment

The embodiment provides a method for transmitting an AP-SRS on an unlicensed carrier.

There is made such a hypothesis that an SRS parameter or parameter set is the same as a content in an existing LTE protocol. The SRS parameter or parameter set includes at least one of: a cell-level bandwidth $C_{SRS}$, a cell SF configuration $I_{SRS}$, a UE-level bandwidth $B_{SRS}$, a frequency hopping bandwidth $b_{hop}$, a frequency-domain position $n_{RRC}$, a duration, a UE-level identifier $I_{SRS}$ (corresponding to a period $T_{SRS}$ and an SF offset $T_{offset}$ in the period), a transmission comb $\overline{K}_{TC}$ a cyclic shift $n_{SRS}^{cs}$, a transmission comb number $K_{TC}$ and an antenna port number $N_{ap}$.

A difference between the second embodiment and the first embodiment is that UE may transmit an SRS according to four conditions in the first embodiment only after receiving AP-SRS triggering signaling sent by a base station. Triggering the AP-SRS be sent may be notified or configured through dedicated physical-layer DCI signaling, or common physical-layer DCI signaling, or newly designed physical-layer DCI format signaling or a high-layer RRC signaling.

That is, after the UE receives the triggering signaling, the UE may transmit the SRS according to one of the following conditions.

A first condition: during UL transmission, if there is an SRS periodic point and no matter there is a PUSCH on the SRS periodic point or not, the UE may send the SRS. The condition that whether there is a PUSCH on the SRS periodic point or not includes three conditions: there is the PUSCH of the UE on the SRS periodic point, or there is a PUSCH of other UE or there is no PUSCH of any piece of UE.

The SRS periodic point refers to an SF position determined through the period and SF offset in the period corresponding to an SF configuration parameter in the SRS parameter set. Whether the UE may send the SRS on the SRS periodic point or not is determined by at least one of:

an LBT result of the UE before the SRS periodic point; and whether the SRS periodic point is a UL SF in LAA or not; and whether the AP-SRS is triggered or not. The SRS parameter or parameter set may be notified or configured through the dedicated physical-layer DCI signaling, or the common physical-layer DCI signaling, or the newly designed physical-layer DCI format signaling or the high-layer RRC signaling.

There is made such a hypothesis that the base station sends the DCI signaling on an SF n to trigger the UE to send the AP-SRS. The UE contends for an access right over the unlicensed carrier on a first SRS periodic point after reception of the triggering signaling. If the UE successfully contends for the access right over the unlicensed carrier before the SRS periodic point, no matter whether a PUSCH exists on the SRS SF or not, the UE sends the SRS. If the UE fails to contend for the access right over the unlicensed carrier before the SRS periodic point, the SRS is not sent on the present SRS periodic point. On a next SRS periodic point (in such case, it may be considered that the triggering signaling may still be valid on at least one of a first SRS period and one or more subsequent SRS SFs after reception of triggering information and the base station is not required to resend the triggering information) or when the base station triggers sending of the AP-SRS one more time, if the UE successfully contends for the access right over the unlicensed carrier before the SRS periodic point (the SRS periodic point may be a second SRS periodic point after the UE is triggered for the first time or a first SRS periodic point after DCI retriggering), similarly, no matter whether a PUSCH exists on the SRS SF or not, the UE sends the SRS. If contention for the access right over the unlicensed carrier fails, contention for the access right over the unlicensed carrier is continued to be executed before a next SRS periodic point by the same method. If the UE is intended to send the SRS and only when the UE successfully contends for the access right over the unlicensed carrier next time and the SRS periodic point exists in an occupancy period of the UE, the UE may send the SRS. Or, if the UE is intended to send the SRS and only when the UE successfully contends for the access right over the unlicensed carrier before an SRS periodic point next time, the UE may send the SRS. If there is no SRS periodic point after the UE is triggered to transmit the AP-SRS, even though the UE successfully contends for the unlicensed carrier, the UE may not send the SRS.

If the UE fails to contend for the access right over the unlicensed carrier on the first SRS periodic point after the AP-SRS is triggered to be transmitted or before the SRS periodic point, the SRS may not be transmitted. Or, if the base station indicates that a channel is presently occupied by UE of the same cell or the same operating company, the UE may not execute LBT or the UE, even though knowing that LBT may fail, may also transmit the SRS on the SF or the periodic point.

A second condition: during UL transmission, if there is an SRS periodic point and only when there is a PUSCH on the SRS periodic point, the UE may send the SRS.

A difference from the first condition is that, if the UE successfully contends for the access right over the unlicensed carrier on the first SRS periodic point after the AP-SRS is triggered to be transmitted or before the SRS periodic point and there is a PUSCH on the SRS periodic point, no matter whether the PUSCH on the SRS periodic point belongs to the UE or other UE, the UE may send the SRS. If the UE successfully contends for the access right over the unlicensed carrier on the first SRS periodic point after the AP-SRS is triggered to be transmitted or before the SRS periodic point and there is no PUSCH on the SRS periodic point, the UE may not send the SRS. If there is no SRS periodic point after the UE is triggered to transmit the AP-SRS, even though the UE successfully contends for the unlicensed carrier or the PUSCH exists, the UE may not send the SRS. If the UE fails to contend for the access right over the unlicensed carrier on the first SRS periodic point after the AP-SRS is triggered to be transmitted or before the SRS periodic point, the SRS may not be transmitted. Or, if the base station indicates that the channel is presently occupied by the UE of the same cell or the same operating company, the UE may not execute LBT or the UE, even though knowing that LBT may fail, may transmit the SRS on the SF or the periodic point when there is a PUSCH on the SRS periodic point. For the second condition, existence of the PUSCH includes at least one of existence of the PUSCH of the UE and existence of the PUSCH of the other UE.

A third condition: during UL transmission, if there is included an SRS periodic point and there is the PUSCH of the other UE on the SRS periodic point, the UE may send the SRS.

For the third condition, the UE successfully contends for the access right over the unlicensed carrier on the first SRS periodic point after the AP-SRS is triggered to be transmitted or before the SRS periodic point and there is no PUSCH on the SRS periodic point. There is made such a hypothesis that there is no own PUSCH on the SRS periodic point but the PUSCH of the other UE. In such case, the UE may send the SRS. If the UE successfully contends for the access right over the unlicensed carrier on the first SRS periodic point after the AP-SRS is triggered to be transmitted or before the SRS periodic point but there is no PUSCH on the SRS periodic point, the UE may not send the SRS. If there is no SRS periodic point after the UE is triggered to transmit the AP-SRS, even though the UE successfully contends for the unlicensed carrier and the PUSCH exists, the UE may not send the SRS. If the UE fails to contend for the access right over the unlicensed carrier on the first SRS periodic point after the AP-SRS is triggered to be transmitted or before the SRS periodic point, the SRS may not be transmitted. Or, if the base station indicates that the channel is presently occupied by the UE of the same cell or the same operating company, the UE may not execute LBT or the UE, even though knowing that LBT may fail, may transmit the SRS on the SF or the periodic point when there is the PUSCH of the other UE (not the PUSCH of the UE) on the SRS periodic point.

A fourth condition: during UL transmission, if there is included an SRS periodic point and there is no PUSCH transmitted on the SRS periodic point, the UE may send the SRS.

For the fourth condition, the UE successfully contends for the access right over the unlicensed carrier on the first SRS periodic point after the AP-SRS is triggered to be transmitted or before the SRS periodic point and there is no PUSCH on the SRS periodic point. There is made such a hypothesis that there is no PUSCH (for example, no own PUSCH and no PUSCH of the other UE) on the SRS periodic point. In such case, the UE may send the SRS. If there is no SRS periodic point after the UE is triggered to transmit the AP-SRS, even though the UE successfully contends for the unlicensed carrier, the UE may not send the SRS. If the UE fails to contend for the access right over the unlicensed carrier on the first SRS periodic point after the AP-SRS is triggered to be transmitted or before the SRS periodic point, the SRS may not be transmitted. Or, if the base station indicates that the channel is presently occupied by the UE of the same cell or the same operating company, the UE may not execute LBT or the UE, even though knowing that LBT may fail, may transmit the SRS on the SF or the periodic point on the SRS periodic point.

A fifth condition: if there is included or right no SRS periodic point during UL transmission, the UE may not send the SRS.

The fifth condition mainly refers to that, if there is no SRS periodic point in a UL transmission burst or a UL SF or the occupancy period of the UE, the UE, even though successfully contending for the unlicensed carrier, may not transmit the SRS.

For each of the abovementioned conditions, the UE may send the SRS on the SRS periodic point when meeting the abovementioned conditions only on the premise of successfully contending for the access right over the unlicensed carrier. On the contrary, if contention for the access right over the unlicensed carrier fails, the UE, even though meeting the abovementioned conditions, may not send the SRS on the SRS periodic point. Unless the base station sends the indication information to the UE to notify the UE that the SRS may directly be sent on the SRS periodic point without executing LBT when one of the abovementioned conditions is met. Or, a short control signaling manner is adopted and the UE may directly send the SRS without executing LBT under one of the abovementioned conditions.

From the methods in the first embodiment and the second embodiment, it can be seen that unfixed UL and downlink transmission positions in LAA and the LBT execution result directly influence whether the SRS may be sent on the configured SRS periodic point or not, which reduce SRS transmission opportunities to a certain extent. Therefore, it is necessary to consider design of a new SRS parameter configuration and SRS transmission method or principle for the characteristic of LAA. The UL transmission burst or UL transmission period involved in the disclosure may be understood as an independent UL transmission time or interval and may also be understood in a manner that part or all of left transmission time in a transmission burst, except a duration occupied by downlink transmission, is the UL transmission burst.

The SRS SF position determined according to the SRS parameter in the existing protocol may not meet sending of the AP-SRS triggering signaling by the base station on the unlicensed carrier. However, because of a requirement on execution of LBT for the unlicensed carrier and UL or downlink transmission traffic, UL or downlink transmission SF positions are unfixed or undetermined. Therefore, there may be a phenomenon that the UE may send the SRS because there is no SRS periodic point in the channel occupancy period of the UE after the UE receives the AP-SRS triggering signaling and successfully contends for the access right over the unlicensed carrier. An LAA-characteristic-based SRS sending SF position indication method and a parameter configuration method are provided based on a third embodiment. That is, the UE may sends the SRS according to an SRS SF position (the SRS SF position is determined according to the characteristic of LAA in a manner of indication by the base station or implicit indication, which avoids the condition that the UE successfully contends for the unlicensed carrier but there is no SRS periodic point (namely no SRS SF) to a certain extent) provided in the third embodiment and, as long as the UE successfully contends for the access right over the unlicensed carrier before the SRS SF position and one of the abovementioned conditions is met (namely whether there is a PUSCH at the SRS SF position or not), the UE may send the SRS.

Third Optional Embodiment

The embodiment provides a method for determining a time-domain transmission position for an SRS.

Based on the first and second embodiments, an SRS parameter configuration in an existing protocol limits SRS transmission opportunities in LAA to a certain extent. Therefore, a new SRS parameter or parameter set is designed for LAA in the embodiment, specifically how to determine an SRS transmission position on an unlicensed carrier.

The time-domain transmission position for the SRS may be determined by one of the following methods.

A first manner: it is determined by a period and SF offset in the period in the SRS parameter or parameter set.

Elements in the SRS parameter or parameter set include at least one of: a cell-level bandwidth, a cell SF configuration, a UE-level bandwidth, a frequency hopping bandwidth, a frequency-domain position, a UE-level SF configuration (corresponding to the period and the SF offset in the period), a transmission comb, a cyclic shift, a transmission comb number and an antenna port number. The SRS parameter or parameter set may be configured through high-layer RRC signaling and may also be determined through physical-layer DCI or common DCI or newly designed DCI signaling or in a manner of combining the high-layer RRC signaling and the physical-layer DCI or common DCI or newly designed DCI signaling. For example, a first SRS period and a first SF offset are configured by high-layer RRC and a second SRS period and a second SF offset are configured through the physical-layer DCI or common DCI or newly designed DCI signaling. The second period is shorter than the first period. Or, the second period and the second SF offset are determined according to the first SRS period and first SF offset configured by high-layer RRC. Or, the second period and the second SF offset may be determined in one of the following manners:

indication by dedicated physical-layer DCI or common DCI, or predetermination by a base station and UE, or determination according to a corresponding relationship between an LBT result and each of the SRS period and the offset, or a corresponding relationship between a UL SF number and each of the SRS period and the offset, or a corresponding relationship between each of the first SRS parameter and the first SF offset and each of the second SRS parameter and the second SF offset or a corresponding relationship between a downlink SF number or a downlink SF position for sending of the DCI and each of the SRS period and the offset.

Herein, indication by the dedicated physical-layer DCI or the common DCI specifically refers to that the base station configures a new SRS period and SF offset for the UE. If an SRS SF position determined by the newly configured SRS period and SF offset is earlier than an SRS SF position determined by the first period and offset configured by a higher layer, the UE preferably considers to send the SRS according to the SRS SF position determined by the reconfigured second period and offset in the DCI or the common DCI. If the SRS SF position determined by the newly configured SRS period and SF offset is later than the SRS SF position determined by the first period and offset configured by the higher layer, the UE sends the SRS according to the SRS SF position determined by the first SRS period and offset configured by the higher layer. If the SRS SF position determined by the newly configured SRS period and SF offset is overlapped with the SRS SF position determined by the first period and offset configured by the higher layer, the UE freely sends the SRS according to the SRS SF position determined by the first SRS period and offset or the second period and offset. In an embodiment, the SRS SF position determined by the second SRS period and the second offset is earlier than that determined by the first SRS period and the first offset (that is, during appearance of a UL SF on the unlicensed carrier, all SRS SFs or at least a first SRS SF position determined by the second SRS period and offset indicated by the DCI or the common DCI is earlier than an SRS SF configured by the higher layer during appearance of the UL SF and the SRS SF position determined by the second period and offset in a UL transmission burst may be earlier than, include or be later than the SRS SF position determined by the first period and offset). Details about specific indication of the second SRS period and offset in the DCI or the common DCI refer to a fourth embodiment. The DCI or common DCI signaling may be notified to the UE through a licensed carrier or the unlicensed carrier.

A second manner: the SRS period and the SF offset in the period are not configured by the higher layer and a time-domain SRS transmission position or time-domain SRS position set may be determined in an explicit indication or implicit indication manner through the physical-layer DCI or the common DCI or the newly designed DCI.

The physical-layer DCI or the common DCI or the newly designed DCI may also indicate at least one of a starting point index and interval of SRS SFs, so that at least one SRS SF position may be determined.

For the second manner, when the SRS parameter is configured by the higher layer, the SRS period and the SF offset in the period may not be configured. However, at least one of the following parameters is still required to be configured: the cell-level bandwidth, the UE-level bandwidth, the frequency hopping bandwidth, the frequency-domain position, the transmission comb, the cyclic shift, the transmission comb number and the antenna port number. Since a signal sent by a transmission device on the unlicensed carrier is required to meet a requirement of 80% of a bandwidth, a broadband SRS is supported on the unlicensed carrier. Therefore, at least one of a frequency-hopping parameter and bandwidth parameter for the SRS may also not be configured by the higher layer.

The SRS sending position may be determined in an implicit or explicit manner. That is, the base station may explicitly indicate, through the dedicated physical-layer DCI signaling or the common DCI or the newly designed DCI, at least one of: an SRS transmission SF position, an SRS transmission SF set, a position for CCA executed for sending of the SRS, a symbol number for CCA executed for sending of the SRS, a symbol position for the SRS, an LBT mechanism and an LBT parameter. Details about specific design or content of the DCI or the common DCI or the newly designed DCI refer to the fourth embodiment.

The DCI or the common DCI signaling or the newly designed DCI signaling indicates a SF position for sending the SRS, for example, a specific SF index, or a first UL SF or SF index or a second UL SF or SF index. Or, the DCI or the common DCI signaling or the newly designed DCI signaling indicates multiple successive SF positions for the SRS. For example, UL SF or SF indexes f1, f2, f3, f4, . . . fn are explicitly indicated to be SRS SF positions, where value ranges of f1, f2, f3, f4, . . . fn are [0, 9]. In an embodiment, f1, f2, f3, f4, . . . fn are a first UL SF, a second UL SF, a third UL SF, a fourth UL SF . . . an nth UL SF respectively. Or, the DCI or the common DCI signaling or the newly designed DCI signaling indicates multiple discrete SF positions for the SRS. For example, UL SFs or SF indexes f, f+2, f+4, f+6 and the like are explicitly indicated to be SRS SF positions, or, SF indexes in the UL transmission burst are even SFs, or the SF indexes in the UL transmission burst are odd SFs, or the SF indexes in the UL transmission burst or UL SFs are first t even/odd SFs in even/odd SFs, where f is a specific UL SF position and a value range thereof is [0, 9]; in an embodiment, f is a first UL SF of an index corresponding to the SF; and t is equal to or greater than 1 and smaller than a total number of total SFs in the UL transmission burst. Or, the UE may determine at least one of the SRS transmission SF position and the SRS transmission SF set according to an SF n sending the DCI or the common DCI or the newly designed DCI by the base station and according to a specific timing relationship. In an embodiment, the specific timing relationship is n+k, k being an integer equal to or greater than 4 or an integer equal to or greater than 1. In an embodiment, k is 1, 2, 3, 4, 5, 6, 7, 8 and the like. If the DCI or the common DCI or the newly designed DCI is sent on the SF n, the SF position where the UE sends the SRS may be determined to be at least one SF position or SF set of n+2, n+3, n+4 and n+5 according to at least one of n+2, n+3, n+4 and n+5. Or, the DCI or the common DCI signaling or the newly designed DCI signaling indicates the SRS SF set. The SRS transmission SF set includes one or more elements and each element represents an SF position. A successive SRS SF position, SRS SF positions discrete at equal intervals or SRS SF positions discrete at unequal intervals may be determined by each element in the set. When the SRS SF set includes only one element, an SF corresponding to the element is an SRS SF. For example, the DCI or the common DCI signaling or the newly designed DCI signaling indicates the SF set for sending the SRS. In an embodiment, an SF corresponding to an element in the SRS SF set is at least a first UL SF or an SF after the first UL SF or an SF in the UL transmission burst.

It is predetermined by the base station and the UE or configured by the higher layer or predefined or indicated by the base station as follows. The SRS SF refers to the first UL SF in the UL transmission burst or one or more specific UL SFs.

Or, the SRS SF refers to the first UL SF, or the second UL SF, or the third UL SF or a last UL SF, or a first UL SF after an ending position of downlink transmission.

Or, a partial SF after the ending position of downlink transmission or a symbol in the partial SF is a SF position for sending the SRS or symbol position.

Or, the SRS is sent on at least one of a spare symbol in a DRS during downlink transmission and last two spare symbols in a DRS SF.

Or, an SF determined according to that a downlink SF or UL SF meet a specific relationship or a downlink SF sending DCI and the UL SF meet the specific relationship is an SRS SF or a starting point of the SRS SF (a position of the SRS SF in the UL transmission period is determined according to the starting point of the SRS SF and an appearance interval, predetermined by the base station and the UE or indicated by the base station, of SRS SFs). The specific relationship being m+p, m+2, m+4, m+6 . . . , where m is the downlink SF, or a last downlink SF, or a second last downlink SF or a specific downlink SF. The specific SF is an SF sending signaling notifying that downlink transmission is ended or notifying the specific number of UL SFs after downlink transmission and the signaling may also be DCI signaling specially notifying triggering of the AP-SRS or DCI signaling specially notifying sending of the SRS.

Or, the SRS SF position or the SRS SF set position is determined by the LBT mechanism. It may be predetermined that a first UL SF after successful LBT is an SRS SF position. Or, it may be predetermined that the first UL SF after successful LBT is an SRS SF starting position or a first symbol after successful LBT is an SRS symbol position.

Or, the SRS SF position or the SRS SF set position is determined according to a UL SF number. The base station may notify the UE of the UL SF number. It may be indicated by the base station or predefined that a first odd/even UL SF is an SRS SF or a UL SF of which an SF index is an odd number/even number in the UL SFs in the UL transmission period is an SRS SF.

Or, the SRS SF or the SRS SF set is determined by a downlink SF number or a downlink SF position for sending of the DCI according to a specific relationship.

Or, the SRS SF is a first SF in the UL transmission burst, or the first UL SF, or a first SF after downlink transmission, or an SF of which a UL SF index is an even number in the UL transmission burst, or an SF of which a UL SF index is an odd number in the UL transmission burst, or s successive UL SFs starting from the first UL SF or SFs spaced by u (u is an equal to or greater than 0 or less than or equal to a total number of the SFs in the UL transmission burst or smaller than a total number of successive SFs scheduled by the UE and, in an embodiment, u may be 0, 1, 2 and 3) from a wth (w is equal to or greater than 1 but smaller than a total number of the SFs in the UL transmission burst or smaller than a total number of the successive SFs scheduled by the UE and, in an embodiment, w may be 1, 2, 3 and 4) UL SF.

An SRS transmission subset may include one or more elements and each element represents an SF position. A successive SRS SF position, SRS SF positions discrete at equal intervals or SRS SF positions discrete at unequal intervals may be determined by each element in the set. When the SRS SF set includes only one element, an SF corresponding to the element is an SRS SF.

A third manner: the SRS period and the SF offset in the period are not configured by the higher layer and the time-domain SRS position on the unlicensed carrier are determined in a manner of predetermination by the base station and the UE.

The position for transmission of the SRS on the unlicensed carrier is determined in the manner of predetermination by the base station and the UE. That is, it may be predetermined by the base station and the UE that the SRS transmission SF position is a scheduling SF position or the SRS SF position refers to multiple successive SFs from the scheduling SF position are SRS SF positions or multiple discrete SFs or SF set positions from the scheduling SF position, or an appearance period of the SRS and the offset are predetermined, the offset being an offset relative to the scheduling SF or relative to a position where the UL SF appears, or the SRS SF position is the first SF in the UL transmission burst, or the first UL SF, or the first SF after downlink transmission, or a last partial SF after downlink transmission, or the DRS SF, or at least one symbol position of a blank symbol in the DRS SF and last two symbols in the SF, or the SF of which the UL SF index is an even number in the UL transmission burst, or the SF of which the UL SF index is an odd number in the UL transmission burst, or s successive UL SFs starting from the first UL SF, or SFs spaced by u (u is an equal to or greater than 0 or less than or equal to a total number of the SFs in the UL transmission burst or smaller than a total number of the successive SFs scheduled by the UE and, in an embodiment, u may be 0, 1, 2 and 3) from the wth (w is equal to or greater than 1 but smaller than a total number of the SFs in the UL transmission burst or smaller than a total number of the successive SFs scheduled by the UE and, in an embodiment, w may be 1, 2, 3 and 4) UL SF, a discrete SF cluster including one SF or multiple SFs, or an rth UL SF, where r is equal to or greater than 1 but smaller than a total number of the SFs in the UL transmission burst or smaller than a total number of the successive SFs scheduled by the UE and, in an embodiment, w may be 1, 2, 3 and 4. Or, the first UL SF position after a success moment of LBT is an SRS SF position. Or, multiple successive UL SF positions after the success moment of LBT are SRS SF positions.

The corresponding relationship between the LBT result and each of the SRS period and the offset refers to that at least one of the LBT SF position and the SRS SF starting point position is determined according to an SF position where the success moment of LBT is located. In an embodiment, the appearance interval of the SRS SFs from the starting point of the SRS SF may be predetermined by the base station and the UE, or predefined, or indicated by the base station through the DCI or configured by high-layer RRC.

The corresponding relationship between the UL SF number and each of the SRS period and the offset refers to that the SRS SF position is determined according to the UL SF number in the UL transmission period. For example, there are four UL SFs in the UL transmission period and the SFs of which UL SF indexes are odd numbers are SRS SFs or the SF of which UL SF indexes are even numbers are SRS SFs. For the latter condition, each UL SF in the UL transmission period is an SRS SF.

The corresponding relationship between each of the first SRS period and the first SF offset and each of the second SRS period and the second SF offset refers to that the second present set of SRS period and SF offset or the appearance positions and interval of the SRS SFs are acquired according to the first set of SRS period and SF offset configured by the higher layer and according to a specific relationship. The DCI or the common DCI contains the specific relationship. The specific relationship is that the SRS period or the interval between the SRS SFs is shortened or extended according to present downlink traffic. When the SRS SF position configured by the higher layer is not included in the UL transmission period, the SRS SF position configured by the higher layer in the radio frame is shortened or arranged to be earlier. The specific relationship may be predetermined by the base station and the UE, or predefined, or indicated by the base station through the DCI or configured by high-layer RRC.

For example, in a radio frame (10 ms), SRS SF positions configured by the higher layer include an SF#1 and an SF#6 (the SF number indexes start from 0). According to at least one of UL traffic and downlink traffic, there is made such a hypothesis that the base station continuously occupies 4 ms after successfully contending for the unlicensed carrier, if the base station successfully completes LBT in an SF#0, the base station completes downlink transmission on an xth symbol of an SF#4. The base station sends the DCI or the common DCI to the UE through the SF#1. The DCI indicates that the UE may send the SRS on an SF n+ak+bj (k>=4, a is an integer larger than 1 and b and j are integers larger than 0). The UE, after receiving the indication information on an SF n+k (k>=4), may learn a new SRS sending SF position. Different values or sets are configured according to a, k, b and j and a newly configured SRS SF position or SRS SF set may be learned. If a=1, b=1, k=4 and j=1, the newly configured SRS SF position is an SF n+5 (i.e., the SF#6), where n is the SF position for sending of the DCI or the common DCI. In such case, there exist two conditions. If the UE is scheduled in an SF 5 and is not scheduled in the SF 6, the UE may select to contend for the unlicensed carrier again before the SF 6 or before an SRS symbol position in the SF 6 and, after successfully contending for the unlicensed carrier, sends the SRS at the SRS symbol position. Or, the base station indicates that UE of the same cell is scheduled in or occupies the SF 6, the UE may directly send the SRS at the SRS symbol position in the SF 6 without executing LBT. In such case, if the UE in the SF 6 also has an SRS sending requirement, the two pieces of UE may adopt different cyclic shifts or different transmission combs. Or, if a=1, b={1, 2, 3, 4, ... q], k=4 and j=1, the acquired newly configured SRS SF position is n+4+{1, 2, 3, 4, ... q}. The newly configured SRS SF position may be one or more successive SFs on the time domain or may be multiple discrete SFs or SF combination on the time domain.

A fourth manner: the time-domain SRS transmission position is determined by combining configuration of the SRS parameter (including the SRS period and the SF offset in the period) by the higher layer and dynamic indication of the time-domain SRS transmission position or the time-domain SRS transmission position set by the physical layer.

Based on the time-domain SRS transmission position determined in the first manner to the fourth manner, no matter whether there is a PUSCH at the time-domain SRS position or the SRS SF, the UE may send the SRS at the time-domain SRS position or the SRS SF as long as successfully contending for the access right over the unlicensed carrier before the time-domain SRS position or the SRS SF. If the UE fails to contend for the access right over the unlicensed carrier before the time-domain SRS position or the SRS SF, the UE may not send the SRS at the present time-domain SRS position. However, contention for access to the unlicensed carrier may be re-executed before a next time-domain SRS position or SRS SF position (herein, the time-domain SRS position or the SRS SF position may be determined through an SRS periodic point configured by the higher layer or the dedicated physical-layer DCI or the common DCI or the newly designed DCI). If contention for the unlicensed carrier succeeds, no matter whether there is a PUSCH at the time-domain SRS position or the SRS SF, the UE may send the SRS. Or, Based on the time-domain SRS transmission position determined in the first manner to the fourth manner, if there is its own PUSCH at the time-domain SRS position or the SRS SF and the UE successfully contends for the access right over the unlicensed carrier before the time-domain SRS position or the SRS SF, the UE may send the SRS at the time-domain SRS position or the SRS SF. If the UE successfully contends for the access right over the unlicensed carrier before the time-domain SRS position or the SRS SF but its own PUSCH does not exist at the time-domain SRS position or the SRS SF, the UE, even though successfully contending for the access right over the unlicensed carrier, may not send the SRS. If the UE fails to contend for the access right over the unlicensed carrier before the time-domain SRS position or the SRS SF, the UE may not send the SRS at the present time-domain SRS position. However, contention for access to the unlicensed carrier may be re-executed before the next time-domain SRS position or SRS SF position (herein, for the time-domain SRS position or the SRS SF position, one of the time-domain SRS position or the SRS SF position or the SRS SF set may be determined by indication or implicit indication through the SRS periodic point configured by the higher layer or the dedicated physical-layer DCI or the common DCI or the newly designed DCI). As long as its own PUSCH exists at the present time-domain SRS position or SRS SF, the UE may send the SRS.

Based on the time-domain SRS transmission position determined in the first manner to the fourth manner, if there is a PUSCH of the other UE at the time-domain SRS position or the SRS SF and the UE successfully contends for the access right over the unlicensed carrier before the time-domain SRS position or the SRS SF, the UE may send the SRS at the time-domain SRS position or the SRS SF. If the UE successfully contends for the access right over the unlicensed carrier before the time-domain SRS position or the SRS SF but there is no PUSCH at the time-domain SRS position or the SRS SF, the UE, even though successfully contending for the access right over the unlicensed carrier, may not send the SRS. If the UE fails to contend for the access right over the unlicensed carrier before the time-domain SRS position or the SRS SF, the UE may not send the SRS at the present time-domain SRS position. However, contention for access to the unlicensed carrier may be re-executed before the next time-domain SRS position or SRS SF position (herein, for the time-domain SRS position or the SRS SF position, one of the time-domain SRS position or the SRS SF position or the SRS SF set may be determined by indication or implicit indication through the SRS periodic point configured by the higher layer or the dedicated physical-layer DCI or the common DCI or the newly designed DCI). As long as there is the PUSCH of the other UE at the present time-domain SRS position or SRS SF (there is made such a hypothesis that the own PUSCH of the UE does not exist in the SRS SF in such case), the UE may send the SRS.

Based on the time-domain SRS transmission position determined in the first manner to the fourth manner, if there is no PUSCH of any piece of UE at the time-domain SRS position or the SRS SF but the UE successfully contends for the access right over the unlicensed carrier before the time-domain SRS position or the SRS SF, the UE may send the SRS at the time-domain SRS position or the SRS SF. If the UE fails to contend for the access right over the unlicensed carrier before the time-domain SRS position or the SRS SF, the UE may not send the SRS at the present time-domain SRS position. However, contention for access to the unlicensed carrier may be re-executed before the next time-domain SRS position or SRS SF position (herein, for the time-domain SRS position or the SRS SF position, one of the time-domain SRS position or the SRS SF position or the SRS SF set may be determined by indication or implicit indication through the SRS periodic point configured by the higher layer or the dedicated physical-layer DCI or the common DCI or the newly designed DCI). In such case, if there is no PUSCH of any piece of UE at the time-domain SRS position or the SRS SF, the UE may send the SRS.

From the embodiment, it can be seen that the time-domain SF position for the SRS may be independently configured by the high-layer RRC signaling. The SRS period and the SF offset in the period may also not be configured by high-layer RRC, that is, the other SRS parameters are configured, and at least one SF position or the SRS SF set position is dynamically indicated through the dedicated physical-layer DCI or the common DCI or the newly designed DCI. The SF position for sending the SRS may also be determined by combining configuration of the SRS period and the SF offset in the period by the high-layer RRC signaling and dynamic indication of the at least one SF position by the dedicated physical-layer DCI or the common DCI or the newly designed DCI.

For an AP-SRS, it is specified in the existing protocol that the SRS is sent on the first SRS SF after triggering of the DCI signaling and may be sent only once. However, for LAA, whether the SRS may be sent on the SRS SF or not is determined by the LBT result to a certain extent. Therefore, in the disclosure, the UE, when failing to contend for the access right over the unlicensed carrier before the first SRS SF after the AP-SRS is triggered to be sent, may continue trying to contend for the access right over the unlicensed carrier on another configured or notified SRS SF and, after successfully contending for the access right over the unlicensed carrier, may send the SRS on the SRS SF. Of course, the UE, if successfully contending for the unlicensed carrier before the configured or notified or indicated or predetermined SRS SF position, may send the SRS on the present SRS SF, may select to send the SRS on the premise of successfully contending for the access right over the unlicensed carrier at another configured or notified or indicated or predetermined SRS position and may also select not to send the SRS at the other SRS position. For a P-SRS, the UE may send the SRS as long as successfully contending for the access right over the unlicensed carrier before the SRS SF position provided in the disclosure.

In addition, existing SRS parameters, i.e., the bandwidth, the transmission comb, the cyclic shift and the antenna port number, of LTE are configured by high-layer RRC. In an embodiment, the SRS period, the SF offset in the period and the like may also be configured, an LBT type, a sending times for the SRS, an SRS sending stopping frequency, temporary SRS SF enabling (in case of enabling, the SRS is sent on a specific SF or specific symbol after the success moment of LBT) and the SRS symbol position may further be configured, and a candidate SRS transmission position set, an unlicensed carrier identifier and a CCA position including a CCA position for sending of the PUSCH and a CCA position for sending of the SRS may be configured. The other parameters except the parameters configured by the higher layer may also be configured by the physical layer.

There is made such a hypothesis that the SRS SF set is configured in the UL transmission burst. When the UE has successfully contended for the unlicensed carrier and the SRS is sent at one SRS SF position in the SRS SF set or multiple configured SRS SF position, the UE may send the SRS and may also not send the SRS at another SRS SF position in the SRS SF set under the condition of successfully contending for the unlicensed carrier. Or, after the UE sends the SRS once at the SRS SF position corresponding to the configured SRS SF set or the multiple configured SRS SF positions, the other configured SRS SF positions are released, that is, the UE is allowed to send the SRS only once. Or, if the SRS is sent on one of the corresponding SRS SF positions, the other UE does not send any SRS.

Fourth Optional Embodiment

The embodiment provides a triggering manner for an AP-SRS according to a characteristic of an unlicensed carrier.

In an existing LTE protocol, the AP-SRS is triggered through an SRS request field in a DCI format 0/4/1A/2B/2C/2D. The SRS request field configured to trigger the AP-SRS to be sent in the DCI format 4 occupies 2 bits, and the SRS request fields configured to trigger the AP-SRS to be sent in the other formats all occupy only 1 bit.

For LAA, a DCI format in the existing LTE protocol may still be adopted to trigger the AP-SRS. However, because of UL or downlink traffic or an LBT operation in LAA, there is no fixed UL or downlink transmission SF position in LAA. On such a basis, the DCI format 0/4/1A/2B/2C/2D configured to trigger the AP-SRS in the existing LTE protocol may trigger the AP-SRS to be sent and may also indicate an SF position or SRS SF set for SRS sending of the UE. The SRS SF set includes one SF position or at least one SF position. The corresponding SF position in the SRS SF set may refer to successive SRS SF positions and may also refer to discrete SRS SF positions. The discrete SRS SF positions may be SRS SF positions discrete at equal intervals or SRS SF positions at unequal intervals, for example, an SF position of which an SF index is an odd number in a UL transmission burst, or an SF position of which an SF index is an even number in the UL transmission burst, or an SF position of which a UL SF index is an odd number or an SF position of which a UL SF index is an even number.

A method for indicating the SF position or SRS SF set for SRS sending of the UE by use of the DCI format 0/4/1A/2B/2C/2D configured to trigger the AP-SRS in the existing LTE protocol includes the following operations.

An Information Element (IE) item useless for LAA, for example, at least one of a UL index field in the DCI format 0, a Downlink Assignment Index (DAI) field and a CSI request field, in the existing protocol, is used. This field exists only for a UL/downlink SF configuration 0 in a TDD system. For LAA, there is a UL/downlink operation but no fixed UL/downlink SF configuration. Therefore, the field may be adopted to indicate the SRS SF position or the SRS SF set. The field occupies 2 bits. The DAI field exists only for UL/downlink SF configurations 1~6 in the TDD system. For LAA, there is the UL/downlink operation but no fixed UL/downlink SF configuration. Therefore, the field may be adopted to indicate the SRS SF position or the SRS SF set. The field occupies 2 bits. The CSI request field occupies 1 to 3 bits. If the DCI format 0 is adopted to trigger the AP-SRS and independent SRS transmission is supported, bits of corresponding RB alposition and frequency-hopping resource alposition fields in the DCI format are all set to be 0 or set not to be enabled, or a field related to PUSCH information scheduling in the format is disabled or corresponding bits are set to be 0.

For another example, for the DCI format 4, the IE item useless for LAA includes at least one of: the UL index field, the field occupying 2 bits; the DAI field, the field occupying 2 bits; the CSI request field, the field occupying 1 to 3 bits; and a cyclic shift for DM-RS and OCC index field, the field occupying 3 bits. These IE items useless for LAA may be adopted to indicate at least one of:

an SRS SF position on the unlicensed carrier, an SRS SF set position, an SRS symbol position, a CCA position, a CCA symbol number, an LBT mechanism and an LBT mechanism (for example, a CCA duration, a maximum contention window, a minimum contention window and a random backoff value N). In addition, an SRS request field may also be configured to indicate the SRS SF position or the SRS SF set position. For example, an SRS request includes 2 bits. "00" represents that the AP-SRS is not triggered. "01" represents a set of SRS parameters. "10" represents two sets of SRS parameters. "11" represents configuration of three sets of SRS parameters. The SRS parameters mainly include a transmission comb, a cyclic shift and the like. For LAA, new meanings may be assigned. "00" represents that the AP-SRS is not triggered. "01" represents that the AP-SRS is triggered and an SRS SF is configured. The configured SRS SF may be a UL SF predetermined by the base station and the UE, or a UL SF determined according to a timing relationship n+k (k>=4 or k>=1) after reception of DCI, or a first UL SF, or a predetermined UL SF in UL SFs, or a UL SF position indicated or notified by the DCI. "10" represents that the AP-SRS is triggered and a successive SRS SF set is configured, for example, {SF#n, SF#n+1, . . . , SF#n+c}. Herein, an SF n may be an SF sending the DCI, or an SF position where the UE is scheduled, or the first UL SF, or a specific SF in a UL transmission burst. Or, "10" represents that the AP-SRS is triggered and a default starting point of a continuous SRS SF length is an SF sending the DCI or an SF scheduled for the SRS or the first UL SF or the specific SF in the UL transmission burst. "11" represents that the AP-SRS is triggered and a discrete SRS SF set is configured. A starting point and interval of elements or discrete SRS SFs in the discrete SRS SF set and a size of each discrete SRS SF cluster may be predetermined by the base station and the UE, or predefined or configured by the higher layer or 11 in physical-layer DCI explicitly indicates discrete SF positions. If the DCI format 4 is adopted to trigger the AP-SRS and independent SRS transmission is supported, the bits of the corresponding RB alposition field in the DCI format are all set to be 0 or set not to be enabled, or the field related to PUSCH information scheduling in the format is disabled or the corresponding bits are set to be 0.

For another example, for the DCI format 1A/2B/2C, the IE item useless for LAA includes at least one of: the DAI field. This field exists only for the UL/downlink SF configurations 1~6 in the TDD system. For LAA, there is the UL/downlink operation but no fixed UL/downlink SF configuration. Therefore, the field may be adopted to indicate the SRS SF position or the SRS SF set. The field occupies 2 bits. If the DCI format 1A/2B/2C is adopted to trigger the AP-SRS and independent SRS transmission is supported, the bits of the corresponding RB alposition field in the DCI format are all set to be 0 or set not to be enabled, or the field related to PUSCH information scheduling in the format is disabled or the corresponding bits are set to be 0. If the DCI format is adopted to trigger the AP-SRS and simultaneous transmission of the SRS and its own PUSCH or a PUSCH of other UE is supported, the corresponding field related to PUSCH information scheduling multiplexes an existing field.

The useless IE field may also be configured to indicate an SRS parameter or parameter set. The SRS parameter or parameter set includes one of: a frequency-domain position, a period and an SF offset, a transmission comb, a cyclic shift, a transmission comb number and an antenna port number.

For LAA, the DCI format 1C in the existing LTE protocol may be adopted to trigger the AP-SRS. A specific method is as follows.

(1) Part or all of bits left after an LAA SF is configured in the existing DCI format 1C are adopted to execute at least one of:

triggering the AP-SRS, indicating the SRS SF position, indicating the SRS SF set, indicating a PUSCH resource alposition condition and the like.

That is, left bits in a branch configured to indicate an LAA SF configuration in the existing DCI format 1C are adopted for at least one of:

indicating the AP-SRS, indicating the SRS SF position, indicating the SRS SF set, indicating the PUSCH resource alposition condition and the like, specifically as follows.

The following information is transmitted in the DCI format 1C.

For the LAA SF configuration branch, else if the format 1C is adopted for the LAA SF configuration.

The LAA SF configuration occupies 4 bits and left y bits are reserved.

The y reserved bits in the DCI format 1C may be adopted to indicate at least one of the following information.

An SRS request indication occupies y1 bits. For example, when the SRS request indication occupies 1 bit, 0 is adopted to represent that the AP-SRS is not triggered and 1 represents that the AP-SRS is triggered. If the SRS request indication occupies 2 bits, "00" represents that the AP-SRS is not triggered, "01" represents that the AP-SRS is not triggered and an SRS SF position is configured, "10" represents that the AP-SRS is triggered and a continuous SRS SF position is configured and "11" represents that the AP-SRS is triggered and discrete SRS SF positions are configured. The last three states may also be adopted to represent the SRS SF set and SF positions corresponding to elements in the continuous SRS SF set may be successive and may also be discrete. That is, "01" represents that the AP-SRS is triggered and an SRS SF set is configured, the set includes only one element and a position corresponding to the element is an SRS SF position. "10" represents that the AP-SRS is triggered and an SRS SF set is configured, the set includes multiple elements and positions corresponding to the elements are successive SRS SF positions. "11" represents that the AP-SRS is configured and an SRS SF set is configured, the set includes multiple elements and positions corresponding to the elements are discrete SRS SF positions. Herein, occupying 2 bits to indicate the meaning of the SRS request is also applied to each state meaning of the SRS request in the DCI format 4. If the SRS indication occupies 3 bits, "000" represents that the AP-SRS is not triggered, "001" represents that the AP-SRS is triggered and an SRS SF position is configured, "010" represents that the AP-SRS is triggered and the first UL SF or the first UL SF in a UL transmission burst is configured to be an SRS SF, "011" represents that the AP-SRS is triggered and the first UL SF (or the first UL SF in the UL transmission burst) and subsequent successive SFs are configured to be SRS SFs, "100" represents that the AP-SRS is configured and an SF of which a UL SF index is an even number is configured to be an SRS SF, "101" represents that the AP-SRS is triggered and an SF of which a UL SF index is an odd number is configured to be an SRS SF, "110" represents that the AP-SRS is triggered, an SRS SF set (or the SRS SF set is replaced with multiple SRS SF positions) is configured and the SRS may be sent at all of the configured SRS SF positions, for example, the SRS may be sent at all corresponding even SF positions in the SRS SF set and the SRS may be sent at multiple configured or indicated SRS SF positions as long as contention for the unlicensed carrier before the SRS SF positions succeeds, and "111" represents that the AP-SRS is triggered, an SRS SF set (or the SRS SF set is replaced with multiple SRS SF positions) is configured and, once the UE sends the SRS once at the configured SRS SF position, the SRS may not be sent at another SRS SF position or the SRS SF position gets invalid.

An SRS SF indication occupies y2 bits. For example, if the SRS SF indication occupies 1 bit, 0 represents an SRS SF position determined according to a DCI sending SF position n and according to a timing relationship n+k (k is 1, 2, 3, 4, 5, 6 and an integer larger than 6 and smaller than 10 or an integer equal to or greater than 4) and 1 represents that the first UL SF or the first UL SF in the UL transmission burst is an SRS SF sending position. If the SRS SF indication occupies 2 bits, "00" represents the SRS SF position determined according to the DCI sending SF position n and according to the timing relationship n+k (k is 1, 2, 3, 4, 5, 6 and an integer larger than 6 and smaller than 10 or an integer equal to or greater than 4), "01" represents that the first UL SF or the first SF in the UL transmission burst is a SF position for sending the SRS, "10" represents that a first UL SF after successful LBT is a configured SF and "11" represents a first UL SF after an ending position of downlink transmission. Or, a state in more bits may also be adopted to indicate the SF of which an SF index is an even number in UL SFs or the UL transmission burst, or indicate the SF of which an SF index is an odd number in the UL SFs or the UL transmission burst, or indicate the first UL SF or subsequent s successive SFs in the UL SFs or the UL transmission burst, or indicate an SRS SF determined according to the period and SF offset in the period in the SRS parameter or parameter set, or indicate an SRS SF determined by enabling the period and SF offset in the period in the SRS parameter or parameter set configured by the physical layer or the higher layer and the like.

An SRS symbol position indication occupies y3 bits. For example, if the SRS symbol position indication occupies 1 bit, 0 represents an SRS symbol position specified in the existing LTE protocol, for example, a last symbol in an SF, and 1 represents a new SRS symbol position, i.e., an SRS symbol position except an existing one. If the SRS symbol position indication occupies 2 bits, "00" represents the SRS symbol position specified in the existing LTE protocol, for example, the last symbol in the SF, "01" represents the new SRS symbol position which is a second last symbol of the SF, "10" represents the new SRS symbol position which is a first symbol in the SF and "11" represents the new SRS symbol position which is a second symbol in the SF. If the SRS symbol position indication occupies 3 bits, "000" represents the SRS symbol position specified in the existing LTE protocol, for example, the last symbol in the SF, "001" represents the new SRS symbol position which is the second last symbol in the SF, "010" represents the new SRS symbol position which is the first symbol in the SF, "011" represents the new SRS symbol position which is the second symbol in the SF, "100" represents the new SRS symbol position which is a fourth symbol (for example, a DMRS symbol position) of a first half time slot in the SF, "101" represents the new SRS symbol position which is a fourth symbol (for example, a DMRS symbol position) of a second half time slot in the SF, "110" represents the new SRS symbol position which is a last symbol of the first half time slot in the SF and "111" represents the new SRS symbol position which is a first symbol of the second half time slot in the SF or a spare symbol position in a DRS.

A CCA position indication occupies y4 bits. For example, if the CCA position indication occupies 1 bit, 0 represents last one or two or more symbols in the SF and 1 represents first one or two or more symbol positions in the SF. If the CCA position indication occupies 2 bits, "00" represents the last one or two or more symbols in the SF, "01" represents the first one or two or more symbol positions in the SF, "10" represents a symbol position after downlink transmission is ended and before UL transmission is started and "11" represents a special SF position or last one or more symbols of a previous SF of the SRS SF or first one or more symbol positions in the SRS SF or one or more symbols before the SRS symbol or last one or more symbols of a previous SF of a PUSCH/PUCCH/PRACH SF or first one or more symbol positions in the PUSCH/PUCCH/PRACH SF.

An LBT mechanism indication occupies y5 bits. For example, if the LBT mechanism indication occupies 1 bit, 0 represents LBT Cat2 of which a CCA duration is at least 25 us and 1 represents LBT Cat4. If the LBT mechanism indication occupies 2 bits, "00" represents LBT Cat2 of which a CCA starting point is fixed and the CCA duration is at least 25 us, "01" represents LBT Cat2 of which the CCA starting point is random and the CCA duration is at least 25 us, "10" represents LBT Cat4 of which a maximum contention window is 3, a minimum contention window is 1 and a value of m in a defer period (the defer period is formed by a fixed CCA duration and m slots), and "11" represents LBT Cat4 of which the maximum contention window is 7, a minimum contention window is 5 and the value of m in the defer period (the defer period is formed by the fixed CCA duration and m slots) is 0 or 1 or 2. If there are more bits, more detailed LBT parameter configuration values may also be divided.

An RB indication occupies y6 bits. The existing protocol may also be multiplexed to indicate at least one of: an RB, a resource alposition content and a bit number. When the IE item is adopted for independent SRS transmission, the IE item may not be enabled or configured. For simultaneous transmission of the SRS and the PUSCH or for the condition that there is a PUSCH, the corresponding IE item in the existing protocol may be multiplexed, that is, it may be copied or a corresponding modification may be made.

A mode switching indication occupies y7 bits. Various conditions included when it is configured to indicate whether to enable various modes or systems or different SRS SF positions, or SRS symbol positions, or CCA positions and the like or not may be switched for use.

A carrier indication occupies y8 bits. A content in the existing protocol may be multiplexed.

A TPC indication occupies y9 bits for the PUSCH or the PUCCH. A content in the existing protocol may be multiplexed.

An SRS period occupies y10 bits. The SRS period may be 0.5 ms, 1 ms, 2 ms and 5 ms. In addition, an SRS period configuration value in the existing protocol may be multiplexed.

An offset of the SRS in the UL SF occupies y11 bits and may represent an offset relative to a first UL SF position in multiple successive UL SFs or multiple discrete UL SFs or UL SFs. For example, if there are three UL SFs in the UL transmission burst and the offset is 1, the second UL SF in the UL transmission burst is an SRS SF.

An SRS SF configuration indication occupies y12 bits. The SF configuration indication corresponds to a total UL SF number and an SF offset in the total UL SF number.

A CCA symbol number indication occupies y13 bits. For example, when the CCA symbol number indication occupies 1 bit, 0 represents one symbol and 1 represents two symbols.

Reserved occupies yn bits.

Y is equal to y1+y2+y3+y4+y5+y6+y7+y8+y9+y10+y11+y12+y13+yn. The reserved bits may also be configured to indicate the SRS parameter or parameter set. The SRS parameter or parameter set includes one of: the frequency-domain position, the period and the SF offset, the transmission comb, the cyclic shift, the transmission comb number and the antenna port number. The SRS period and SF offset indicated by the physical-layer DCI are a second period and a second SF offset respectively.

(2) A branch configured to trigger the AP-SRS, corresponding SRS SF information and the like is added into the existing DCI format 1C or a new DCI format is introduced. There is made such a hypothesis that the corresponding format includes totally Q bits under this condition.

The totally Q bits in the new branch in the DCI format 1C or the new DCI format may be adopted to indicate at least one of the following information.

The SRS request indication occupies Q1 bits. For example, when the SRS request indication occupies 1 bit, 0 is adopted to represent that the AP-SRS is not triggered and 1 represents that the AP-SRS is triggered. If the SRS request indication occupies 2 bits, "00" represents that the AP-SRS is not triggered, "01" represents that the AP-SRS is not triggered and the SRS SF position is configured, "10" represents that the AP-SRS is triggered and the successive SRS SF position is configured and "11" represents that the AP-SRS is triggered and discrete SRS SF positions are configured. The last three states may also be adopted to represent the SRS SF set and SF positions corresponding to elements in the continuous SRS SF set may be successive and may also be discrete. That is, "01" represents that the AP-SRS is triggered and an SRS SF set is configured, the set includes only one element and a position corresponding to the element is an SRS SF position. "10" represents that the AP-SRS is triggered and an SRS SF set is configured, the set includes multiple elements and positions corresponding to the elements are successive SRS SF positions. "11" represents that the AP-SRS is configured and an SRS SF set is configured, the set includes multiple elements and positions corresponding to the elements are discrete SRS SF positions. Herein, occupying 2 bits to indicate the meaning of the SRS request is also applied to each state meaning of the SRS request in the DCI format 4. If the SRS indication occupies 3 bits, "000" represents that the AP-SRS is not triggered, "001" represents that the AP-SRS is triggered and an SRS SF position is configured, "010" represents that the AP-SRS is triggered and the first UL SF or the first UL SF in a UL transmission burst is configured to be an SRS SF, "011" represents that the AP-SRS is triggered and the first UL SF (or the first UL SF in the UL transmission burst) and subsequent s successive SFs are configured to be SRS SFs, "100" represents that the AP-SRS is configured and an SF of which a UL SF index is an even number is configured to be an SRS SF, "101" represents that the AP-SRS is triggered and an SF of which a UL SF index is an odd number is configured to be an SRS SF, "110" represents that the AP-SRS is triggered, an SRS SF set (or the SRS SF set is replaced with multiple SRS SF positions) is configured and the SRS may be sent at all of the configured SRS SF positions, for example, the SRS may be sent at all corresponding even SF positions in the SRS SF set and the SRS may be sent at multiple configured or indicated SRS SF positions as long as contention for the unlicensed carrier before the SRS SF positions succeeds, and "111" represents that the AP-SRS is triggered, an SRS SF set (or the SRS SF set is replaced with multiple SRS SF positions) is configured and, once the UE sends the SRS once at the configured SRS SF position, the SRS may not be sent at another SRS SF position or the SRS SF position gets invalid.

The SRS SF indication occupies Q2 bits. For example, if the SRS SF indication occupies 1 bit, 0 represents an SRS SF position determined according to a DCI sending SF position n and according to a timing relationship n+k (k is 1, 2, 3, 4, 5, 6 and an integer larger than 6 and smaller than 10 or an integer equal to or greater than 4) and 1 represents that the first UL SF or the first UL SF in the UL transmission burst is an SRS SF sending position. If the SRS SF indication occupies 2 bits, "00" represents the SRS SF position determined according to the DCI sending SF position n and according to the timing relationship n+k (k is 1, 2, 3, 4, 5, 6 and an integer larger than 6 and smaller than 10 or an integer equal to or greater than 4), "01" represents that the first UL SF or the first SF in the UL transmission burst is a SF position for sending the SRS, "10" represents that a first UL SF after successful LBT is a configured SF and "11" represents a first UL SF after an ending position of downlink transmission. Or, a state in more bits may also be adopted to indicate the SF of which an SF index is an even number in UL SFs or the UL transmission burst, or indicate the SF of which an SF index is an odd number in the UL SFs or the UL transmission burst, or indicate the first UL SF or subsequent s successive SFs in the UL SFs or the UL transmission burst, or indicate an SRS SF determined according to the period and SF offset in the period in the SRS parameter or parameter set, or indicate an SRS SF determined by enabling the period and SF offset in the period in the SRS parameter or parameter set configured by the physical layer or the higher layer and the like.

The SRS symbol position indication occupies Q3 bits. For example, if the SRS symbol position indication occupies 1 bit, 0 represents an SRS symbol position specified in the existing LTE protocol, for example, a last symbol in an SF, and 1 represents a new SRS symbol position, i.e., an SRS symbol position except an existing one. If the SRS symbol position indication occupies 2 bits, "00" represents the SRS symbol position specified in the existing LTE protocol, for example, the last symbol in the SF, "01" represents the new SRS symbol position which is a second last symbol of the SF, "10" represents the new SRS symbol position which is a first symbol in the SF and "11" represents the new SRS symbol position which is a second symbol in the SF. If the SRS symbol position indication occupies 3 bits, "000" represents the SRS symbol position specified in the existing LTE protocol, for example, the last symbol in the SF, "001" represents the new SRS symbol position which is the second last symbol in the SF, "010" represents the new SRS symbol position which is the first symbol in the SF, "011" represents the new SRS symbol position which is the second symbol in the SF, "100" represents the new SRS symbol position which is a fourth symbol (for example, a DMRS symbol position) of a first half time slot in the SF, "101" represents the new SRS symbol position which is a fourth symbol (for example, a DMRS symbol position) of a second half time slot in the SF, "110" represents the new SRS symbol position which is a last symbol of the first half time slot in the SF and "111" represents the new SRS symbol position which is a first symbol of the second half time slot in the SF or a spare symbol position in a DRS.

The CCA position indication occupies Q4 bits. For example, if the CCA position indication occupies 1 bit, 0 represents last one or two or more symbols in the SF and 1 represents first one or two or more symbol positions in the SF. If the CCA position indication occupies 2 bits, "00" represents the last one or two or more symbols in the SF, "01" represents the first one or two or more symbol positions in the SF, "10" represents a symbol position after downlink transmission is ended and before UL transmission is started and "11" represents a special SF position or last one or more symbols of a previous SF of the SRS SF or first one or more symbol positions in the SRS SF or one or more symbols before the SRS symbol or last one or more symbols of a previous SF of a PUSCH/PUCCH/PRACH SF or first one or more symbol positions in the PUSCH/PUCCH/PRACH SF.

The LBT mechanism indication occupies Q5 bits. For example, if the LBT mechanism indication occupies 1 bit, 0 represents LBT Cat2 of which a CCA duration is at least 25 us and 1 represents LBT Cat4. If the LBT mechanism indication occupies 2 bits, "00" represents LBT Cat2 of which a CCA starting point is fixed and the CCA duration is at least 25 us, "01" represents LBT Cat2 of which the CCA starting point is random and the CCA duration is at least 25 us, "10" represents LBT Cat4 of which a maximum contention window is 3, a minimum contention window is 1 and a value of m in a defer period (the defer period is formed by a fixed CCA duration and m slots), and "11" represents LBT Cat4 of which the maximum contention window is 7, a minimum contention window is 5 and the value of m in the defer period (the defer period is formed by the fixed CCA duration and m slots) is 0 or 1 or 2. If there are more bits, more detailed LBT parameter configuration values may also be divided.

The RB indication occupies Q6 bits. The existing protocol may also be multiplexed to indicate at least one of: an RB, a resource alposition content and a bit number. When the IE item is adopted for independent SRS transmission, the IE item may not be enabled or configured. For simultaneous transmission of the SRS and the PUSCH or for the condition that there is a PUSCH, the corresponding IE item in the existing protocol may be multiplexed, that is, it may be copied or a corresponding modification may be made.

The mode switching indication occupies Q7 bits. Various conditions included when it is configured to indicate whether to enable various modes or systems or different SRS SF positions, or SRS symbol positions, or CCA positions and the like or not may be switched for use.

The carrier indication occupies Q8 bits. A content in the existing protocol may be multiplexed.

The TPC indication occupies Q9 bits for the PUSCH or the PUCCH. A content in the existing protocol may be multiplexed.

The SRS period occupies Q10 bits. The SRS period may be 0.5 ms, 1 ms, 2 ms and 5 ms. In addition, an SRS period configuration value in the existing protocol may be multiplexed.

The offset of the SRS in the UL SF occupies Q11 bits and may represent an offset relative to a first UL SF position in multiple successive UL SFs or multiple discrete UL SFs or UL SFs. For example, if there are three UL SFs in the UL transmission burst and the offset is 1, the second UL SF in the UL transmission burst is an SRS SF.

The SRS SF configuration indication occupies Q12 bits. The SF configuration indication corresponds to a total UL SF number and an SF offset in the total UL SF number.

The CCA symbol number indication occupies Q13 bits. For example, when the CCA symbol number indication occupies 1 bit, 0 represents one symbol and 1 represents two symbols.

Reserved occupies Qn bits.

Q is equal to Q1+Q2+Q3+Q4+Q5+Q6+Q7+Q8+Q9+Q10+Q11+Q12+Q13+Qn. The reserved bits may also be configured to indicate the SRS parameter or parameter set. The SRS parameter or parameter set includes one of: the frequency-domain position, the period and the SF offset, the transmission comb, the cyclic shift, the transmission comb number and the antenna port number. The SRS period and SF offset indicated by the physical-layer DCI are a second period and a second SF offset respectively.

For the condition that the AP-SRS and the PUSCH are simultaneously transmitted, the SRS is triggered according to triggering signaling provided in the disclosure and a corresponding field related to the PUSCH is enabled in the DCI format. However, for the condition that the AP-SRS and the PUSCH are asynchronously transmitted, when the existing DCI triggering signaling is multiplexed, a corresponding field content related to the PUSCH may not be enabled or all of the corresponding bits are set to be 0. The corresponding field related to the PUSCH in the reserved bits in the LAA SF configuration branch in the DCI format 1C is not enabled or set to be 0 but an AP-SRS triggering field is enabled. The corresponding field related to the PUSCH in the bits in the new configuration branch in the DCI format 1C is not enabled or set to be 0 but the AP-SRS triggering field is enabled. Or, the corresponding field related to the PUSCH in the bits in the new DCI format is not enabled or set to be 0 but the AP-SRS triggering field is enabled.

Or, the following manners may also be adopted.

A triggering manner for the AP-SRS may include one of the following manners: one type is triggering through the DCI, another type is triggering through the common DCI and the last type is triggering through the newly designed DCI. At present, a DCI format triggering the AP-SRS includes the DCI format 0/4/1A/2B/2C/2D. 2 bits are adopted for triggering of the DCI format 4 and only 1 bit is occupied for the other formats.

Transmission manners for the AP-SRS are divided into two types: simultaneous transmission of the AP-SRS and the PUSCH in the same SF and asynchronous transmission of the AP-SRS and the PUSCH. For the latter condition, there are two conditions: simultaneous transmission of the AP-SRS and the PUSCH of the other UE and independent transmission of the AP-SRS in case of no PUSCH. According to different SRS transmission manners, different triggering manners are adopted for the AP-SRS.

Specifically, the AP-SRS may be triggered in one of the following manners.

A first manner: the existing DCI format 0/4/1A/2B/2C/2D is adopted.

For the first manner, the SRS request field in each format may still be adopted to indicate whether to trigger transmission of the AP-SRS or not. In addition, the corresponding IE item useless for the LAA system in each format may also be adopted to indicate the SRS SF or the SRS SF set. For example, 1 bit of the frequency hopping indication in the DCI format 0 is a configurable item. In an embodiment, the 1 bit indicating frequency-domain frequency hopping is adopted for at least one of:

indicating a total number of successive SRS transmission SFs;

indicating that the UE transmits the SRS once or transmits multiple SRSs;

indicating the LBT type (an identifier 0 represents LBT Cat4 of which the maximum contention window is one of {3, 4, 5, 7}, 1 represents LBT Cat2 or enhanced LBT Cat2 or LBT Cat2 similar to the DRS and, herein, LBT Cat2 may also become one-shot LBT);

indicating the SRS transmission symbol position (0 represents the last symbol of the SF and 1 represents a specific symbol except the last symbol in the SF);

indicating the SRS SF position; and indicating the SRS SF set. Or, the bits of the useless IE item and bits of the SRS request field in each format are combined for at least one of:

a triggering SRS SF, the SRS SF set or a total number of the successive SRS transmission SFs;

an execution SRS SF, the SRS SF set or a total number of the successive SRS transmission SFs;

indicating that the UE transmits the SRS once or transmits multiple SRSs;

indicating the LBT type (an identifier 0 represents LBT Cat4 of which the maximum contention window is one of {3, 4, 5, 7}, 1 represents LBT Cat2 or enhanced LBT Cat2 or LBT Cat2 similar to the DRS and, herein, LBT Cat2 may also become one-shot LBT);

indicating the SRS transmission symbol position (0 represents the last symbol of the SF and 1 represents a specific symbol except the last symbol in the SF). Or, a new meaning is assigned to the SRS request field in each format. For example, 0 represents that the AP-SRS is not triggered to be transmitted and 1 represents that the AP-SRS is triggered to be transmitted and indicates an AP-SRS transmission SF position. That is, a value of the SRS request field in the DCI received by the UE is 1 and it may be known that the AP-SRS may be transmitted on the scheduling SF or transmitted on the SF n+k (k>=4 or k>=1) after reception of the DCI, or the SRS is transmitted on a uth (u may be a positive integer of 1, 2, 3, 4, 5 and 6) after the SF n sending the DCI, or an SF region where the UE may transmit the SRS after the SF n+k is implied or it is implied that the UE may transmit the SRS on the first SF or Sth UL SF in the UL SFs.

For the DCI format 4, the SRS request includes 2 bits. "00" represents that the AP-SRS is not triggered. "01" represents a set of SRS parameters (mainly including the transmission comb, the cyclic shift and the like). "10" represents two sets of SRS parameters. "11" represents configuration of three sets of SRS parameters. For LAA, new meanings may be assigned. "00" represents that the AP-SRS is not triggered. "01" represents that the AP-SRS is triggered and an SRS SF is configured. The configured SRS SF may be a UL SF predetermined by the base station and the UE, or the UL SF determined according to the timing relationship n+k (k>=4 or k>=1) after reception of the DCI, or the first UL SF, or the predetermined UL SF in the UL SFs, or the UL SF position indicated or notified by the DCI. "10" represents that the AP-SRS is triggered and the continuous SRS SF set is configured, for example, {SF#n, SF#n+1, SF#n+c}. Herein, the SF n may be an SF sending the DCI, or the SF position where the UE is scheduled, or the first UL SF, or the specific SF in the UL transmission burst. Or, "10" represents that the AP-SRS is triggered and the default starting point of the continuous SRS SF length is the SF sending the DCI or the SF scheduled for the SRS or the first UL SF or the specific SF in the UL transmission burst. "11" represents that the AP-SRS is triggered and the discrete SRS SF set is configured. The starting point and interval of the elements or discrete SRS SFs in the discrete SRS SF set and the size of each discrete SRS SF cluster may be predetermined by the base station and the UE, or predefined or configured by the higher layer or 11 in physical-layer DCI explicitly indicates the discrete SF positions.

For the condition that the SPS and the PUSCH are asynchronously transmitted, a corresponding PUSCH resource indication field in each format may be disabled or set to be 0.

A second manner: part or all of the bits left after the LAA SF is configured in the existing DCI format 1C are adopted for at least one of:

triggering the AP-SRS, indicating the SRS SF position, indicating the SRS SF set, indicating the PUSCH resource alposition condition and the like.

That is, part or all of the Y reserved bits left in a dynamic SF configuration option of LAA are adopted to execute at least one of:

indicating at least one of triggering of the AP-SRS and the SRS SF position;

indicating the SRS SF position; and indicating the SRS SF set; and indicating the PUSCH resource alposition condition and the like. Part of bits in the reserved bits may also be adopted to indicate the LBT type, or the SRS symbol position, or the CCA position, or an SRS sending times, or an SRS sending stopping frequency and the like. The format 1C includes totally x+y bits and the first x bits are adopted to indicate the SF configuration in LAA.

An occupation condition of the Y bits and meanings include at least one of the following conditions.

Triggering of the AP-SRS may occupy 1 bit and is marked as the SRS request field. When the SRS request field is 0 or false, the AP-SRS is not triggered. When the SRS request field is 1 or true, the AP-SRS is triggered, or the AP-SRS is triggered and the SRS is sent only once at available SRS SF positions, or the AP-SRS is triggered and the SRS may be sent at all of the available SRS SF positions, or the AP-SRS is triggered and the SRS SF position is indicated, or the AP-SRS is triggered and the SRS SF set is indicated. Or, the SRS request field triggering the AP-SRS occupies m bits and the SRS request field may represent the following meanings.

It represents that the AP-SRS is not triggered.

It represents that the AP-SRS is triggered and a set of AP-SRS parameters are configured.

It represents that the AP-SRS is triggered and two sets of AP-SRS parameters are configured.

It represents that the AP-SRS is triggered and three sets of AP-SRS parameters are configured.

It represents that the AP-SRS is triggered and an SRS SF position is configured (that is, the UE may send the SRS at the SF position indicated in the DCI, or the SRS SF position is determined according to the DCI sending SF position n and the timing relationship n+k (k represents an integer of 1, 2, 3, 4, 5, 6, 7, 8 and the like) or the SRS is sent on the first UL SF or specific SF in the UL transmission burst).

It represents that the AP-SRS is triggered and the SRS is configured to be sent on the first SF in the UL SFs.

It represents that the AP-SRS is triggered and the SRS SF set is configured.

It represents that the AP-SRS is triggered, the SRS SF set is configured and the SRS is sent once on the SF of which an SF index number is an odd number in the available SRS SF positions.

It represents that the AP-SRS is triggered, the SRS SF set is configured and the SRS is sent on the SF of which an SF index number is an odd number in the available SRS SF positions.

It represents that the AP-SRS is triggered, the SRS SF set is configured and the SRS is sent once on the SF of which an SF index number is an even number in the available SRS SF positions.

It represents that the AP-SRS is triggered, the SRS SF set is configured and the SRS is sent on the SF of which an SF index number is an even number in the available SRS SF positions.

It represents that the AP-SRS is triggered, the SRS SF set is configured and the SRS is sent only once at the available SRS SF positions.

It represents that the AP-SRS is triggered, the SRS SF set is configured and the SRS may be sent at all of the available SRS SF positions.

It represents that the AP-SRS is triggered, the SRS SF set is configured and the SRS may be sent on successive SFs in the available SRS SF positions.

It represents that the AP-SRS is triggered, the SRS SF set is configured and the SRS may be sent on all of discrete SFs in the available SRS SF positions.

It represents that the AP-SRS is triggered, the SRS SF set is configured and the SRS may be sent on all of discrete even SFs in the available SRS SF positions or the SRS is sent on one SF. If the UE has sent the SRS once, the other SRS SF positions are invalid or the SRS may also be sent at the other SRS SF positions.

It represents that the AP-SRS is triggered, the SRS SF set is configured and the SRS may be sent on all of discrete odd SFs in the available SRS SF positions or the SRS is sent on one SF. If the UE has sent the SRS once, the other SRS SF positions are invalid or the SRS may also be sent at the other SRS SF positions.

It represents that the AP-SRS is triggered and an SRS SF position is configured (that is, the UE may send the SRS at the SF position indicated in the DCI, or the SRS SF position is determined according to the DCI sending SF position n and the timing relationship n+k (k represents an integer of 1, 2, 3, 4, 5, 6, 7, 8 and the like) or the SRS is sent on the first UL SF or specific SF in the UL transmission burst).

It represents that the AP-SRS is triggered, one set or two sets or three sets of AP-SRS parameters are configured and the SRS is configured to be sent on the first SF in the UL SFs.

It represents that the AP-SRS is triggered, one set or two sets or three sets of AP-SRS parameters are configured and the SRS SF set is configured.

It represents that the AP-SRS is triggered, one set or two sets or three sets of AP-SRS parameters are configured, the SRS SF set is configured and the SRS is sent once on the SF of which an SF index number is an odd number in the available SRS SF positions.

It represents that the AP-SRS is triggered, one set or two sets or three sets of AP-SRS parameters are configured, the SRS SF set is configured and the SRS is sent on the SF of which an SF index number is an odd number in the available SRS SF positions.

It represents that the AP-SRS is triggered, one set or two sets or three sets of AP-SRS parameters are configured, the SRS SF set is configured and the SRS is sent once on the SF of which an SF index number is an even number in the available SRS SF positions.

It represents that the AP-SRS is triggered, one set or two sets or three sets of AP-SRS parameters are configured, the SRS SF set is configured and the SRS is sent on the SF of which an SF index number is an even number in the available SRS SF positions.

It represents that the AP-SRS is triggered, one set or two sets or three sets of AP-SRS parameters are configured, the SRS SF set is configured and the SRS is sent only once at the available SRS SF positions.

It represents that the AP-SRS is triggered, one set or two sets or three sets of AP-SRS parameters are configured, the SRS SF set is configured and the SRS may be sent at all of the available SRS SF positions.

It represents that the AP-SRS is triggered, one set or two sets or three sets of AP-SRS parameters are configured, the SRS SF set is configured and the SRS may be sent on the successive SFs in the available SRS SF positions.

It represents that the AP-SRS is triggered, one set or two sets or three sets of AP-SRS parameters are configured, the SRS SF set is configured and the SRS may be sent on all of the discrete SFs in the available SRS SF positions.

It represents that the AP-SRS is triggered, one set or two sets or three sets of AP-SRS parameters are configured, the SRS SF set is configured and the SRS may be sent on all of the discrete even SFs in the available SRS SF positions or the SRS is sent on one SF. If the UE has sent the SRS once, the other SRS SF positions are invalid or the SRS may also be sent at the other SRS SF positions.

It represents that the AP-SRS is triggered, one set or two sets or three sets of AP-SRS parameters are configured, the SRS SF set is configured and the SRS may be sent on all of the discrete odd SFs in the available SRS SF positions or the SRS is sent on one SF. If the UE has sent the SRS once, the other SRS SF positions are invalid or the SRS may also be sent at the other SRS SF positions.

The SRS request field may include one or more conditions of the abovementioned meanings and a total number of bits occupied by the field is determined according to different conditions of the meanings.

The available SRS SF positions may be implicitly or explicitly determined through the DCI or the common DCI, or predetermined by the base station and the UE or notified by the higher layer.

Optionally, a UL SRS SF indication field may also be added. The specific SRS sending SF position or SRS SF set position of the UE may be notified in the indication field. The SF positions in the SRS SF set may be a combination of SFs successive on the time domain or discrete on the time domain.

In an embodiment, an SRS symbol position field may also be added and the field may have the following meanings: not changing an existing SRS sending symbol position; sending at a first symbol position in an SF; sending at a second symbol position of the SF; sending at a second last symbol position of the SF; sending on a last symbol of a first half time slot in the SF; sending on a first symbol of a second half time slot in the SF; or sending on a fourth symbol (DMRS symbol position) of the first half time slot in the SF; sending at a fourth symbol position of the second half time slot in the SF; and sending at a third symbol or fifth symbol position in the first half time slot or second half time slot in the SF.

In an embodiment, an offset field may also be added (that is, the SF is determined as a starting point according to a relationship between the DCI and the SRS sending position and the SRS SF position or the SRS SF position set is determined in combination with the SF offset).

In an embodiment, a CCA position field of sending of the SRS may also be added. The field may have the following meanings: not triggering execution of CCA for the SRS; executing CCA for sending of the SRS in the first symbol of the SF; executing the CCA for sending of the SRS in the last symbol of the SF (the SRS may be sent on a first symbol, or last symbol, or second symbol, or second last symbol, or last symbol of a first half time slot, or first symbol of a second half time slot or fourth symbol configured to send a DMRS in the first half time slot or the second half time slot in an SF after an execution position of CCA for sending of the SRS or any symbol position (0~13) in the SF; executing CCA for sending of the SRS in the second last symbol in the SF; and executing CCA for sending of the SRS in one or more symbols before the SRS symbol sending position.

In an embodiment, a CCA position field for sending of the PUSCH may also be added. The field may have the following meanings: not disabling the CCA position; not executing CCA; in first i symbols in the scheduling SF; last j symbols of a previous SF before the scheduling SF; or in the last j symbols of the previous SF of the scheduling SF and the first i symbols in the SF scheduling, where i and j may be 1, 2, 3, 4, 5, 6 and 7. According to different values of i and j, there may be different meaning items, so that a total number of meanings of the field is increased and a total number of bits occupied by the field may further be increased to a certain extent.

In an embodiment, an SRS sending times field may also be added or an SRS sending stopping frequency field is added.

In an embodiment, a related scheduling information field may further be added to indicate a resource alposition type, a resource alposition size or the like. If the field is not enabled, there is no scheduling information or PUSCH information. If it is enabled, a scheduling information condition may be indicated.

A total number of bits occupied by each field is determined by its meaning or a total number of types of indicated conditions. If a total number of bits occupied after each field is combined according to different scenarios or requirements is smaller than 20 bits or x+y bits, left bits are filled with 0 or reserved.

A third manner: a new branch is added into the DCI format 1C or a new DCI format is designed for at least one of:
  triggering the AP-SRS;
  indicating the SRS SF position; and
  indicating the SRS SF set;
  indicating the PUSCH resource alposition condition; and
  indicating at least one of the LBT type, the SRS symbol position, the CCA position, the SRS sending times and the SRS sending stopping frequency.

A difference from the second manner is that there is no field configured to configure the LAA SF in the DCI, that is, there is no bits configured to indicate the SF configuration. The bits in the format may be configured for at least one of:
  triggering the AP-SRS;
  indicating the SRS SF position;
  indicating the SRS SF set;
  indicating the PUSCH resource alposition condition; and
  indicating at least one of the LBT type, the SRS symbol position, the CCA position, the SRS sending times and the SRS sending stopping frequency. The same bit design in the second manner is specifically adopted. For example, a bit is configured to trigger the AP-SRS and the other bits may be configured for at least one of:
  indicating the SRS SF position;
  indicating the SRS SF position;
  indicating the SRS SF set;
  indicating the PUSCH resource alposition condition; and
  indicating at least one of the LBT type, the SRS symbol position, the CCA position for the SRS, the SRS sending times, the SRS sending stopping frequency, the transmission comb, the cyclic shift, the frequency-domain position, the LBT symbol number, the CCA position for the PUSCH, the symbol number, the CCA position for the PUSCCH, the symbol number, the CCA position for the PRACH and the symbol number. The specific number of bits occupied by each is mainly related to the meaning and the field. Left bits or unused bits may be reserved.

Particularly, for an independent SRS transmission scenario, it is set that the PUSCH resource alposition and scheduling information fields and the like in each manner are disabled. For example, for the DCI format 4, if it is configured that a transport block is not enabled, an independent SRS transmission condition may be triggered. Or, if the DCI format 2 is adopted, the 1 bit or 2 bit SRS request field is added and it is configured that the transport block is not enabled, the independent SRS transmission condition may be triggered. Or, if the DCI format 2A or 2B or 2C or 2D is adopted and it is configured that the transport block is not enabled, the independent SRS transmission condition may be triggered.

Fifth Optional Embodiment

The embodiment provides a method for enabling an SRS to meet a regulatory requirement on an occupied bandwidth according to the regulatory requirement on the occupied bandwidth on an unlicensed carrier.

For a broadband SRS, sending on the unlicensed carrier meets the requirement specified by control that 80% of a bandwidth is occupied. For example, a frequency-domain bandwidth of the SRS is determined by a cell bandwidth configuration $C_{SRS}$ and a UE bandwidth parameter $B_{SRS}$. There is made such a hypothesis that $C_{SRS}=0$ or 1 and $B_{SRS}=0$. For the condition that a system bandwidth meets $60 < N_{RB}^{UL} \leq 80$, the frequency-domain bandwidth of the SRS is 72 PRBs or 64 PRBs and meets the requirement that an SRS sending bandwidth occupies over 80% of a total bandwidth 15 MHz (equivalent to 75 PRBs).

The frequency-domain bandwidth, determined when other values are configured for $C_{SRS}$ and $B_{SRS}$ of the SRS does not meet the regulatory requirement. Therefore, for these conditions, it is necessary to provide a method for enabling a bandwidth occupied by signal transmission to meet the regulatory requirement of over 80% of the total bandwidth.

A first method is an SRS sequence repeating manner. For a narrow-band SRS or a short-SRS sequence, the required 80% of the bandwidth is occupied according to a manner of repeating on a frequency domain.

A second method is a subcarrier spacing increasing manner.

A third method is to increase a transmission comb. In an embodiment, the SRS sequence starts from a lower position of the frequency domain. For example, the transmission comb may be 6, 8, 12 and the like.

A fourth method is to increase an SRS sequence length and keep the transmission comb unchanged.

A fifth method is to sequentially map the SRS sequence into frequency-domain resources corresponding to a PUSCH. The SRS sequence in each resource cluster for the PUSCH may be mapped according to transmission combs configured by a higher layer or mapped onto successive subcarriers in the resource cluster.

Specifically, an existing SRS resource mapping method may be modified, specifically as follows.

$$a^{(p)}_{K_{TC}k'+k_0^{(p)},l} = \begin{cases} \frac{1}{\sqrt{N_{ap}}} \beta_{SRS} r_{SRS}^{(\tilde{p})}(k') & k' = 0, 1, \ldots, M_{sc,b}^{RS} - 1 \\ 0 & \text{otherwise} \end{cases},$$

where $N_{ap}$ is an antenna port number, $K_{TC}$ is a transmission comb number, $M_{sc,b}^{RS}$ is the SRS sequence length, $k_0^{(p)}$ is a frequency-domain starting position of the SRS and $b=B_{SRS}$ and $M_{sc,b}^{RB}=m^{SRS,b}N_{sc}^{RB}/K_{TC}$, From the above mapping manner, for enabling the narrow-band SRS to meet the bandwidth requirement, it is necessary to modify the starting point $k_0^{(p)}$ into a specific value. The specific value may be determined in a manner of determination according to the frequency-domain starting position of the PUSCH, or configuration by the higher layer, or notification through physical-layer DCI signaling or common DCI, or predetermination by a base station and UE, or predefinition or the like. In addition, a new frequency-domain structure of the SRS is acquired by modifying a value of a present transmission comb, namely increasing the value of the transmission comb.

Figure 4:
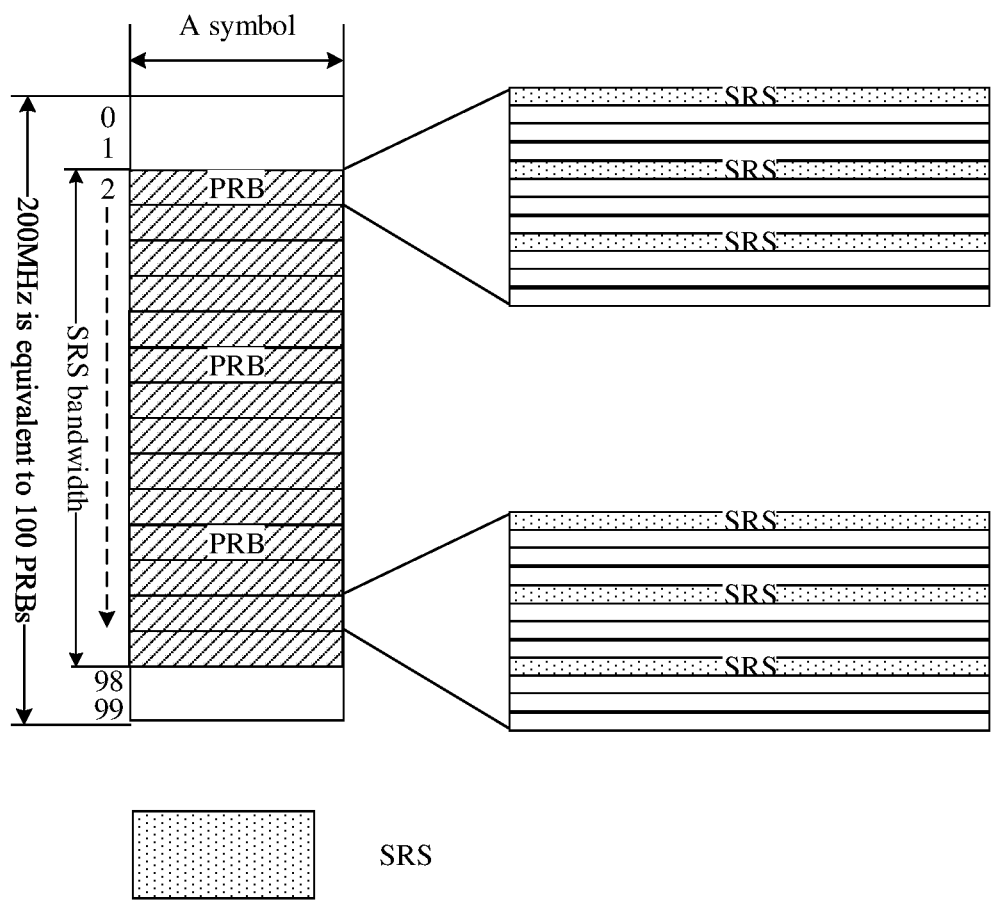
FIG. 4 is a schematic diagram of discrete mapping of a narrow-band SRS to a whole bandwidth according to an embodiment of the disclosure.

For example, for the condition that a frequency-domain transmission structure of the SRS is not influenced by a waveform of the PUSCH. If a UL system bandwidth is 20 MHz (equivalent to 100 PRBs or equivalent to 1,200 subcarriers), it is determined by the cell bandwidth $C_{SRS}=6$ and the UE bandwidth $B_{SRS}=0$ that $m_{SRS,0}$ is 48 PRBs (according to the original transmission comb number 2, a total number of subcarriers occupied by the SRS on the frequency domain is 48*12/2=288 subcarriers) and the frequency-domain starting point is a PRB index 2 (frequency-domain PRB index starting point is 0), mapping is executed according to the new transmission comb number 4 to obtain an SRS sequence length the same as the original length, as shown in FIG. 4. FIG. 4 is a schematic diagram of discrete mapping of a narrow-band SRS to a whole bandwidth according to an embodiment of the disclosure.

Figure 5:
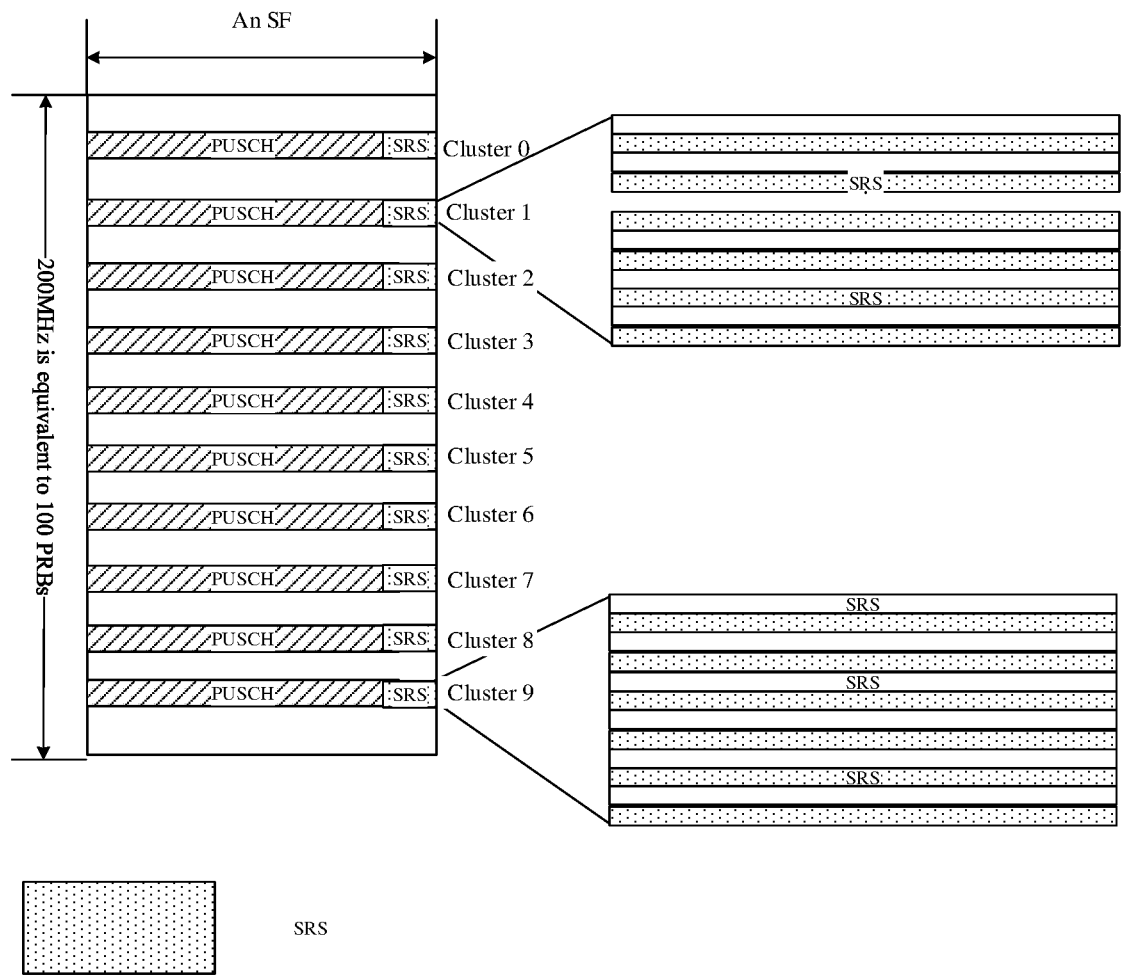
FIG. 5 is a schematic diagram of mapping of an SRS into discrete resources corresponding to a Physical Uplink Shared Channel (PUSCH) cluster according to an embodiment of the disclosure.

For example, for the condition that the frequency-domain transmission structure of the SRS is influenced by the waveform of the PUSCH, the frequency-domain starting position of the SRS is determined according to the frequency-domain starting position of the PUSCH. That is, the sequence length corresponding to the narrow-band SRS is mapped onto discrete frequency-domain resource positions corresponding to the PUSCH on the frequency domain. FIG. 5 is a schematic diagram of mapping of an SRS into discrete resource corresponding to a PUSCH cluster according to an embodiment of the disclosure. As shown in FIG. 5, the SRS sequence length is mapped onto the frequency-domain resources of the PUSCH according to a specific mapping relationship under the condition of not changing the SRS sequence length.

The specific relationship is as follows: There is made such a hypothesis that a frequency-domain pattern of the PUSCH is discrete at equal intervals, a total number of discrete resources of the PUSCH on the whole bandwidth is D and each discrete resource includes the same number of PRBs. If a first PUSCH resource index of the UE on the whole frequency domain is PRB#0 and the interval is 10, frequency-domain resource positions of the PUSCH are: the PRB#0 (a corresponding SF includes subcarrier #0~subcarrier #11), a PRB#10 (a corresponding SF includes subcarrier #120~subcarrier #131), a PRB#20 (a corresponding SF includes subcarrier #240~subcarrier #251), a PRB#30 (a corresponding SF includes subcarrier #360~subcarrier #371), a PRB#40 (a corresponding SF includes subcarrier #480~subcarrier #491), a PRB#50 (a corresponding SF includes subcarrier #600~subcarrier #611), a PRB#60 (a corresponding SF includes subcarrier #720~subcarrier #731), a PRB#70 (a corresponding SF includes subcarrier #840~subcarrier #851), a PRB#80 (a corresponding SF includes subcarrier #960~subcarrier #971) and a PRB#90 (a corresponding SF includes subcarrier #1,080~subcarrier #1,091). The bandwidth of the SRS is 12 PRBs, it can be known according to the original transmission comb number 2 that the sequence length is 72 subcarriers and the 72 subcarriers are mapped onto a subcarrier interval where the PUSCH is located on the frequency domain according to a specific rule. The specific rule is that: the SRS is mapped according to a specific transmission comb in each PUSCH cluster (an SRS sequence length mapped in a cluster is determined by a size of the PUSCH cluster and a total number of transmission combs for SRS mapping) and a frequency-domain mapping starting point in a next cluster is obtained by adding 12*(PRB index number+1) to an original frequency-domain subcarrier index. Both of PRB and subcarrier index numbers start from 0.

A mapping relationship between a virtual number of an SRS sequence and discrete frequency-domain resources of a PUSCH is that: the discrete PUSCH resources are extracted from resources of the whole bandwidth and sequentially arranged into successive PUSCH RBs, then the SRS sequence is sequentially mapped onto the successive PUSCH RBs which are sequentially arranged and the extracted PUSCH resources are further recovered to corresponding resource positions in the whole bandwidth. For example, indexes of the discrete PUSCH resources in the whole bandwidth are the PRB#0 (the corresponding SF includes subcarrier #0~subcarrier #11), the PRB#10 (the corresponding SF includes subcarrier #120~subcarrier #131), the PRB#20 (the corresponding SF includes subcarrier #240~subcarrier #251), the PRB#30 (the corresponding SF includes subcarrier #360~subcarrier #371), the PRB#40 (the corresponding SF includes subcarrier #480~subcarrier #491), the PRB#50 (the corresponding SF includes subcarrier #600~subcarrier #611), the PRB#60 (the corresponding SF includes subcarrier #720~subcarrier #731), the PRB#70 (the corresponding SF includes subcarrier #840~subcarrier #851), the PRB#80 (the corresponding SF includes subcarrier #960~subcarrier #971) and the PRB#90 (the corresponding SF includes subcarrier #1,080~subcarrier #1,091). The resources corresponding to the 10 clusters are spliced into 10 successive PRBs of which the indexes are recorded as PRB#0~PRB#9 and then the corresponding SRS sequence is mapped onto the corresponding spliced PUSCH resources according to the formula in the existing protocol. After mapping is completed, the PRBs are recovered to the original discrete resource positions. The transmission comb $K_{TC}$ in the mapping formula in the embodiment is modified into $K'_{TC}$=(a total number of the PUSCH clusters*cluster size (a total number of the PRBs)*a total number of subcarriers in an RB (i.e., 12)/$M_{sc,b}^{RS}$, where $M_{sc,b}^{RS}$=$m_{SRS,b}N_{sc}^{RB}$/$K_{TC}$. The frequency-domain starting position of the SRS in each PUSCH cluster is a fixed subcarrier position and is determined by notification through high-layer or physical-layer DCI or common DCI or predetermined by the base station and the UE or predefinition. The mapping relationship of the SRS sequence on the whole PUSCH is: (cluster number*cluster number index*a total number of subcarriers in a PRB)+a starting point of subcarriers in a cluster+$K'_{TC}$*(0, 1, . . . , (12/$K'_{TC}$−1)).

Mapping of the SRS sequence in each PUSCH cluster may be mapping through successive subcarriers or mapping according to transmission combs. When the SRS sequence length exceeds a frequency-domain PUSCH resource range, the SRS sequence may be truncated. When the SRS sequence length is smaller than the frequency-domain PUSCH resource range, the SRS sequence is repeated.

Sixth Optional Embodiment

A relationship between a total number of multiple antenna ports or an SRS waveform and an SRS SF position is mainly provided or established in the embodiment.

In an existing LTE protocol, an antenna port number is 1, or 2 or 4. A frequency-domain graph of an SRS mainly includes a frequency-domain starting position, or a frequency-domain starting position of a PUSCH is related to a cluster interval and a cluster size. A transmission comb number is 2 or 4.

When the SRS is sent through a single antenna port, there exist the following corresponding relationships.

The single antenna port corresponds to a transmission comb for transmission of the SRS. For example, an antenna port 0 corresponds to an SRS transmission comb 1. UE performs transmission on each SRS SF according to this transmission comb. If a frequency-domain structure of the SRS (the frequency-domain structure refers to specific transmission on one or more transmission combs on a frequency domain) is related to a frequency-domain resource pattern of the PUSCH or a waveform structure, the UE transmits the SRS in each PUSCH cluster according to successive or discrete transmission combs. Or, The single antenna port corresponds to transmission of the SRS at an even transmission comb position and corresponds to an SRS SF. Or, The single antenna port corresponds to transmission of the SRS at an odd transmission comb position and corresponds to an SRS SF. Or, The single antenna port corresponds to transmission of the SRS at the even transmission comb position and corresponds to multiple SRS SFs. Or, The single antenna port corresponds to transmission of the SRS at the odd transmission comb position and corresponds to multiple SRS SFs.

The UE may also adopt the same frequency-domain transmission pattern of the SRS in multiple SRS SFs or different SRS SFs correspond to different frequency-domain SRS resource positions. This is favorable for more accurate channel measurement of the UE.

When the SRS is sent through two antenna ports, there exist the following corresponding relationships.

The two antenna ports correspond to the same frequency-domain SRS transmission resource position. Or, An even antenna port corresponds to transmission of the SRS at the even transmission comb position. Or, An odd antenna port corresponds to transmission of the SRS at the odd transmission comb position. Or, The even antenna port corresponds to transmission of the SRS at the odd transmission comb position. Or, The odd antenna port corresponds to transmission of the SRS at the even transmission comb position. Or, The even antenna port corresponds to transmission of the SRS at the even transmission comb position and corresponds to an even cyclic shift. Or, the even antenna port corresponds to transmission of the even transmission comb position and corresponds to an odd cyclic shift. Or, The odd antenna port corresponds to transmission of the SRS at the odd transmission comb position and corresponds to the even cyclic shift. Or, The odd antenna port corresponds to transmission of the SRS at the odd transmission comb position and corresponds to the odd cyclic shift. Or, The even antenna port corresponds to transmission of the SRS at the even transmission comb position and corresponds to transmission of the SRS on an even UL SF. Or, The even antenna port corresponds to transmission of the SRS at the even transmission comb position and corresponds to transmission of the SRS on an odd UL SF. Or, The odd antenna port corresponds to transmission of the SRS at the odd transmission comb position and corresponds to transmission of the SRS on the even UL SF. Or, The odd antenna port corresponds to transmission of the SRS at the odd transmission comb position and corresponds to transmission of the SRS on the odd UL SF. Or, The even antenna port corresponds to transmission of the SRS at the odd transmission comb position and corresponds to transmission of the SRS on the even UL SF. Or, The even antenna port corresponds to transmission of the SRS at the odd transmission comb position and corresponds to transmission of the SRS on the odd UL SF. Or, The odd antenna port corresponds to transmission of the SRS at the even transmission comb position and corresponds to transmission of the SRS on the even UL SF. Or, The odd antenna port corresponds to transmission of the SRS at the even transmission comb position and corresponds to transmission of the SRS on the odd UL SF. Or, The even antenna port corresponds to transmission of the SRS at the even transmission comb position, corresponds to the even cyclic shift and corresponds to transmission of the SRS on the even UL SF. Or, The even antenna port corresponds to transmission of the SRS at the even transmission comb position, corresponds to the even cyclic shift and corresponds to transmission of the SRS on the odd UL SF. Or, The even antenna port corresponds to transmission of the SRS at the even transmission comb position, corresponds to the odd cyclic shift and corresponds to transmission of the SRS on the even UL SF. Or, The even antenna port corresponds to transmission of the SRS at the even transmission comb position, corresponds to the odd cyclic shift and corresponds to transmission of the SRS on the odd UL SF. Or, The odd antenna port corresponds to transmission of the SRS at the odd transmission comb position, corresponds to the even cyclic shift and corresponds to transmission of the SRS on the even UL SF. Or, The odd antenna port corresponds to transmission of the SRS at the odd transmission comb position, corresponds to the even cyclic shift and corresponds to transmission of the SRS on the odd UL SF. Or, The odd antenna port corresponds to transmission of the SRS at the odd transmission comb position, corresponds to the odd cyclic shift and corresponds to transmission of the SRS on the even UL SF. Or, The odd antenna port corresponds to transmission of the SRS at the odd transmission comb position, corresponds to the odd cyclic shift and corresponds to transmission of the SRS on the odd UL SF. Or, The odd/even antenna port corresponds to transmission of the SRS on all carriers in the PUSCH cluster. Or, The odd/even antenna port corresponds to transmission of the SRS on all the carriers in the PUSCH cluster and corresponds to at least one of the odd and even cyclic shifts. Or, The odd/even antenna port corresponds to transmission of the SRS on all the carriers in the PUSCH cluster and corresponds to transmission of the SRS on the even UL SF. Or, The odd/even antenna port corresponds to transmission of the SRS on all the carriers in the PUSCH cluster and corresponds to transmission of the SRS on the odd UL SF. Or, The odd/even antenna port corresponds to transmission of the SRS on all the carriers in the PUSCH cluster, corresponds to at least one of the odd and even cyclic shifts and corresponds to transmission of the SRS on the even UL SF. Or, The odd/even antenna port corresponds to transmission of the SRS on all the carriers in the PUSCH cluster, corresponds to at least one of the odd and even cyclic shifts and corresponds to transmission of the SRS on the odd UL SF.

When the SRS is sent through four antenna ports, there exist the following corresponding relationships.

For the four antenna ports, besides the frequency-domain SRS transmission position relationships and transmission SF relationships for the two antenna ports, the following relationships are further included.

An antenna port number corresponds to transmission of the SRS at a corresponding transmission comb number position and corresponds to transmission of the SRS on the even UL SF. Or, The antenna port number corresponds to transmission of the SRS at the corresponding transmission comb number position and corresponds to transmission of the SRS on the odd UL SF.

The odd antenna port corresponds to transmission of the SRS on a minimum comb in an odd comb number set. Or, The odd antenna port corresponds to transmission of the SRS on a maximum comb in the odd comb number set. Or, The odd antenna port corresponds to transmission of the SRS on a specific comb in the odd comb number set. Or, The odd antenna port corresponds to transmission of the SRS on a minimum comb in an even comb number set. Or, The odd antenna port corresponds to transmission of the SRS on a maximum comb in the even comb number set. Or, The odd antenna port corresponds to transmission of the SRS on a specific comb in the even comb number set. Or, The even antenna port corresponds to transmission of the SRS on the minimum comb in the even comb number set. Or, The even antenna port corresponds to transmission of the SRS on the maximum comb in the even comb number set. Or, The even antenna port corresponds to transmission of the SRS on the specific comb in the even comb number set. Or, The even antenna port corresponds to transmission of the SRS on the minimum comb in the odd comb number set. Or, The even antenna port corresponds to transmission of the SRS on the maximum comb in the odd comb number set. Or, The even antenna port corresponds to transmission of the SRS on the specific comb in the odd comb number set. Or, Each condition for the four antenna ports may also correspond to an even/odd cyclic shift set or transmission of the SRS on the even/odd UL SF respectively, which will not be listed herein one by one.

The frequency-domain SRS transmission comb resources are in the successive or discrete resources scheduled by the UE and corresponding to the PUSCH. Or the UE determines the frequency-domain positions independently from the frequency-domain resource positions of the PUSCH according to the frequency-domain starting position, the transmission combs and the like. When the UE may transmit the SRS on multiple UL SFs and LBT is successfully completed before one of these SFs where the SRS may be transmitted, the SRS is transmitted only once and the UE may not transmit the SRS on the other SRS SFs, or the UE, as long as successfully executing LBT, may send the SRS on all of these SFs where the SRS may be transmitted. The SFs where the SRS may be transmitted may be multiple UL SFs successive on the time domain or multiple UL SFs discrete on the time domain. Discrete may refer to discrete at equal intervals or unequal intervals.

Seventh Optional Embodiment

The embodiment provides an LBT mechanism for different SRS transmission manners.

A first condition: for the condition that an SRS and a PUSCH are transmitted together, a priority relationship is CCA for SRS+PUSCH>CCA for PUSCH.

If cat4 and a contention window A are adopted for CCA for PUSCH, cat4 and a contention window B (A>B) or Cat2 or a CCA mechanism for a DRS is adopted for CCA for SRS+PUSCH.

If cat2 or the CCA mechanism for the DRS is adopted for CCA for PUSCH and a CCA duration is A, cat2 or the CCA mechanism for the DRS is adopted for CCA for SRS+PUSCH and a CCA duration is B (A>B).

A CCA starting point may be fixed or CCA for SRS+PUSCH is configured to be earlier than CCA for PUSCH.

A second condition: for the condition that the SRS and a PUSCH of other UE are transmitted together, the priority relationship is CCA for SRS+PUSCH (of its own or the other UE)>=CCA for SRS.

The same LBT mechanism and principle in the first condition are adopted. Compared with sending of the PUSCH (no matter whether there is an SRS or not), only transmitting a CCA mechanism or parameter for the SRS may ensure simpler or faster channel access. Or the same CCA mechanism or parameter and the same starting point are coordinated or configured by a higher layer or a physical layer. The LBT mechanism executed for the condition that the SRS is independently transmitted or the SRS is transmitted together with the PUSCH of the other UE may adopt 25 us one-shot LBT with a fixed CCA starting point, or adopt enhanced 25 us one-shot LBT with a random or unfixed CCA starting point or adopt a similar LBT mechanism for the DRS.

Figure 6:
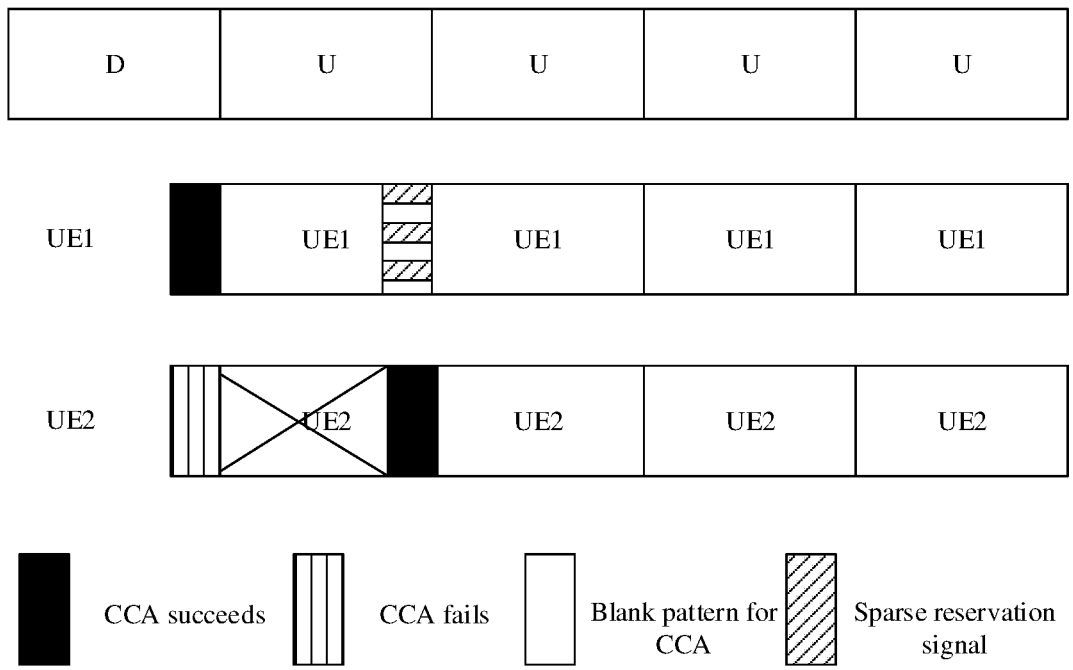
FIG. 6 is a first schematic diagram of a multi-SF scheduling scenario according to an embodiment of the disclosure.

For a multi-SF scheduling condition, there is made such a hypothesis that UE1 and UE2 are successively scheduled on four SFs (as shown in FIG. 6, FIG. 6 is a first schematic diagram of a multi-SF scheduling scenario according to an embodiment of the disclosure). When the UE1 successfully executes LBT before the successive scheduling SFs, for example LBT Cat4 is adopted and a maximum contention window is not larger than 7, while the UE2 fails to execute LBT, in such case, if the UE1 normally sends data on the multiple successive scheduling SFs, channel access of the UE2 is blocked or influenced. On such a basis, the UE1 may keep last one or more symbols of a first scheduling SF or an SF indicated by a base station or first one or more symbols of the SF vacant and transmit no PUSCH for the scheduled UE2 to execute CCA. In such case, for preventing channel loss of the UE1 at a blank symbol position, the UE1 may execute one of the following operations at a blank symbol, for example, the last symbol in the first scheduling SF: one is to execute LBT, 25 us one-shot LBT being adopted; and the other is to send a reservation signal or an occupancy signal on a specific Resource Element (RE) only. The UE1 may send an SRS on a specific RE interval on the last symbol. In such case, the UE2 may also adopt 25 us one-shot LBT to increase channel access opportunities, or the UE2 contends for access according to LBT Cat4 of which the maximum contention window is not larger than 7.

Figure 7:
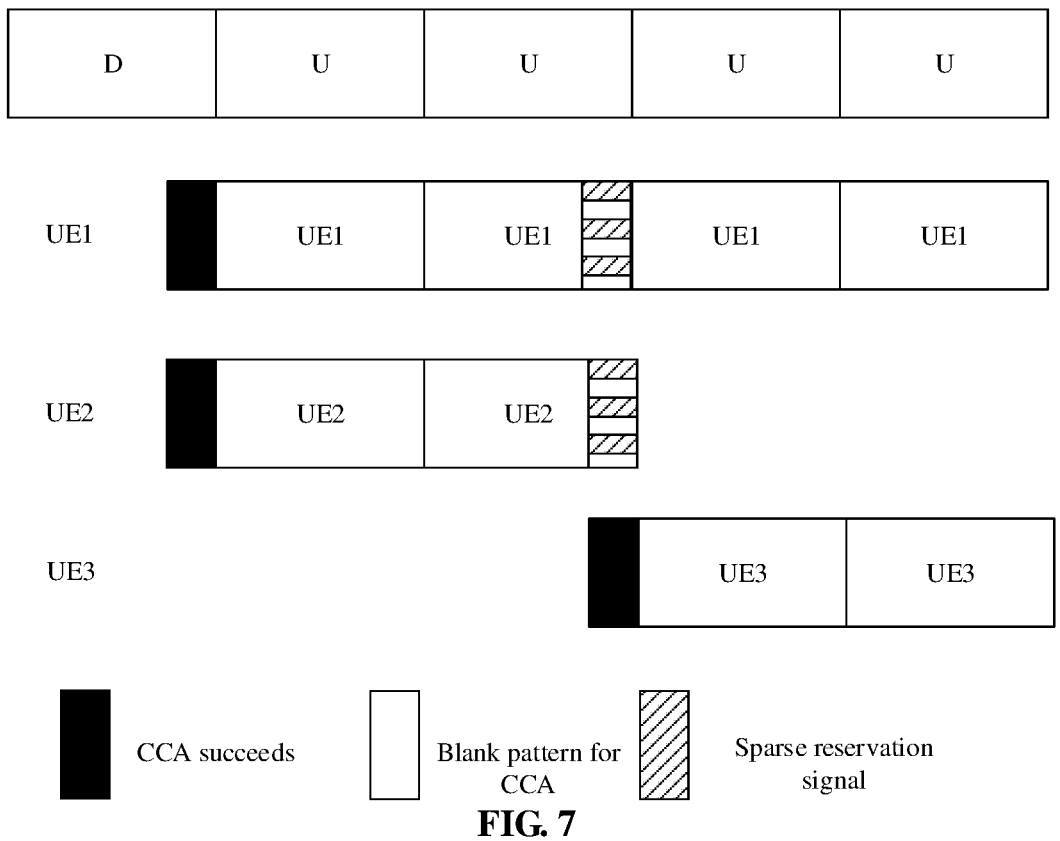
FIG. 7 is a second schematic diagram of a multi-SF scheduling scenario according to the disclosure.

Another scenario is that: the UE1 is continuously scheduled on an SF1, an SF2, an SF3 and an SF4 and the UE is continuously scheduled on the SF3 and the SF4. For ensuring multiplexing of the UE2 and the UE1 on the SFs 3 and 4, the UE1 executes LBT before transmission on the successive scheduling SFs and adopts LBT Cat4 of which the maximum contention window is not larger than 7. The UE1, after successfully executing LBT, starts transmitting the PUSCH on the SF1 and the SF2 and keeps a last symbol in the SF2 vacant for the UE2 scheduled on the SF3 to execute CCA. For the UE1, LBT may be executed in the last symbol in the SF2 and 25 us one-shot LBT is adopted, or the reservation signal or the occupancy signal is sent only on the specific RE. The UE2 executes LBT in the last symbol in the SF2 according to LBT Cat4 of which the maximum contention window is not larger than 7. If the UE2 successfully executes LBT, the PUSCH is transmitted on the scheduling SF. In case of a failure, LBT is continued to be executed on a last symbol of the SF3 before the SF4. The UE may continue performing channel access according to original LBT Cat4 of which the maximum contention window is not larger than 7, or by adopting LBT Cat4 of which the maximum contention window is not larger than 3 or by adopting 25 us one-shot LBT. The UE1, after failing in LBT, may adopt a processing manner in which the UE2 executes LBT. A configured cell-level symbol position may also be configured for the UE to execute CCA. When there is SRS required to be sent on the symbol, the SRS is only sent on the specific RE and a vacant RE is configured to schedule the UE to execute CCA in a next SF. When there is no SRS required to be sent on the symbol, the UE may send the reservation signal or the occupancy signal or execute the LBT mechanism on a specific RE of the symbol. A total number of vacant symbols on the specific SF or vacant symbol positions may be indicated by the base station (indicated by adopting dedicated DCI or common DCI) and may also be predetermined by the base station and the UE, or each UL SF is vacant or a high-layer RRC configuration is adopted. There is also another scenario. There is made such a hypothesis that the UE1 is continuously scheduled on the SF1, the SF2, the SF3 and the SF4, the UE2 is scheduled on the SF1 and the SF2 and UE3 is scheduled on the SF3 and the SF4. As shown in FIG. 7, FIG. 7 is a second schematic diagram of a multi-SF scheduling scenario according to the disclosure. If the UE1 and the UE2 successfully execute CCA. LBT Cat4 is adopted and the maximum contention window is not larger than 7. In addition, the UE2 has low traffic and completes transmission in two successive scheduling SFs. In such case, for the UE1, if data is transmitted on each SF according to a conventional manner, CCA execution of the UE3 may be blocked. On such a basis, the base station may notify the UE1 and the UE2 not to send any PUSCH on last one or two symbols of the SF2, namely keeping the corresponding symbols vacant, through DCI or common DCI or newly designed DCI signaling for the UE3 scheduled in the next SF to execute CCA. For preventing channel loss of the UE1 at the blank symbol position, the UE1 may execute one of the following operations at a blank symbol: one is to execute LBT, 25 us one-shot LBT being adopted; and the other is to send the reservation signal or an occupancy signal on the specific RE only. The UE1 may send the SRS on the specific RE interval on the last symbol. For the UE3, CCA may be executed on a blank RE in a corresponding CCA symbol, or LBT Cat4 of which the maximum contention window is not larger than 7 is executed in the CCA symbol or 25 us one-shot LBT is adopted for channel access.

In the multi-SF scheduling scenario, the symbol positions or SF positions required to be kept vacant in a UL transmission burst or the specific symbols kept vacant in an SF or multiple SFs in multiple successive SFs and a total number of the symbols may be dynamically notified through dedicated physical-layer DCI or common DCI or newly designed DCI signaling. In an embodiment, the vacant symbol is located at a last symbol of an SF, last two symbols in the SF, or a first symbol in the SF or first two symbols in the SF. Herein, the SF may be the first successive scheduling SF, or a second SF in the successive scheduling SFs or a specific SF in the successive scheduling SFs. The vacant symbols are configured for contending UE to execute CCA. The specific SF may be indicated or notified by the base station through the DCI signaling or the common DCI signaling. For a single-SF scheduling scenario, each UL SF may be configured as a position where the UE executes CCA.

Eighth Optional Embodiment

The embodiment provides a time/frequency-domain structural design meeting a 1 ms regulatory requirement for SRS transmission.

The following SRS transmission structures may be designed according to the regulatory requirement that a duration occupied by signal transmission on an unlicensed carrier is at least 1 ms.

Figure 8:
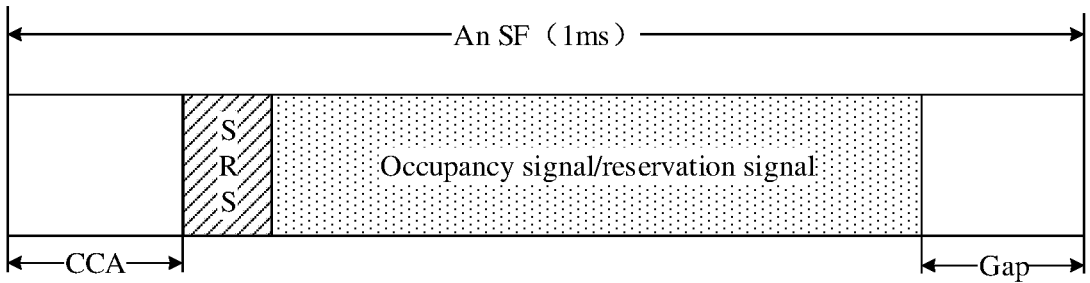
FIG. 8 is a first schematic diagram of Clear Channel Assessment (CCA) in an SF and an occupancy signal/or channel and an SRS according to an embodiment of the disclosure.

① In an SF, a CCA position is earlier than first s symbols of the SF, an SRS is transmitted on a symbol s+1 and the other symbols are occupied by an occupancy signal or channel For CCA execution of UE in a next scheduling SF, last s1 symbols in the occupancy signal in the SF may also be kept vacant, or specific REs in the last s1 symbols in the occupancy signal in the SF are silent, as shown in FIG. 8. FIG. 8 is a first schematic diagram of CCA in an SF and an occupancy signal/or channel and an SRS according to an embodiment of the disclosure. The occupancy signal may be a PUSCH, or a PRACH or a PUCCH and the occupancy signal may be sent on a whole bandwidth or discrete on the whole bandwidth in a cluster form (that is, an interleaving or block interleaving manner is adopted for the occupancy signal on the whole frequency domain). A cluster may take a PRB or an RE or a sub-band or a Resource Block Group (RGB) as a unit.

Figure 9:
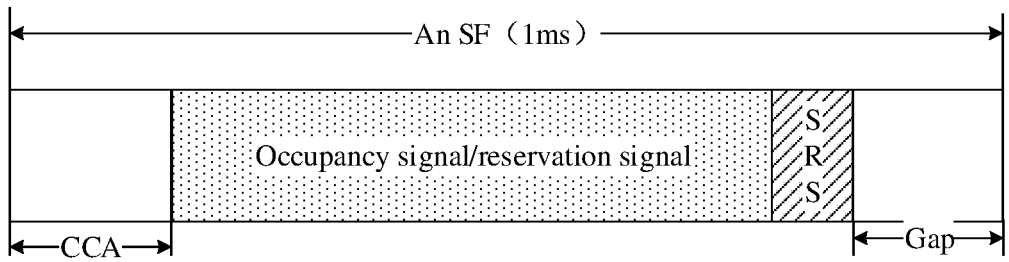
FIG. 9 is a second schematic diagram of CCA in an SF and an occupancy signal/or channel and an SRS according to an embodiment of the disclosure.

② A difference from ① is that an SRS transmission position is modified. The SRS position is at a symbol after the PUSCH and a spare symbol at the end of an SF or a vacant RE in the symbol at the end of the SF is configured for the UE scheduled in the next SF to execute CCA. As shown in FIG. 9, FIG. 9 is a second schematic diagram of CCA in an SF and an occupancy signal/or channel and an SRS according to an embodiment of the disclosure.

③ In an SF, CCA is independently executed for the occupancy signal or channel and the SRS. There exist two conditions.

Figure 10:
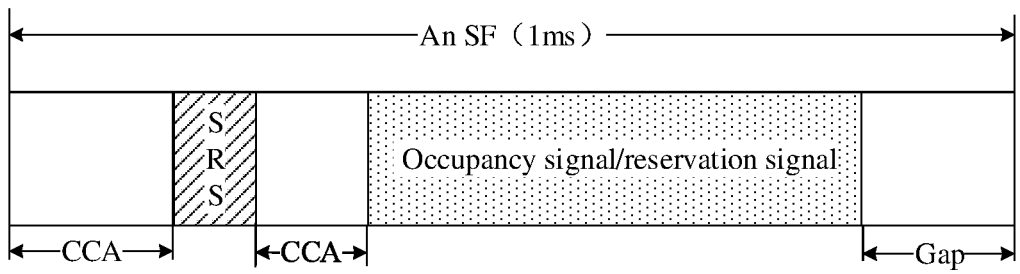
FIG. 10 is a third schematic diagram of CCA in an SF and an occupancy signal/or channel and an SRS according to an embodiment of the disclosure.

A first condition: in an SF, the CCA position is at first s symbols (configured to send the SRS) of the SF+an SRS symbol (located at a symbol s+1)+CCA for the occupancy signal or channel+the occupancy signal or channel. As shown in FIG. 10, FIG. 10 is a third schematic diagram of CCA in an SF and an occupancy signal/or channel and an SRS according to an embodiment of the disclosure. A gap after the occupancy signal is allocable and optional. The gap is configured for the UE scheduled in the next SF to execute CCA.

Figure 11:
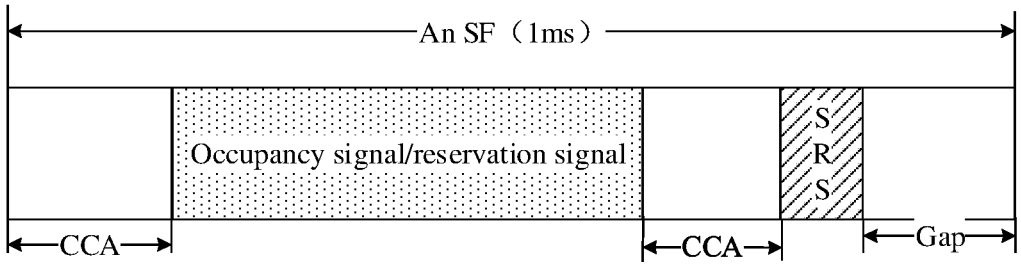
FIG. 11 is a fourth schematic diagram of CCA in an SF and an occupancy signal/or channel and an SRS according to an embodiment of the disclosure.

A second condition: a difference from the first condition is that the SRS transmission position is after the occupancy signal or channel. As shown in FIG. 11, FIG. 11 is a fourth schematic diagram of CCA in an SF and an occupancy signal/or channel and an SRS according to an embodiment of the disclosure.

Figure 12:
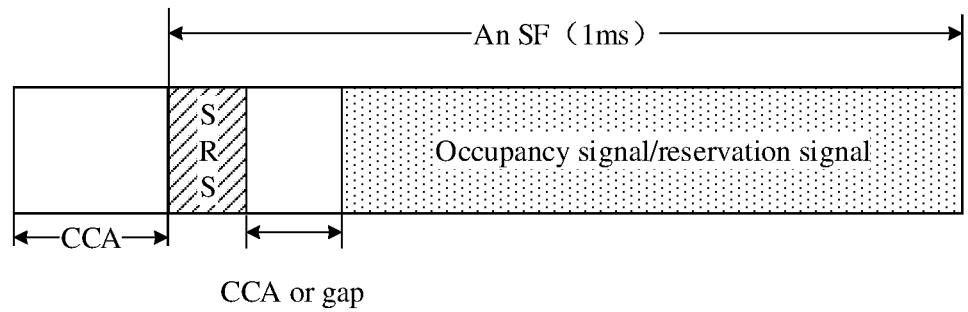
FIG. 12 is a fifth schematic diagram of CCA in an SF and an occupancy signal/or channel and an SRS according to an embodiment of the disclosure.

④ A time-domain structure in an SF is SRS+CCA (or gap)+the occupancy signal or channel A CCA position executed for sending of the SRS is at last s symbols of a previous SF of the SF, last s1 symbols in symbols for the occupancy signal or channel may be vacant or only specific REs in the s1 symbols are vacant, or no symbol is vacant. As shown in FIG. 12, FIG. 12 is a fifth schematic diagram of CCA in an SF and an occupancy signal/or channel and an SRS according to an embodiment of the disclosure.

Figure 13:
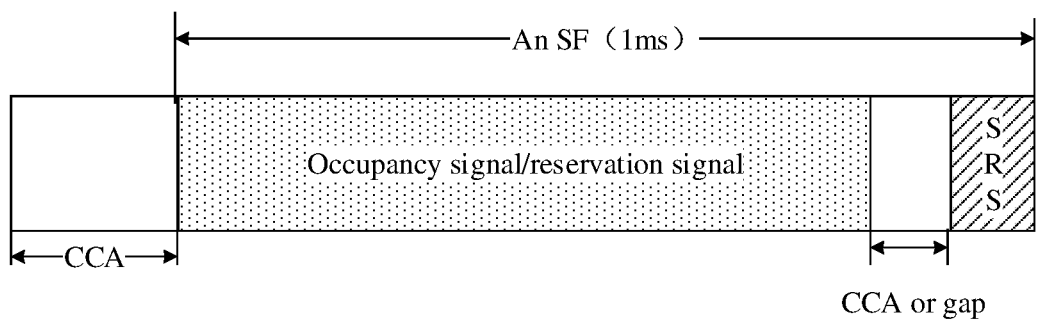
FIG. 13 is a sixth schematic diagram of CCA in an SF and an occupancy signal/or channel and an SRS according to an embodiment of the disclosure.

⑤ A time-domain structure in an SF is the occupancy signal or channel+CCA (or gap)+SRS. A CCA position executed for sending of the occupancy signal or channel is at last s symbols of the previous SF of the SF and the SRS occupies a last symbol in the SF. CCA executed for sending of the SRS is located in one or more symbols before the SRS symbol. As shown in FIG. 13, FIG. 13 is a sixth schematic diagram of CCA in an SF and an occupancy signal/or channel and an SRS according to an embodiment of the disclosure.

For the condition of simultaneous transmission of the SRS and the PUSCH, after the SRS transmission symbol position is modified, there may exist a conflict with a Channel Quality Indicator (CQI), Rank Indicator (RI) and ACK/NACK position in the PUSCH. When the SRS position conflicts with the CQI, the RI and the ACK/NACK position, transmission of the SRS may be aborted, or, whether to abort transmission of the SRS is determined according to whether a total number of times for which the SRS position conflicts with the CQI or the RI or the ACK/NACK position reaches a preset threshold value or not.

The embodiments further provide SRS sending and receiving devices, UE and a base station. The devices are configured to implement the abovementioned embodiments and preferred implementation modes. What has been described will not be elaborated. For example, term "module", used below, may be a combination of at least one of software and hardware capable of realizing a preset function. Although the devices described in the following embodiment are preferably implemented with software, implementation with hardware or a combination of the software and the hardware is also possible and conceivable.

Third Embodiment

Figure 14:
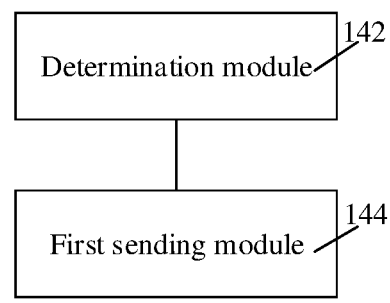
FIG. 14 is a structure block diagram of an SRS sending device according to an embodiment of the disclosure.

FIG. 14 is a structure block diagram of an SRS sending device according to an embodiment of the disclosure. As shown in FIG. 14, the device includes: a determination module 142 and a first sending module 144. The device will be described below.

The determination module 142 is configured to determine a resource for sending an SRS on an unlicensed carrier. The first sending module 144 is connected to the determination module 142 and configured to send the SRS according to the determined resource.

Figure 15:
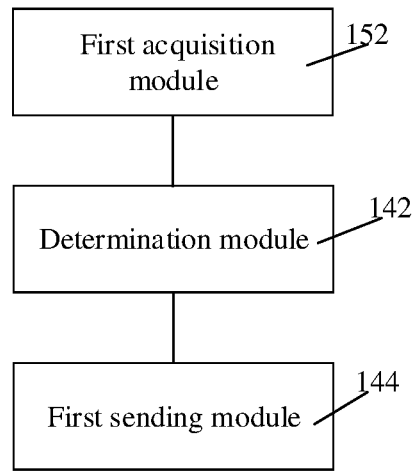
FIG. 15 is a first preferred structure block diagram of an SRS sending device according to an embodiment of the disclosure.

FIG. 15 is a first preferred structure block diagram of an SRS sending device according to an embodiment of the disclosure. As shown in FIG. 15, the device, besides all the modules shown in FIG. 14, further includes a first acquisition module 152. The first acquisition module 152 will be described below.

The first acquisition module 152 is connected to the determination module 142 and configured to acquire an SRS parameter or parameter set to be used in sending the SRS. The SRS parameter or parameter includes at least one of:

a first SRS parameter or parameter set configured through high-layer RRC signaling; and a second SRS parameter or parameter set configured through dedicated physical-layer DCI signaling, common DCI signaling or newly designed DCI signaling.

The determination module is further configured to determine the resource for sending the SRS on the unlicensed carrier based on at least one of the acquired first SRS parameter or parameter set and second SRS parameter or parameter set.

Figure 16:
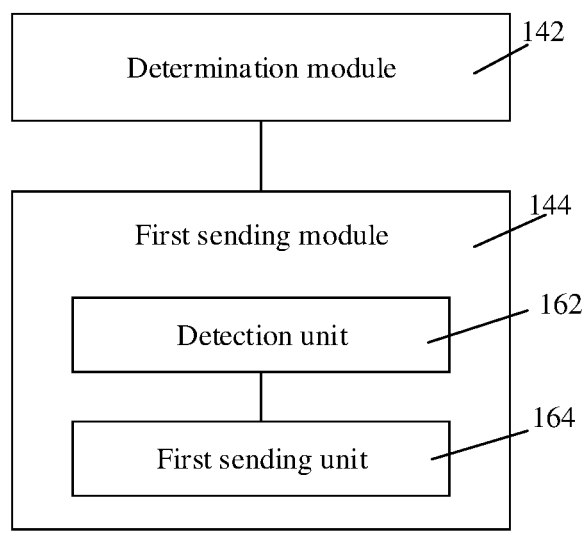
FIG. 16 is a preferred structure block diagram of a first sending module in an SRS sending device according to an embodiment of the disclosure.

FIG. 16 is a preferred structure block diagram of a first sending module 144 in an SRS sending device according to an embodiment of the disclosure. As shown in FIG. 16, the first sending module 144 includes a detection unit 162 and a first sending unit 164. The first sending module 144 will be described below.

The detection unit 162 is configured to, before the SRS is sent at an SRS SF position determined according to at least one of a period and an offset, an SRS SF position and an SRS SF set, execute CCA.

The first sending unit 164 is connected to the detection unit 162 and configured to, under the condition that CCA is successfully executed and a determined SRS SF corresponds to a UL SF of the unlicensed carrier, send the SRS on the determined SRS SF.

In an embodiment, the determination module 142 is further configured to determine the SRS SF in at least one of the following manners.

A first manner: at least one of the SF position for sending the SRS and SRS SF set is indicated through the dedicated DCI signaling or common DCI signaling or newly designed DCI signaling sent by a base station and the SRS SF is determined.

A second manner: the SRS SF is determined according to an SF index n for sending of the dedicated DCI signaling or common DCI signaling or newly designed DCI signaling sent by the base station and a predetermined timing relationship. A third manner: the SRS SF is determined in a manner of predetermination by the base station and UE or implicit indication.

In an embodiment, the first sending module 144 is further configured to execute at least one of the following operations: no matter whether a PUSCH is configured on the determined SRS SF or not, sending the SRS on the determined SRS SF; when an own PUSCH is configured on the determined SRS SF, sending the SRS on the determined SRS SF; when a PUSCH of other UE is configured on the determined SRS SF, sending the SRS on the determined SRS SF; and when no PUSCH is configured on the determined SRS SF, sending the SRS on the determined SRS SF.

Figure 17:
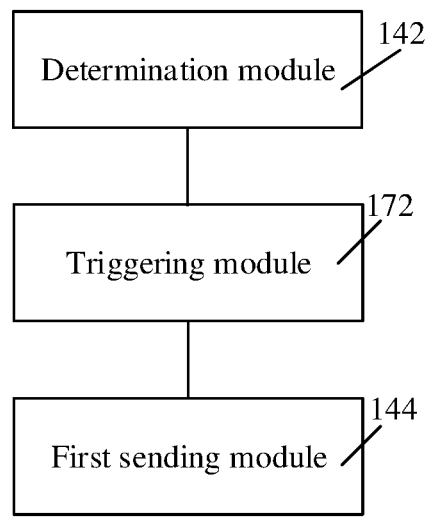
FIG. 17 is a second preferred structure block diagram of an SRS sending device according to an embodiment of the disclosure.

FIG. 17 is a second preferred structure block diagram of an SRS sending device according to an embodiment of the disclosure. As shown in FIG. 17, the device, besides all the modules shown in FIG. 14, further includes a triggering module 172. The triggering module 172 will be described below.

The triggering module 172 is connected to the determination module 142 and the first sending module 144 and configured to, before an AP-SRS is sent according to the determined resource, trigger the AP-SRS to be sent in one of the following manners: triggering sending of the AP-SRS through an SRS request field in a DCI format 0/4/1A/2B/2C/2D; triggering sending of the AP-SRS through common DCI in a DCI format 1C; and triggering sending of the AP-SRS through a newly designed DCI format.

In an embodiment, the first sending module 144 is further configured to map an SRS sequence onto corresponding resources according to a frequency-domain position and a transmission comb or map the SRS onto a corresponding discrete or successive PUSCH pattern based on the PUSCH pattern.

Figure 18:
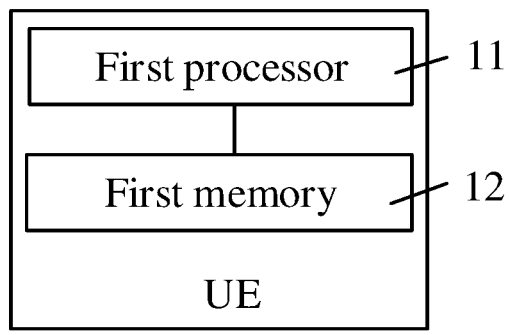
FIG. 18 is a structure block diagram of UE according to an embodiment of the disclosure.

FIG. 18 is a structure block diagram of UE according to an embodiment of the disclosure. As shown in FIG. 18, the UE includes a first processor 11 and a first memory 12.

The first processor 11 is configured to determine a resource for sending an SRS on an unlicensed carrier and is configured to send the SRS according to the determined resource.

The first memory 12 is coupled to the first processor 11.

In an embodiment, the first processor 11 is further configured to acquire an SRS parameter set configured to send the SRS and determine the resource for sending the SRS on the unlicensed carrier based on the acquired SRS parameter or parameter set.

The SRS parameter or parameter set includes at least one of:

a first SRS parameter or parameter set; and a second SRS parameter or parameter set.

In an embodiment, the first processor 11 is further configured to execute CCA and, when CCA succeeds, send the SRS on the determined resource.

Fourth Embodiment

Figure 19:
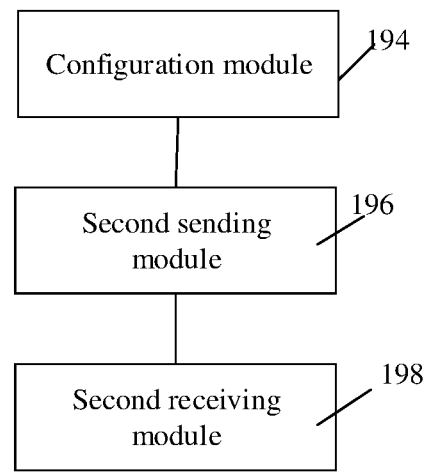
FIG. 19 is a structure block diagram of an SRS receiving device according to an embodiment of the disclosure.

FIG. 19 is a structure block diagram of an SRS receiving device according to an embodiment of the disclosure. As shown in FIG. 19, the device includes a configuration module 194, a second sending module 196 and a receiving module 198. The device will be described below.

The configuration module 194 is configured to configure a first SRS parameter set configured to send an SRS through high-layer signaling or is configured to configure a second SRS parameter or parameter set to be used in sending the SRS through dedicated physical-layer DCI signaling or common DCI signaling or newly designed DCI signaling. The second sending module 196 is connected to the configuration module 194 and configured to send at least one of the received first SRS parameter or parameter set and the configured second SRS parameter or parameter set to UE. The receiving module 198 is configured to receive the SRS sent by the UE on a resource determined by the UE according to at least one of the first SRS parameter or parameter set and the second SRS parameter or parameter set and configured to send the SRS on an unlicensed carrier.

In an embodiment, the configuration module 194 is further configured to configure the second SRS parameter or parameter set to be used in sending the SRS through the dedicated DCI signaling or the common DCI signaling or the newly designed DCI signaling in at least one of the following manners.

A first manner: at least one of a SF position for sending the SRS and SRS SF set is indicated through the dedicated DCI signaling or common DCI signaling or newly designed DCI signaling sent by a base station and an SRS SF configured to send the SRS is determined. A second manner: the SRS SF is configured according to an SF index n for sending of the dedicated DCI signaling or common DCI signaling or newly designed DCI signaling sent by the base station and a predetermined timing relationship. A third manner: the SRS SF is configured in a manner of predetermination or implicit indication by the base station and the UE.

In an embodiment, the configuration module 194 is further configured to trigger an AP-SRS to be sent in one of the following manners: triggering sending of the AP-SRS through an SRS request field in a DCI format 0/4/1A/2B/2C/2D; triggering sending of the AP-SRS through common DCI in a DCI format 1C; and triggering sending of the AP-SRS through a newly designed DCI format.

Figure 20:
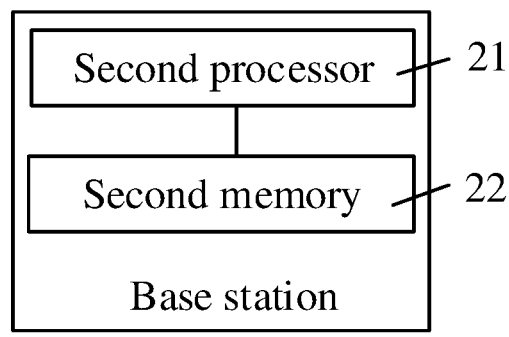
FIG. 20 is a structure block diagram of a base station according to an embodiment of the disclosure.

FIG. 20 is a structure block diagram of a base station according to an embodiment of the disclosure. As shown in FIG. 20, the base station includes a second processor 21 and a second memory 22.

The second processor 21 is configured to send at least one of information configured to trigger and send an SRS or a configured parameter or parameter set to be used in sending the SRS to UE and is configured to receive the SRS sent by the UE on a resource determined by the UE based on the received information and configured to send the SRS on an unlicensed carrier.

The second memory 22 is coupled to the second processor 21.

In an embodiment, the SRS parameter or parameter set includes at least one of:

a first SRS parameter or parameter set; and a second SRS parameter or parameter set.

Correspondingly, the second processor 21 is further configured to configure the first SRS parameter or parameter set for the SRS through RRC signaling or configure the second SRS parameter or parameter set to be used in sending the SRS through dedicated physical-layer DCI signaling, common DCI signaling or newly designed DCI signaling.

The embodiment of the disclosure further provides an SRS processing system. The system in the embodiment of the disclosure includes UE and a base station.

The base station is configured to send a parameter or parameter set configured to send an SRS to the UE 31.

The UE is configured to determine a resource configured to send the SRS on an unlicensed carrier based on the SRS parameter or parameter set and send the SRS to the base station on the determined resource.

The base station is further configured to receive the SRS on the determined resource.

In an embodiment, the SRS parameter or parameter set includes at least one of:

a first SRS parameter or parameter set; and a second SRS parameter or parameter set.

The base station is further configured to configure the first SRS parameter or parameter set for the SRS through RRC signaling or configure the second SRS parameter or parameter set to be used in sending the SRS through dedicated physical-layer DCI signaling, common DCI signaling or newly designed DCI signaling.

In an embodiment, the UE is further configured to acquire the SRS parameter or parameter set in at least one of the following manners:

configuration through the high-layer RRC signaling;
configuration through the dedicated physical-layer DCI signaling;
configuration through the common DCI signaling; and
configuration through the newly defined DCI signaling.

The first SRS parameter or parameter set or the second SRS parameter or parameter set includes at least one of:

a cell-level bandwidth, a UE-level bandwidth, a period, an offset, a frequency-domain position, a first transmission comb, a cyclic shift, a transmission comb number, an antenna port and an SRS SF position or SRS SF set for sending of the SRS.

In an embodiment, the UE is further configured to execute CCA and, responsive to determining that CCA succeeds, send the SRS on the determined resource.

In an embodiment, the UE is further configured to determine a position of the resource sending the SRS through at least one of the following information:

the period and the offset; the SRS SF position; or the SRS SF set.

In an embodiment, the UE is further configured to determine the SRS SF position in at least one of the following manners.

At least one of the SF position for sending the SRS and SRS SF set is indicated through the dedicated DCI signaling, common DCI signaling or newly designed DCI signaling sent by the base station and the SRS SF position is determined.

The SRS SF position is determined according to an SF index n for the dedicated DCI signaling, common DCI signaling or newly designed DCI signaling sent by the base station and a predetermined timing relationship.

The SRS SF position is determined in a manner of predetermination or implicit indication by the base station and the UE.

It is to be noted that each of the abovementioned modules may be implemented through software or hardware and the latter condition may be implemented in, but not limited to, the following manner: all of the modules are located in the same processor or the modules are located in multiple processors respectively.

The embodiments of the disclosure further provide a storage medium. In an embodiment, the storage medium may be configured to store a program code configured to execute the following steps: the steps of the first embodiment or the second embodiment or the steps in any one of the first to fifth optional embodiments.

Each module disclosed in the embodiments of the disclosure may be implemented through a processor and, of course, may also be implemented through a specific logic circuit. During a practical implementation, the processor may be a Central Processing Unit (CPU), a Microprocessor Unit (MPU), a Field Programmable Gate Array (FPGA) or the like.

In the embodiments of the disclosure, when being implemented in form of software functional module and sold or used as an independent product, the SRS sending and receiving methods may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read-Only Memory (ROM), a magnetic disk or an optical disk. As a consequence, the embodiments of the disclosure are not limited to any specific hardware and software combination.

Correspondingly, the embodiments of the disclosure further provide a computer storage medium, in which a computer program is stored, the computer program being configured to execute the SRS sending and receiving methods of the embodiments of the disclosure.

The above is only the preferred embodiment of the invention and not intended to limit the invention. For those skilled in the art, the invention may have various modifications and variations. Any modifications, equivalent replacements, improvements and the like made within the spirit and principle of the disclosure shall fall within the scope of protection of the disclosure.

INDUSTRIAL APPLICABILITY

According to the embodiments of the disclosure, the UE determines the resource for sending the SRS on the unlicensed carrier and sends the SRS to the base station according to the determined resource. Therefore, the problem of few transmission opportunities for transmission of the SRS on the unlicensed carrier in the related art is solved and the effect of increasing transmission opportunities for transmission of the SRS on the unlicensed carrier is further achieved.

The invention claimed is:

1. A method for sending a Sounding Reference Signal (SRS), comprising:
determining a resource for sending an Aperiodic SRS (AP-SRS) on an unlicensed carrier by a 2-bit SRS request field indicated in Downlink Control Information (DCI) format 0B/4B; and
sending the AP-SRS according to the determined resource;
wherein the 2-bit SRS request field indicates:
no AP-SRS trigger; or
AP-SRS trigger and at least one of a SubFrame (SF) position, SF position set, symbol or symbol set for sending the AP-SRS.

2. The method of claim 1, wherein field information of the 2-bit SRS request field in the DCI format 0B/4B comprises at least one of the following information:
- not triggering AP-SRS;
- triggering of the AP-SRS and configuration of at least one of an SRS SF position, SF position set, symbol or symbol set;
- triggering of the AP-SRS and configuration of at least one of succesive SRS SF positions, SF position set, symbol or symbol set;
- triggering of the AP-SRS and configuration of at least one of discrete SRS SF positions, SF position set, symbol or symbol set;
- triggering of the AP-SRS and configuration of at least one of an SRS SF set or symbol set, the set comprising only one element and a position corresponding to the element being at least one of an SRS SF position or symbol set;
- triggering of the AP-SRS and configuration of at least one of an SRS SF set or symbol set, the set comprising multiple elements and positions corresponding to the multiple elements being at least one of succesive SRS SF positions or symbol set; or
- triggering of the AP-SRS and configuration of at least one of an SRS SF set or symbol set, the set comprising multiple elements and positions corresponding to the multiple elements being at least one of discrete SRS SF positions or symbol set.

3. The method of claim 2, wherein SF positions or symbol positions corresponding to the elements of the SRS SF or SRS SF set or symbol or symbol set in the field information of the SRS request field in the DCI format 0B/4B are discrete at equal intervals, or discrete at unequal intervals or succesive on a time domain.

4. The method of claim 1, wherein the field information of the SRS request field in the DCI format 0B comprises that:
the SRS request field in the DCI format 0B/4B occupies N bits, the N bits being configured to indicate at least one of non-triggering and triggering of the AP-SRS, sending position or resource information, and N being a positive integer,
wherein the sending position or resource comprises at least one of: an SF, symbol, SF set or symbol set.

5. A user Equipment (UE), comprising a first processor and a first memory coupled to the first processor, wherein the first processor is configured to
determine a resource for sending an Aperiodic Sounding Reference Signal (AP-SRS) on an unlicensed carrier by a 2-bit SRS request field indicated in Downlink Control Information (DCI) format 0B/4B; and
send the SRS according to the determined resource;
wherein the 2-bit SRS request field indicates:
no AP-SRS trigger; or
AP-SRS trigger and at least one of a SubFrame (SF) position, SF position set, symbol or symbol set for sending the AP-SRS.

6. A non-transitory computer storage medium having stored thereon computer-executable instructions for executing a method for sending a Sounding Reference Signal (SRS), the method comprising:
determining a resource for sending an Aperiodic SRS (AP-SRS) on an unlicensed carrier by a 2-bit SRS request field indicated in Downlink Control Information (DCI) format 0B/4B; and
sending the AP-SRS according to the determined resource;
wherein the 2-bit SRS request field indicates:
no AP-SRS trigger; or
AP-SRS trigger and at least one of a SubFrame (SF) position, SF position set, symbol or symbol set for sending the AP-SRS.

* * * * *